(12) United States Patent
Mori

(10) Patent No.: US 7,299,413 B2
(45) Date of Patent: Nov. 20, 2007

(54) DOCUMENT PROCESSING METHOD AND SYSTEM

(75) Inventor: Yasuo Mori, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 449 days.

(21) Appl. No.: 10/238,586

(22) Filed: Sep. 11, 2002

(65) Prior Publication Data

US 2003/0056179 A1     Mar. 20, 2003

(30) Foreign Application Priority Data

Sep. 14, 2001 (JP) .............................. 2001-280757
Sep. 6, 2002 (JP) .............................. 2002-261976

(51) Int. Cl.
*G06F 17/00* (2006.01)
(52) U.S. Cl. ...................... 715/530; 715/770
(58) Field of Classification Search ................ 715/513, 715/515, 530, 531, 540, 770
See application file for complete search history.

(56) References Cited

U.S. PATENT DOCUMENTS

| | | | |
|---|---|---|---|
| 5,745,712 A * | 4/1998 | Turpin et al. ................ 715/763 |
| 6,120,197 A | 9/2000 | Kawamoto et al. ............ 400/61 |
| 6,560,616 B1 * | 5/2003 | Garber ........................ 707/203 |
| 6,907,565 B1 * | 6/2005 | Huang ........................ 715/513 |
| 2003/0004957 A1 * | 1/2003 | Broman et al. ............. 707/100 |
| 2003/0079177 A1 * | 4/2003 | Brintzenhofe et al. ...... 715/500 |
| 2003/0237051 A1 * | 12/2003 | LaMarca et al. ............ 715/513 |

FOREIGN PATENT DOCUMENTS

| | | |
|---|---|---|
| JP | 02-297140 | 12/1990 |
| JP | 09-204281 | 8/1997 |
| JP | 11-305982 | 11/1999 |
| JP | 2001-500294 | 1/2001 |
| WO | WO 98/10356 | 3/1998 |

OTHER PUBLICATIONS

OASYS 1-2-3 V7, User's Manual of OASYS 1-2-3 by Fujitsu, first print, Japan, Fujitsu Limited, Oct. 31, 1999, first edition, p. 39, with translation.

* cited by examiner

*Primary Examiner*—Stephen Hong
*Assistant Examiner*—Adam M Queler
(74) *Attorney, Agent, or Firm*—Fitzpatrick, Cella, Harper & Scinto

(57) ABSTRACT

The present invention provides a document processing method and system capable of making both global and local settings when inserting, moving, or copying and pasting data, by taking full advantage of the feature of retaining data and set values hierarchically in the system. In document processing for processing original data which has a print format as an attribute, the original data is retained in a tree structure, with each node having attributes, and when moving or copying any desired subtree data in the tree structure, node attributes of the manipulated subtree data is set with the attributes of the source or destination node according to priorities of attributes specified among the levels of the tree structure.

50 Claims, 51 Drawing Sheets

FIG. 4A

| NO | ATTRIBUTE INFORMATION | | REMARKS |
|---|---|---|---|
| 1 | PRINT METHOD | SIMPLEX / DUPLEX / BIND-READY PRINTING | |
| 2 | PAPER SIZE | MATCH PAGE SIZE / FIXED SIZE | • Z-FOLD IF "A4 + A3", "B4 + B3", OR "LETTER + LEDGER (11 × 17)" IS SPECIFIED<br>• ORIGINAL PAGE SIZE IS SELECTED AUTOMATICALLY FOR FIRST PAGE OF FIRST CHAPTER IF BIND-READY PRINTING OR N-up PRINTING IS SPECIFIED |
| 3 | PAPER ORIENTATION | PORTRAIT / LANDSCAPE | • AVAILABLE ONLY WHEN FIXED SIZE IS SPECIFIED |
| 4 | BINDING MARGIN / BINDING DIRECTION | | • SHIFT AND SPECIFY MAGNIFICATION ARE AVAILABLE |
| 5 | N-up PRINTING | NO. OF PAGES / ORDER OF PLACEMENT / BORDER LINE / PLACEMENT LOCATION | • NINE PATTERNS ARE AVAILABLE FOR PLACEMENT LOCATION<br>• FIT ON PAPER IS AVAILABLE |
| 6 | ENLARGE / REDUCE | ON / OFF | SET TO ON AUTOMATICALLY IF FIXED SIZE IS SELECTED FOR PAPER SIZE OR N-up PRINTING IS SELECTED. CAN BE SET TO OFF |
| 7 | WATERMARK | | • CAN BE SPECIFIED INDIVIDUALLY FOR EACH LOGICAL OR PHYSICAL PAGE<br>• SPECIFIED FOR ALL CHAPTERS OR ALL PAGES |

FIG. 4B

| | | | |
|---|---|---|---|
| 8 | HEADER / FOOTER | | • CAN BE SPECIFIED INDIVIDUALLY FOR EACH LOGICAL OR PHYSICAL PAGE<br>• SPECIFIED FOR ALL CHAPTERS OR ALL PAGES |
| 9 | PAPER EJECTION METHOD | STAPLING / PUNCH HOLE | • STAPLING / PUNCH IS AVAILABLE ONLY IN THE CASE OF SIMPLEX OR DUPLEX PRINTING<br>• VALID VALUES FOR STAPLING ARE 1 AND 2 |
| 10 | BINDING DETAIL | SPREAD DIRECTION /<br>SADDLE STITCHING /<br>SPECIFY MAGNIFICATION /<br>BINDING MARGIN / SEPARATE VOLUME | • AVAILABLE ONLY IN THE CASE OF BIND-READY PRINTING |
| 11 | FRONT / BACK COVER | | • PRINTING IS SPECIFIED FOR 1/2 OF FRONT COVER AND 1/2 OF BACK COVER<br>• PAPER SOURCE (INCLUDING INSERTER) IS SPECIFIED |
| 12 | TAB SHEET | | • CHARACTER STRINGS AND ANNOTATIONS TO BE PRINTED ON TAB SHEETS CAN BE SPECIFIED<br>• NOT AVAILABLE IN THE CASE OF BIND-READY PRINTING |
| 13 | SLIP SHEET | | • PAPER SOURCE (INCLUDING INSERTER) IS SPECIFIED<br>• ORIGINAL DATA CAN BE PRINTED ON SLIP SHEETS<br>• NOT AVAILABLE IN THE CASE OF BIND-READY PRINTING |
| 14 | CHAPTER BREAK | NONE / NEW PAGE / NEW SHEET | • FIXED AT "NEW SHEET" IF TAB SHEET OR SLIP SHEET IS SPECIFIED<br>• SET TO "NEW SHEET" IN THE CASE OF SIMPLEX PRINTING |

FIG. 5

| NO | ATTRIBUTE INFORMATION | | REMARKS |
|---|---|---|---|
| 1 | PAPER SIZE | ORIGINAL PAGE SIZE / FIXED SIZE | • IF FIXED SIZE IS SELECTED, "NEW SHEET" IS SPECIFIED AUTOMATICALLY<br>• CAN BE CHANGED ONLY FOR SPECIFIED PAPER IF TWO OR MORE TYPES OF PAPER IS SELECTED AT BOOK LEVEL. CAN BE CHANGED EVEN IF BOOK-LEVEL SETTING IS FOLLOWED |
| 2 | PAPER ORIENTATION | PORTRAIT / LANDSCAPE | • CAN BE SELECTED ONLY IN THE CASE OF FIXED SIZE |
| 3 | N-up PRINTING | NO. OF PAGES / ORDER OF PLACEMENT / BORDER LINE / PLACEMENT LOCATION | • NINE PATTERNS ARE AVAILABLE FOR PLACEMENT LOCATION<br>• FIT ON PAPER IS AVAILABLE |
| 4 | ENLARGE / REDUCE | ON / OFF | • SET TO ON AUTOMATICALLY IF FIXED SIZE IS SELECTED FOR PAPER SIZE OR N-up PRINTING IS SELECTED CAN BE SET TO OFF |
| 5 | WATERMARK | SHOW / HIDE | • SPECIFIES WHETHER TO DISPLAY ALL WATERMARKS SPECIFIED AT BOOK LEVEL |
| 6 | HEADER / FOOTER | SHOW / HIDE | • SPECIFIES WHETHER TO DISPLAY ALL HEADERS AND FOOTERS SPECIFIED AT BOOK LEVEL |
| 7 | PAPER EJECTION METHOD | STAPLING | • OFF IS AVAILABLE IF STAPLING IS SPECIFIED AT BOOK LEVEL. DEFAULT IS ON |

FIG. 6

| NO | ATTRIBUTE INFORMATION | | REMARKS |
|---|---|---|---|
| 1 | PAGE ROTATION | | · VALID VALUES ARE 0, 90, 180, AND 270 DEGREES |
| 2 | WATERMARK | SHOW / HIDE | · SPECIFIES WHETHER TO DISPLAY ALL WATERMARKS SPECIFIED AT BOOK LEVEL |
| 3 | HEADER / FOOTER | SHOW / HIDE | · SPECIFIES WHETHER TO DISPLAY ALL HEADERS AND FOOTERS SPECIFIED AT BOOK LEVEL |
| 4 | ZOOM | 50% - 200% | · SPECIFIES RELATIVE MAGNIFICATION WITH SIZE OF VIRTUAL LOGICAL PAGE AREA TAKEN AS 100% |
| 5 | PLACEMENT LOCATION | | · NINE FIXED PATTERNS ARE AVAILABLE. ALSO, ANY DESIRED LOCATION MAY BE SPECIFIED |
| 6 | ANNOTATION | | |
| 7 | VARIABLE ITEM | | |
| 8 | PAGE SPLIT | | |

F I G. 14
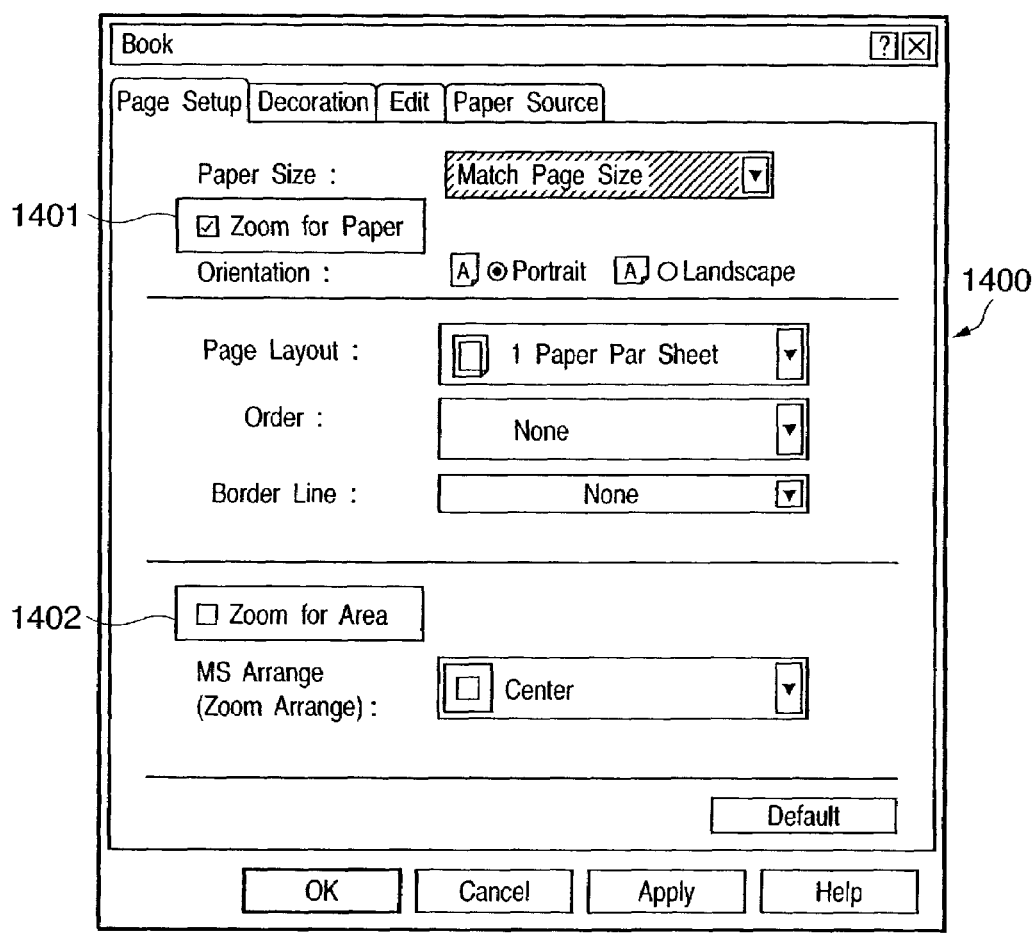

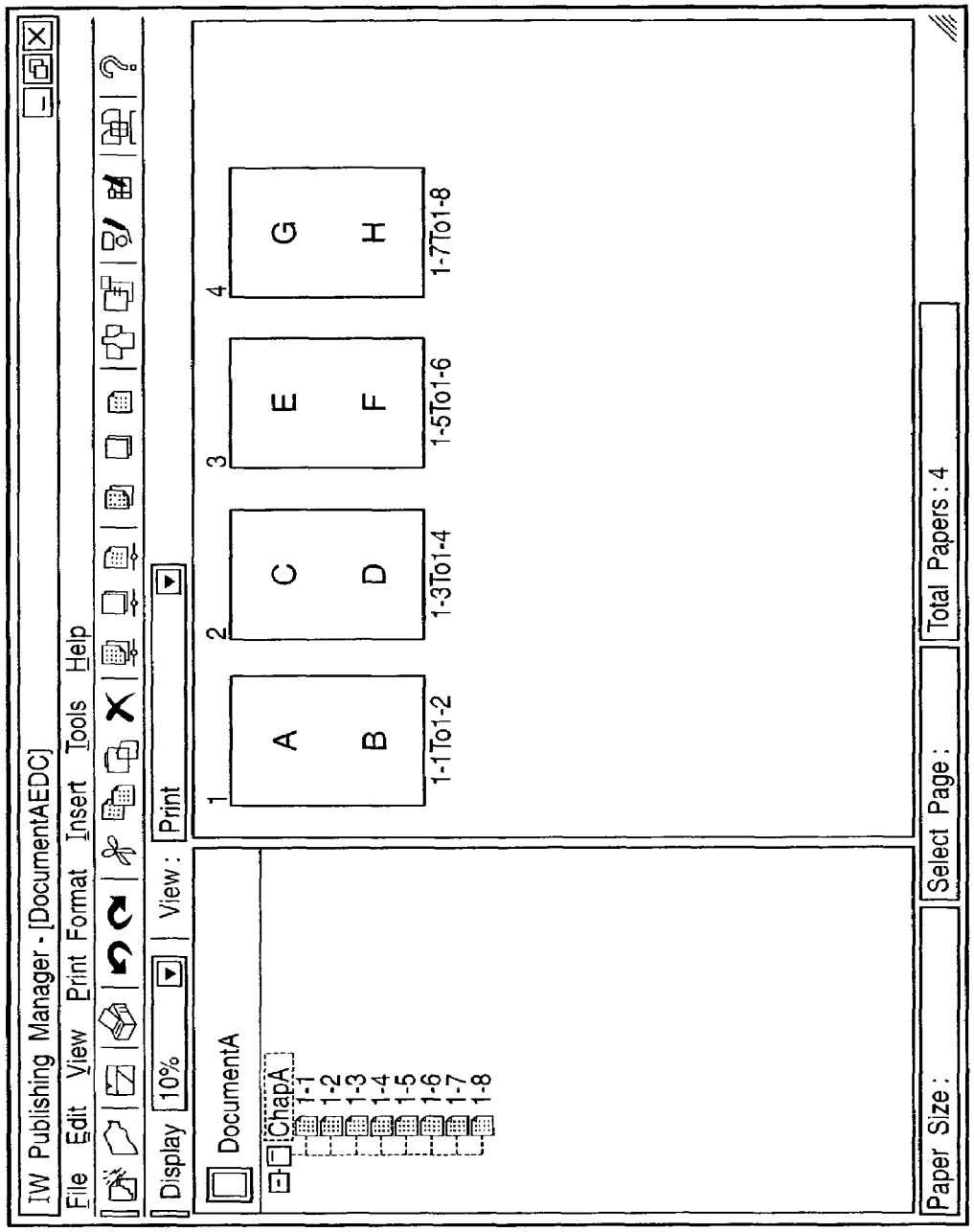

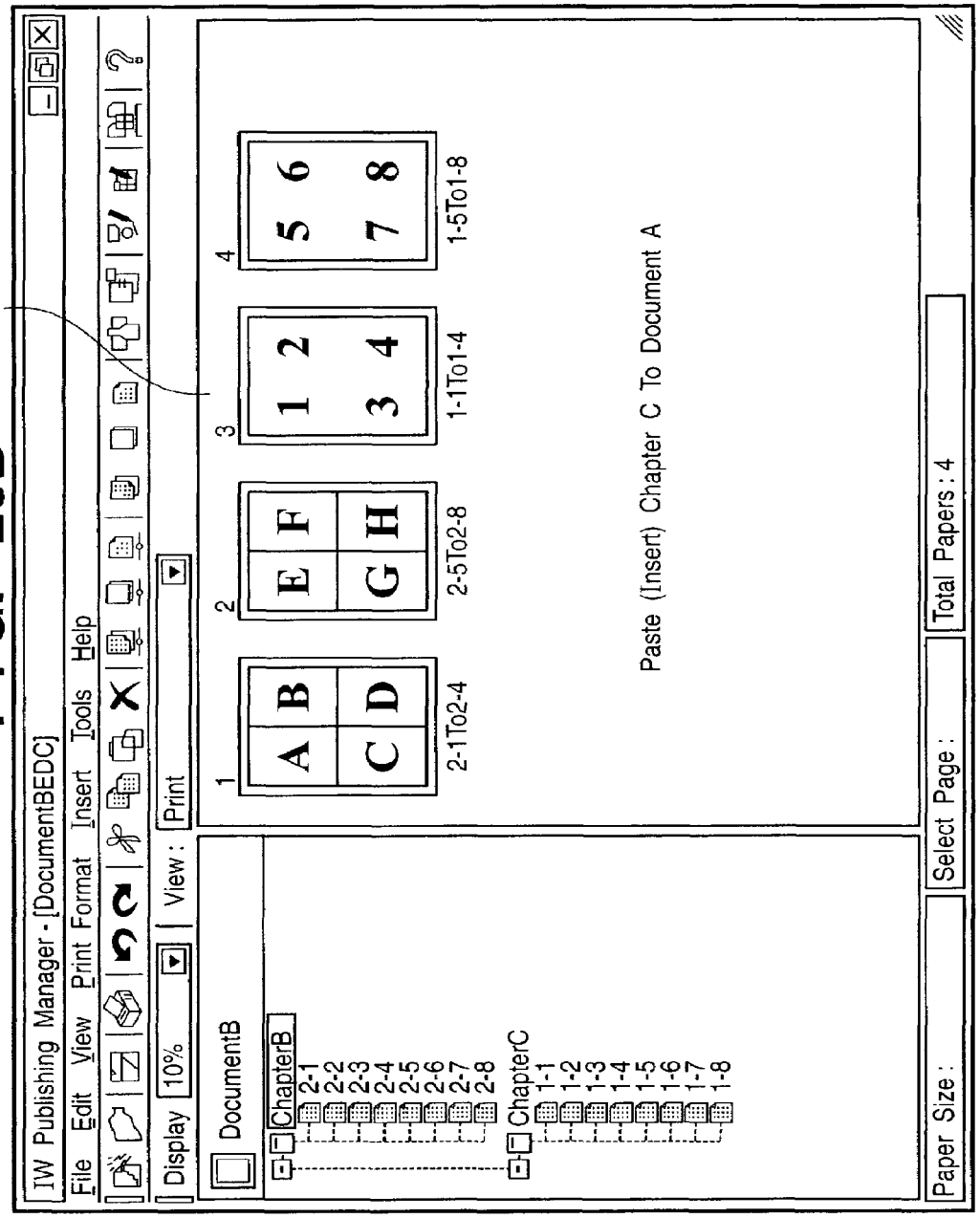

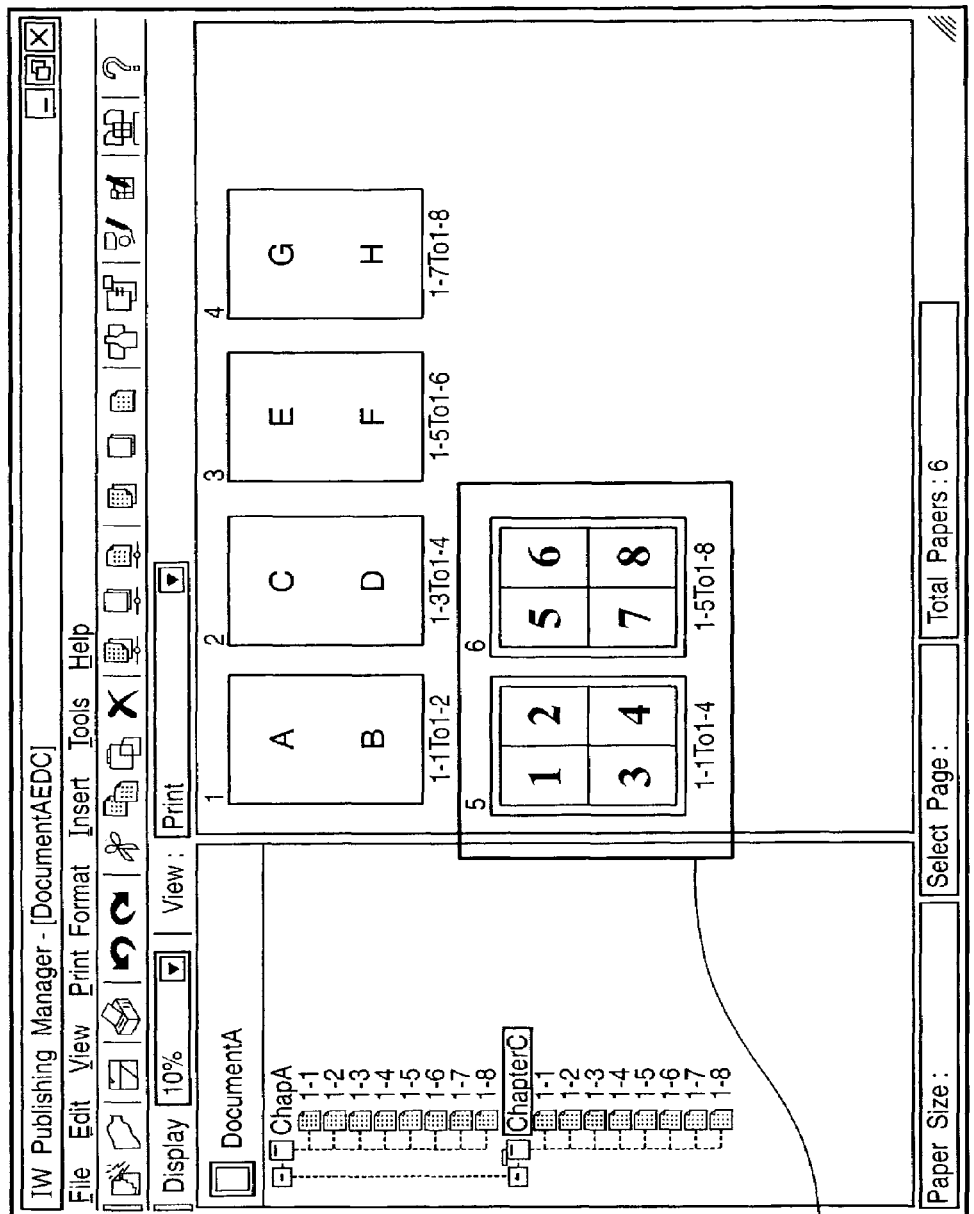

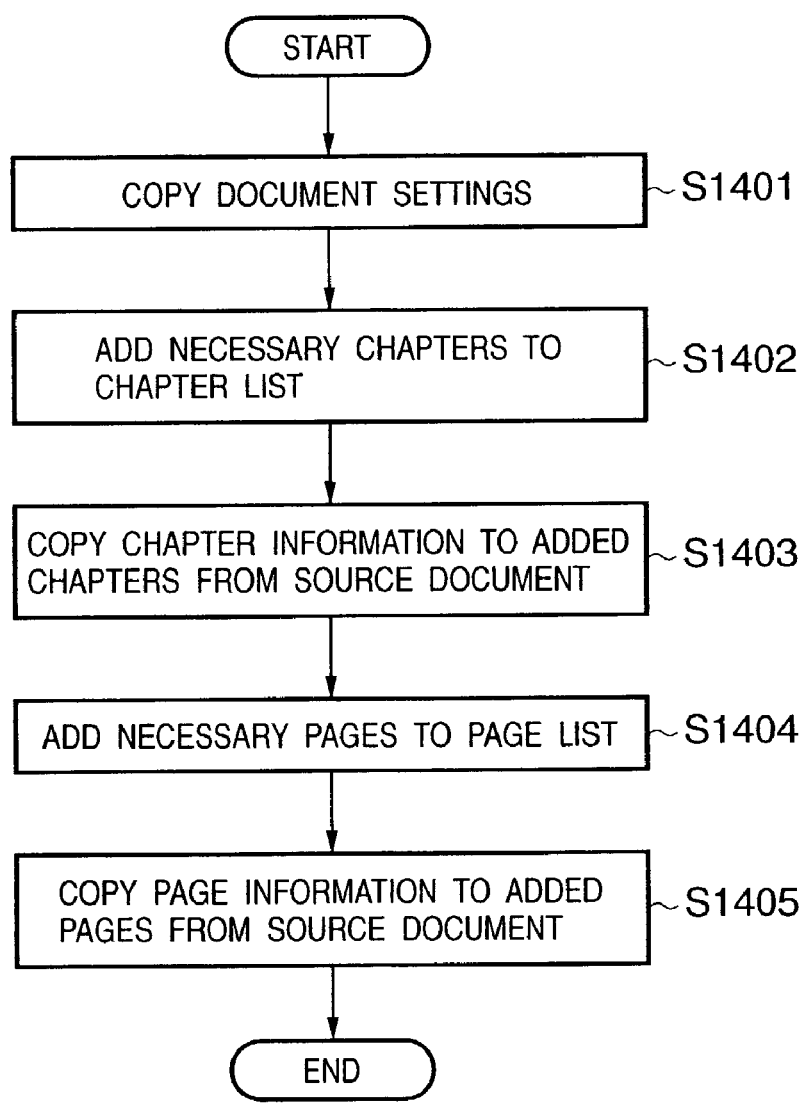

3301

3302

RETAIN ONLY PAGE ATTRIBUTES
RETAIN CHAPTER AND PAGE ATTRIBUTES
COPY ATTRIBUTES OF SOURCE DOCUMENT TO CHAPTER ATTRIBUTES
CLEAR ALL ATTRIBUTES
CANCEL

PASTE METHOD — 3502

- ● RETAIN ONLY PAGE ATTRIBUTES
- ○ RETAIN CHAPTER AND PAGE ATTRIBUTES
- ○ COPY ATTRIBUTES OF SOURCE DOCUMENT TO CHAPTER ATTRIBUTES
- ○ CLEAR ALL ATTRIBUTES

[ OK ]   [ CANCEL ]

FIG. 36

{
PASTE METHOD ID
ID1 : RETAIN ONLY PAGE ATTRIBUTES
ID2 : RETAIN CHAPTER AND PAGE ATTRIBUTES
ID3 : COPY ATTRIBUTES OF SOURCE DOCUMENT TO CHAPTER ATTRIBUTES
ID4 : CLEAR ALL ATTRIBUTES

DOCUMENT PROCESSING METHOD AND SYSTEM

FIELD OF THE INVENTION

The present invention relates to a document processing method and system, which, for example, compile output data generated by various programs such as document processing programs and image editing programs into one document and provide capabilities to edit the document. More particularly, it relates to a document processing method and system for a system consisting of an information processing unit—such as a personal computer—and a printer.

BACKGROUND OF THE INVENTION

Since structures defining data such as characters, tables, and images and operations for editing the data vary with the kind of data, various application programs are provided to accommodate different kinds of data. Users use different applications according to kinds of data: they use character processing programs to edit characters, spread sheet programs to edit tables image editing programs to edit images, and so on.

In this way, it is common practice for users to use a different application program for each kind of data. However, a document created by a user generally consists of two or more kinds of data such as characters and tables, characters and images, and so on instead of one kind of data such as characters only, tables only, or images only. Consequently, when creating a document containing two or more kinds of data, the user must print data on each application using a print function of the application and combine resulting prints in a desired order.

There is a program called an office suite which combine various applications into a single integrated application. Some office suites provide capability to combine data generated by various applications into one document. By using such an integrated application, a user can compile data created on individual applications into a desired document by means of a particular application contained in the integrated application.

However, when combining prints produced by various applications into a desired document, in order, for example, to number its pages, the user must print out all necessary data and print a compiled document on a trial basis to determine the page numbers to be assigned to the final document. Then, by using each application, the user must enter the determined page numbers in the pages (called logical pages or original pages) of the originals created on the each application. Even if an application program has a capability to number pages, the user must still specify a page number after any discontinuity. Also, if pages of the desired document are rearranged, the user must reassign page numbers accordingly. Besides, even in the case of a format change which simply involves, for example, merging two or more original pages into one page of printed matter (called a physical page or print page) or changing from simplex printing to duplex printing rather than changes in data content, the user must edit and print the pages again using the appropriate application.

In this way, since different applications can manage only different kinds of data, the user must provide interfaces between applications manually. This requires a great deal of labor from the user, resulting in reduced productivity. Furthermore, manual intervention, a lot of which is involved, is prone to errors.

On the other hand, when creating a desired document using an integrated application, various data can be laid out as they are without printing them out. This does not require so much labor as when creating a desired document by combining prints. However, applications for editing and creating various data are limited to those contained in the integrated application and desired applications are not always available. Besides, the desired document created by the integrated application is a single document file and is edited, output, or otherwise managed on a file-by-file basis. Therefore, if the user wants to format part of the document file, there are many restrictions due to applications capabilities. For example, the user must reformat each differently formatted part and print it again. This requires a lot of labor and is no different in low productivity from the method described above.

SUMMARY OF THE INVENTION

The present applicant proposed a system which retained data by the page to lay out and print it according to various settings. However, although this system retained data hierarchically, it retained settings only on the level of an entire document and did not allow local settings. To take N-up printing, a typical layout setting, as an example, the proposed system allowed 2-up printing to be specified for an entire document, but did not allow the setting for part of the document to be changed to 4-up printing. On the other hand, systems which allow settings to be specified separately for each part retain attributes for individual parts separately rather than for all the parts as a whole and do not allow settings to be changed for all the parts at once. Thus, a system is desired which will allow both global and local settings by retaining various settings at each level of a hierarchy in addition to retaining data hierarchically.

Such a system will make it possible to perform edit operations of moving or copying & pasting any subtree such as a page or a set of pages in addition to changing settings.

Thus, the object of the present invention is to provide a document processing method and system capable of making both global and local settings when inserting, moving, or copying and pasting data, by taking full advantage of the feature of retaining data and set values hierarchically in the system.

To solve the above problem, the present invention provides a document processing method of processing original data which has a print format as an attribute, comprising: a manipulation step of manipulating such as moving or copying, any desired subtree data in a tree structure in which the original data is stored with each node having attributes; and a setting step of setting attributes in node of the subtree data to be manipulated in said manipulation step, based on attributes of source and destination on moving or copying the subtree data.

Here, the document processing method further comprises an indicating step of indicating priorities of attributes among upper and lower levels of the above described tree structure, wherein attributes are set according to the above described indicated priorities in the above described setting step. Also, the subtree data in the above described tree structure contains the above described priorities of attributes indicated in said indicating step, as an attribute of a lower level. Also, the document processing method further comprises a first display control step of controlling a process of displaying a screen in which the above described priorities of attributes can be indicated, on a node-by-node basis, wherein the above described priorities of attributes are indicated via the screen in the above described indicating step. Also, the document processing method further comprises a reading step of reading out already stored default settings which define how to set the attributes of the subtree in the above described setting step. Also, the above described method is used for document processing which involves book editing processes, based on document data generated by applications, and the attributes managed by the above described tree structure include attributes related to book editing processes.

Also, the present invention provides a document processing system for processing original data which has a print format as an attribute, comprising: a manipulation unit for manipulating such as moving or copying, any desired subtree data in a tree structure in which the original data is stored with each node having attributes; and a setting unit for setting attributes in node of the subtree data to be manipulated by the above described manipulation unit, based on attributes of source and destination on moving or copying the subtree data.

Also, the present invention provides a document processing apparatus for processing original data which has a print format as an attribute, comprising: a manipulation unit for manipulating such as moving or copying, any desired subtree data in a tree structure in which the original data is stored with each node having attributes; and a setting unit for setting attributes in node of the subtree data to be manipulated by the above described manipulation unit, based on attributes of source and destination on moving or copying the subtree data.

Also, the present invention provides a document processing apparatus for processing original data which has a print format as an attribute, comprising: a manipulation unit for manipulating such as moving or copying, any desired subtree data in a tree structure in which the original data is stored with each node having attributes; and a setting unit for setting attributes in node of the subtree data to be manipulated by the above described manipulation unit, based on attributes of source and destination on moving or copying the subtree data.

Here, the document processing apparatus further comprisies an indicating unit for indicating priorities of attributes among upper and lower levels of the above described tree structure, wherein attributes are set according to said indicated priorities by said setting unit.

Also, the subtree data in the above described tree structure contains the above described priorities of attributes indicated by the above described indicating unit, as an attribute of a lower level. Also, the document processing method further comprises a first display control unit for controlling a process of displaying a screen in which the above described priorities of attributes can be indicated, on a node-by-node basis, wherein the above described priorities of attributes are indicated via the screen by the above described indicating unit. Also, the document processing apparatus further comprises a second display control unit for controlling a process of displaying a screen which allows a user to indicate how to set the attributes of the subtree, when the subtree data is manipulated by the above described manipulation unit. Also, the document processing apparatus further comprises a reading unit for reading out already stored default settings which define how to set the attributes of the subtree by the above described setting unit. Also, the above described apparatus is used for document processing which involves book editing processes, based on document data generated by applications, and the attributes managed by said tree structure include attributes related to book editing processes.

Also, the present invention provides a document processing program for processing original data which has a print format as an attribute, comprising: a manipulation module of manipulating such as moving or copying, any desired subtree data in a tree structure in which the original data is stored with each node having attributes; and a setting module of setting attributes in node of the subtree data to be manipulated in the above described manipulation module, based on attributes of source and destination on moving or copying the subtree data. Here, the document processing program further compris an indicating module of indicating priorities of attributes among upper and lower levels of said tree structure, wherein attributes are set according to the above described indicated priorities in the above described setting module.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are diagrams showing a list of book attributes;

FIG. 5 is a diagram showing a list of chapter attributes;

FIG. 6 is a diagram showing a list of page attributes;

FIG. 14 is a diagram showing an exemplary dialog window for use in making settings for a entire document at the top level of the data structure;

FIG. 20A is a diagram showing an example of a document to be copied and pasted;

FIG. 20B is a diagram showing an example of a document to be copied and pasted when it has no unique setting;

FIG. 20D is a diagram showing an example of copy and paste results when there is no unique setting;

FIG. 22 is a diagram showing an exemplary process of inserting data;

FIGS. 35A to 35C are diagrams showing examples of GUI which allow the user to select a paste method;

FIG. 36 is a diagram showing an example of IDs used by a program to recognize an item selected by the user in FIG. 35;

DETAILED DESCRIPTION OF THE PREFERRED EMBODIMENTS

A preferred embodiment of the present invention will be described in detail below with reference to the accompanying drawings.

Outline of Document Processing System According to this Embodiment

A document processing system according to a first embodiment of the present invention will be outlined with reference to FIGS. 1 to 13. In this system, a data file created by a general application is converted by an electronic original writer into an electronic original file. A book editing application provides the capability to edit the electronic original file. Incidentally, although in this example, the general application, the electronic original writer, the book editing application, and an electronic original despooler are shown separately to indicate their respective functions distinctly, packages provided to users are not limited to this and may contain an application or graphic engine which consists of a combination of these applications. Details will be described below.

Figure 1:
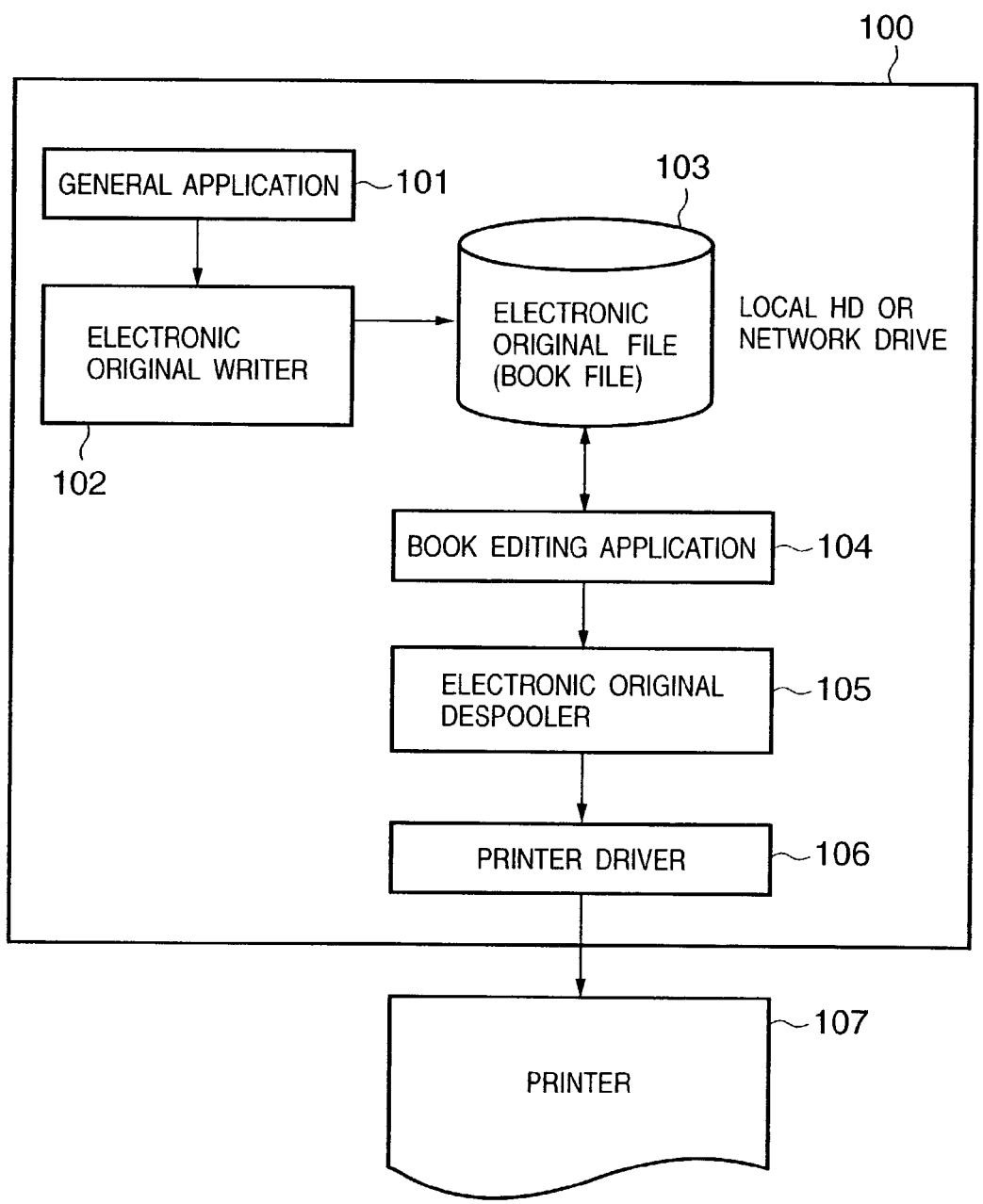
FIG. 1 is a block diagram showing an exemplary software configuration of a stand-alone document processing system according to this embodiment.

Exemplary Software Configuration of Document Processing System According to this Embodiment FIG. 1 is a block diagram showing a software configuration of the document processing system according to this embodiment.

The document processing system is implemented by a digital computer 100 (hereinafter also referred to as a host computer), which is a preferred embodiment of a document processing device of the present invention. A general application 101 is an application program which provides word processing, spreadsheet, photo retouching, draw or paint, presentation, text editing, and other functions. It also has a print function for an OS. Such an application uses a designated interface (usually referred to as GDI) provided by the operating system (OS) to print application data such as created document data and image data. Thus, to print created data, the application 101 sends a predetermined, OS-dependent, output command (called a GDI function) to an output module of the OS which provides the interface. Upon receiving the output command, the output module converts the command into a format which can be handled by a printer or other output devices and outputs the converted command (called a DDI function). The format which can be handled by output devices depends on the device type, manufacturer, machine type, and the like, and thus a device driver is provided for each device. By using such device drivers, the OS converts the command, generates print data, and describes it in a JL (Job Language) to generates a print job. If the OS used is Microsoft Windows, the output module used is a module called GDI (Graphic Device Interface).

An electronic original writer 102 is an improved form of a device driver and is a software module provided to implement this document processing system. However, the electronic original writer 102 is not intended for a specific output device and converts output commands into a format which can be handled by a book editing application 104 and printer driver 106 described later. Any format may be used as the format resulting from conversion by the electronic original writer 102 (hereinafter referred to as an "electronic original format") as long as it can describe a original in detail on a page-by-page basis. Among practical standard formats, Adobe Systems' PDF format or SVG format can be adopted as an electronic original format.

To make the application 101 use the electronic original writer 102, the electronic original writer 102 should be specified, before a print run, as a device driver for use to produce output. However, an electronic original file as created by the electronic original writer 102 is not properly formatted. Thus, it is the book editing application 104 that specifies the electronic original writer 102 as a device driver and application data is converted into an electronic original file under its direction. The book editing application 104 brings the new incomplete electronic original file generated by the electronic original writer 102 to completion to obtain such a properly formatted electronic original file as described later. Hereinafter, if this point needs to be identified clearly, the files created by the electronic original writer 102 will be referred to as electronic original files and the files formatted by the book editing application will be referred to as book files. Otherwise, document files, electronic original files, and book files generated by applications will all be referred to as document files (or document data).

In this way, when the electronic original writer 102 is specified as a device driver and the general application 101 is instructed to print data, application data is converted into an electronic original made up of pages (hereinafter referred to as "logical pages" or "original pages") defined by the application 101 and is stored as an electronic original file 103 in a storage medium such as a hard disk. Incidentally, the hard disk may be a local drive provided on the computer which implements the document processing system of this embodiment or may be a drive provided on a network if the computer is connected to the network.

The book editing application 104 provides the user with capability to read and edit an electronic original file or book file 103. However, it does not provide capability to edit contents of individual pages. Instead it provides capability to edit chapters and books (described later) made up of pages, which are the smallest units.

To print the book file 103 edited by the book editing application 104, the book editing application 104 starts an electronic original despooler 105. The electronic original despooler 105 is a program module installed together with the book editing application in the computer and is used to output drawing data to a printer driver when printing a document (book file) which uses the book editing application. The electronic original despooler 105 reads a specified book file from the hard disk, generates an output command compatible with the output module of the OS to print pages in the format described in the book file, and outputs the output command to the output module (not shown). In so doing, a driver 106 of a printer 107 used as an output device is specified as a device driver. Using the specified printer driver 106 of the printer 107, the output module converts the received output command into a device command which can be interpreted and executed by the printer 107. The device command is transmitted to the printer 107, which then prints images according to the command.

Figure 2:
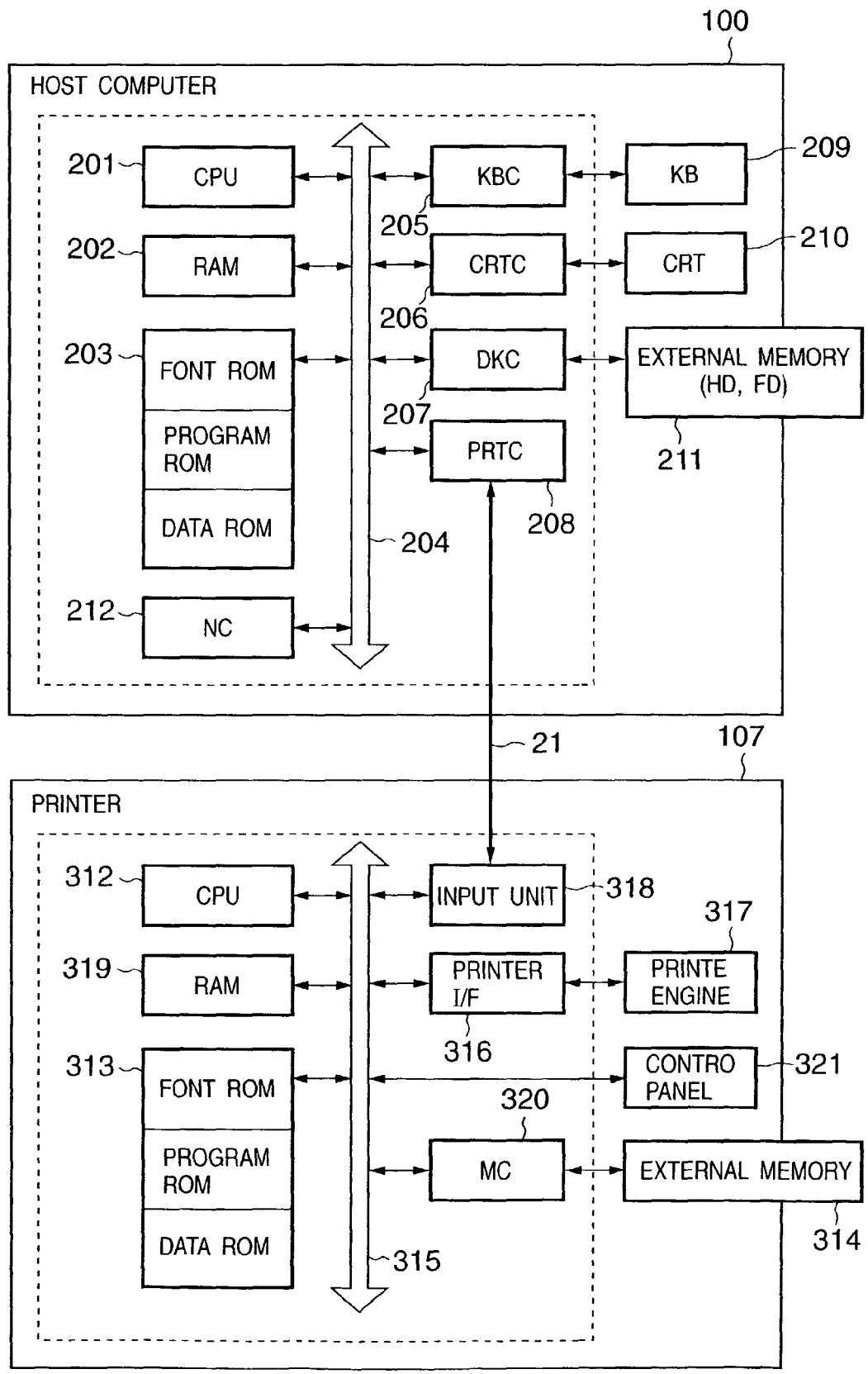
FIG. 2 is a block diagram showing an exemplary configuration of hardware which implements the document processing system according to this embodiment.

Exemplary Hardware Configuration of the Document Processing System According to this Embodiment FIG. 2 is a diagram showing a hardware configuration of the document processing system according to this embodiment. In the figure, the host computer 100 comprises a CPU 201 which processes a document containing a mixture of graphics, images, characters, tables (including spreadsheets), etc. based on a document processing program and the like stored in a program ROM or external memory 211 in a ROM 203 and which collectively controls various devices connected to a system bus 204. Also, the program ROM or external memory 211 in the ROM 203 stores an operating system program—which is a control program of the CPU 201—and the like, a font ROM or the external memory 211 in the ROM 203 stores font data for use during the document processing, and a data ROM or the external memory 211 in the ROM 203 stores various data for use during the document processing and the like. A RAM 202 functions as a main memory, work area, and the like for the CPU 201.

A keyboard controller (KBC) 205 controls input from a keyboard 209 and pointing device (not shown). A CRT controller (CRTC) 206 controls display on a CRT display (CRT) 210. Reference numeral 207 denotes a disk controller (DKC), which controls access to and from the hard disk (HD) and the external memory 211 such as a floppy disk (FD) that store a boot program, various applications, font data, user files, edited files, printer control command generating programs (hereinafter referred to as printer drivers), and the like. A printer controller (PRTC) 208 is connected to the printer 107 via a bidirectional interface (interface) 21 and controls communications with the printer 107. An NC 212 is connected to a network and controls communications with other equipment.

The CPU 201 rasterizes outline fonts in a display information RAM provided in the RAM 202 to enable WYSIWIG on the CRT 210. Also, the CPU 201 opens various registered windows according to commands indicated by a mouse cursor or the like (not shown) on the CRT 210 and performs various types of data processing. When printing something, the user can open a print setting window and specify a printing method to the printer driver, including printer settings and selection of a print mode.

The printer 107 is controlled by a CPU 312. The printer CPU 312 outputs image signals as output information to a printer engine 317 connected to a system bus 315, based on a control program and the like stored in a program ROM in a ROM 313 or a control program and the like stored in an external memory 314. The program ROM in the ROM 313 stores a control program and the like for the CPU 312. A font ROM in the ROM 313 stores font data and the like for use in generating the output information described above while a data ROM in the ROM 313 stores information and the like for use on the host computer in case the printer is not provided with an external memory 314 such as a hard disk.

The CPU 312 can conduct communications with the host computer 100 via an input unit 318 and convey information and the like stored in the printer to the host computer 100. A RAM 319 functions as a main memory, work area, and the like for the CPU 312, and memory capacity can be expanded if an optional RAM is connected to an expansion port (not shown). The RAM 319 is used as an output information extraction area, environment data storage area, NVRAM, or the like. Access to the external memory 314 such as the hard disk (HD) or an IC card is controlled by a memory controller (MC) 20. The external memory 314 is connected optionally and stores font data, emulation programs and form data. Reference numeral 321 denotes a control panel equipped with control switches, LED indicators, etc.

Regarding the external memory 314 described above, more than one external memory containing programs for interpreting installed fonts, option cards, and different printer control languages may be connected. Furthermore, NVRAM (not shown) may be provided to store printer mode setting information received from the control panel 321.

Sample Format for Electronic Original Data

Before going into details of the book editing application 104, a data format of a book file will be described. A book file has a three-level structure modeled after a paper-based book. The top level, which is modeled after a book, is called "book" and defines attributes related to the entire book. The middle level directly below the top level corresponds to the chapter of a book and called "chapter." Attributes can be defined for each chapter. The bottom level, called "page," corresponds to the pages defined by an application program. Also, attributes can be defined for each page. One book may contain two or more chapters and one chapter may contain two or more pages.

Figure 3:
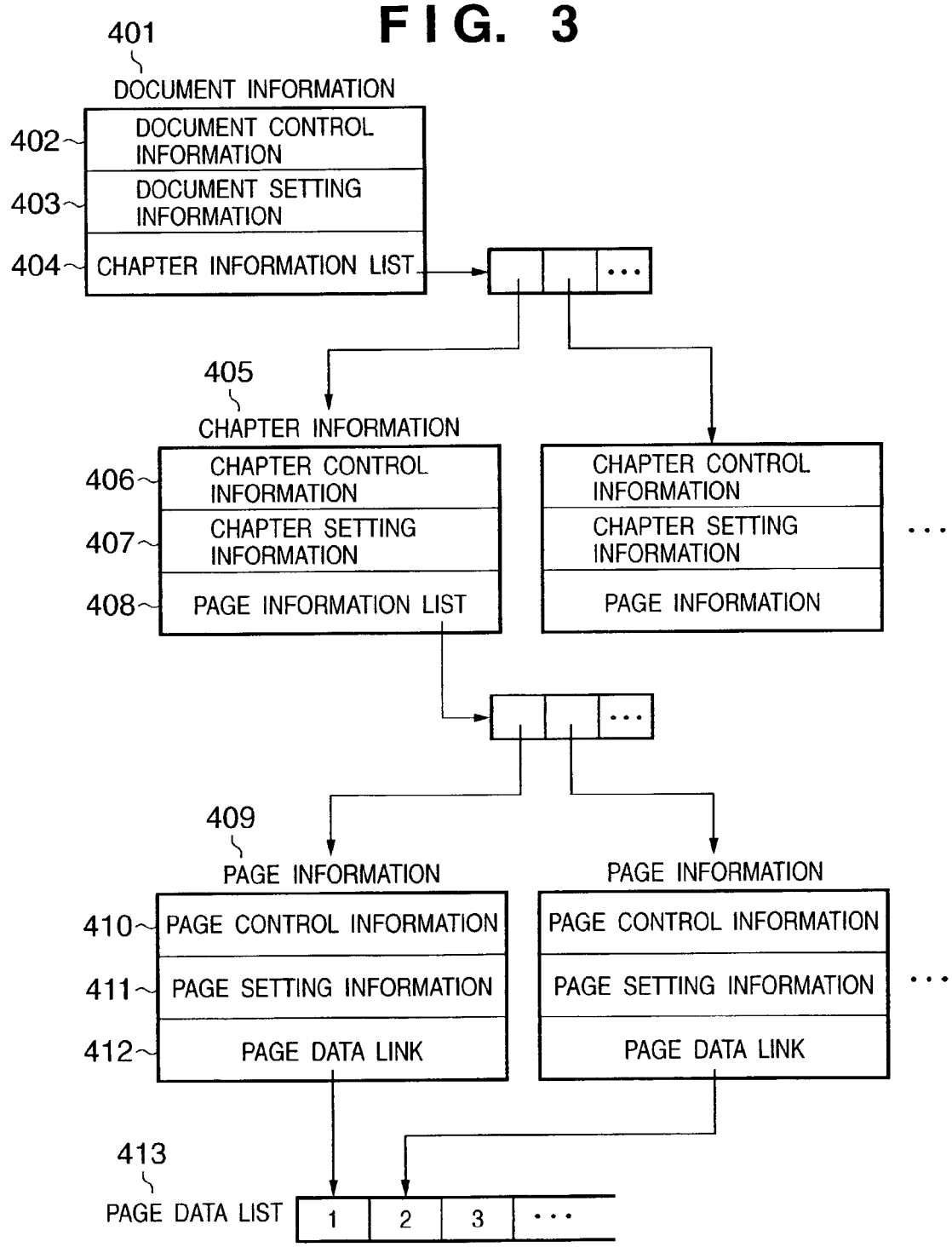
FIG. 3 is a diagram showing an exemplary configuration of a book file.

FIG. 3 is a diagram schematically showing a sample format for a book file. The book, chapters, and pages in the book file of this example are represented by corresponding nodes. One book file contained one book. The book and chapter, which are concepts used to define the structure of the book, contain defined attribute values and links to lower levels as their substance. The page has data on each page outputted by the application program, as its substance. Thus, the page contains the substance of the original page (original page data) and links to original page data in addition to its attribute values. Incidentally, a page printed out on a paper medium or the like may contain two or more original pages. This structure is not indicated by a link, but it is indicated as attributes at the book, chapter, and page levels.

In FIG. 3, the book file does not need to be a complete book, and thus a "book" is generalized as a "document."

At the top level is document information 401, which is roughly divided into three parts 402, 403, and 404. Document control information 402 contains information such as a path name of the document file in a file system. Document setting information 403, which corresponds to book attributes, contains layout information such as page layout and function setting information about printers such as stapling. A chapter information list 404 contains a list of chapters composing the document. The list contains chapter information 405.

The chapter information 405 is also roughly divided into three parts 406, 407, and 408. Chapter control information 406 contains information such as a chapter name. Chapter setting information 407, which corresponds to chapter attributes, contains page layout, stapling, and other information unique to a given chapter. As setting information is retained for each chapter, it is possible to create a document with a complex layout consisting, for example, of a 2-up layout for the first chapter and a 4-up layout for the other chapters. A page information list 408 contains a list of original pages composing a given chapter. The page information list 408 points to page information data 409.

The page information data 409 is also roughly divided into three parts 410, 411, and 412. Page control information 410 contains information such as a page number to be displayed on the tree. Page setting information 411, which corresponds to original page attributes, contains information such as a rotation angle and placement location of a given page. Page link information 412 constitutes original data which corresponds to the page. In this example, the page information 409 contains only link information 412 instead of containing original data directly and the actual original data is retained by a page data list 413.

FIGS. 4A and 4B are diagrams showing a list of exemplary book attributes (document setting information 403). Regarding items which can be defined overlapping with those at a lower level, priority is normally given to the attribute values at the lowest level. As to the items contained only in book attributes, the values defined for book attributes are effective throughout the entire book. However, regarding the items which overlap with those at a lower level, their values serve as defaults for use when no appropriate values are defined at the lower level. In this example, however, the user can select whether to give priority to attributes at a lower level, as described later. Incidentally, each item in the figure does not necessarily correspond to one concrete item, but they may include two or more items.

There are six items unique to book attributes: namely, Print Method, Binding Detail, Front/Back Cover, Tab Sheet, Slip Sheet, and Chapter Break. These items are defined over the entire book. For the Print Method attribute, three values are available: Simplex Printing, Duplex Printing, and Bind-ready Printing. The bind-ready printing involves bundling a specified number of sheets and folding the bundle in half so that the bundle can be bound together into a book after printing. The Binding Detail attribute allows the user to specify a spread direction, the number of sheets in a bundle, etc. when Bind-ready Printing has been specified.

The Front/Back Cover attribute includes specifications as to whether to add sheets for use as front and back covers and what to print on the added sheets when printing an electronic original file to be compiled as a book. The Tab Sheet attribute includes specifications as to whether to insert tab sheets provided separately in the printer, as chapter breaks, and what to print on the tabs. This attribute is available when the printer used is equipped with an inserter which inserts paper provided separately from the printing paper into a desired position or when two or more paper feed cassettes can be used. This also applies to the Slip Sheet attribute.

The Slip Sheet attribute includes specification as to whether to insert paper supplied from an inserter or paper feed cassette, as chapter breaks. It also includes specification of a paper feed source if slip sheets are to be inserted.

The Chapter Break attribute includes specification as to whether to use a new sheet, use a new print page, or do nothing at chapter breaks. In the case of simplex printing, the use of a new sheet and the use of a new print page mean the same thing. In the case of duplex printing, if "use new sheet" is specified, two consecutive chapters will never be printed on a single sheet of paper, but if "use new print page" is specified, two consecutive chapters may be printed on the front and back sides of a single sheet.

FIG. 5 is a diagram showing a list of exemplary chapter attributes (chapter setting information 407) while FIG. 6 is a diagram showing a list of exemplary page attributes (page setting information 411). The relationship between the chapter attributes and page attributes is analogous to the relationship between the book attributes and lower-level attributes.

Regarding the chapter attributes, there is no item unique to chapters, and all the chapter attributes overlap with book attributes. If chapter attribute definitions and book attribute definitions conflict, priority is normally given to the chapter attributes. In this example, however, the user can select whether to give priority to attributes at a lower level, as described later.

There are five items common only to the book attributes and chapter attributes: Paper Size, Paper Orientation, N-up Printing, Enlarge/Reduce, and Paper Ejection Method. Of these items, the N-up Printing attribute specifies the number of original pages to be included in one print page. Valid values include 1×1, 1×2, 2×2, 3×3, 4×4, etc. The Paper Ejection Method attribute specifies whether to staple ejected paper. The availability of this attribute depends on whether the printer used is provided with a stapling capability.

Items unique to page attributes include, Page Rotation, Zoom, Placement Location, Annotation, Page Split, etc. The Page Rotation attribute specifies the rotation angle for use in laying out original pages on a print page. The Zoom attribute specifies a relative magnification of original pages. The relative magnification is specified with the size of a virtual logical page area taken as 100%. The virtual logical page area is the area taken up by a single original page when original pages are laid out according to N-up printing specification or the like. For example, if 1×1 is specified for the N-up Printing attribute, the virtual logical page area is equivalent to one print page, and if 1×2 is specified, it corresponds to the area obtained by reducing each side of one print page to approximately 70%.

Attributes common to the book, chapter, and page include a Watermark attribute and Header/Footer attribute. The watermark is an image or character string specified separately and printed over data created by an application. The header and footer are watermarks printed in the top and bottom margins of every page, respectively. A page number, date, etc. can be specified for the header and footer using a variable. The items which can be specified as Watermark and Header/Footer attributes are common between the chapter and page, but they differ from those of the book. At the book level, the user can specify contents of watermarks and headers/footers as well as how to print the watermarks and headers/footers throughout the entire book. On the other hand, at the chapter and page levels, the user can specify whether to print the watermarks and headers/footers specified at the book level.

Exemplary Procedures for Operating the Document Processing System According to this Embodiment (Exemplary Procedures for Generating a Book File)

A book file has the structure and content described above. Next, description will be given about procedures for creating a book file using the book editing application 104 and electronic original writer 102. A book file is created as part of book file edit operations carried out using the book editing application 104.

Figure 7:
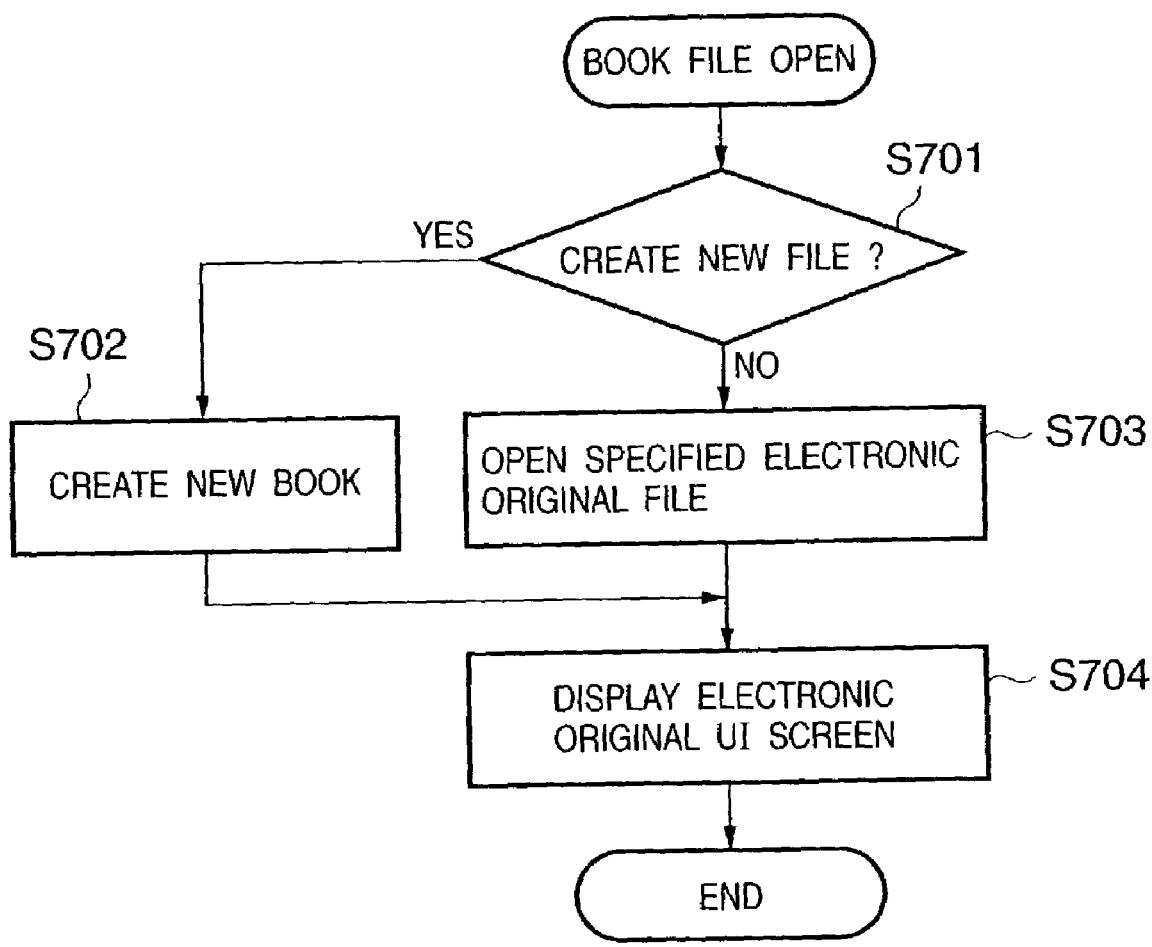
FIG. 7 is a flowchart showing exemplary procedures for opening a book file.

FIG. 7 is a flowchart showing procedures for opening a book file on the book editing application 104.

Figure 8:
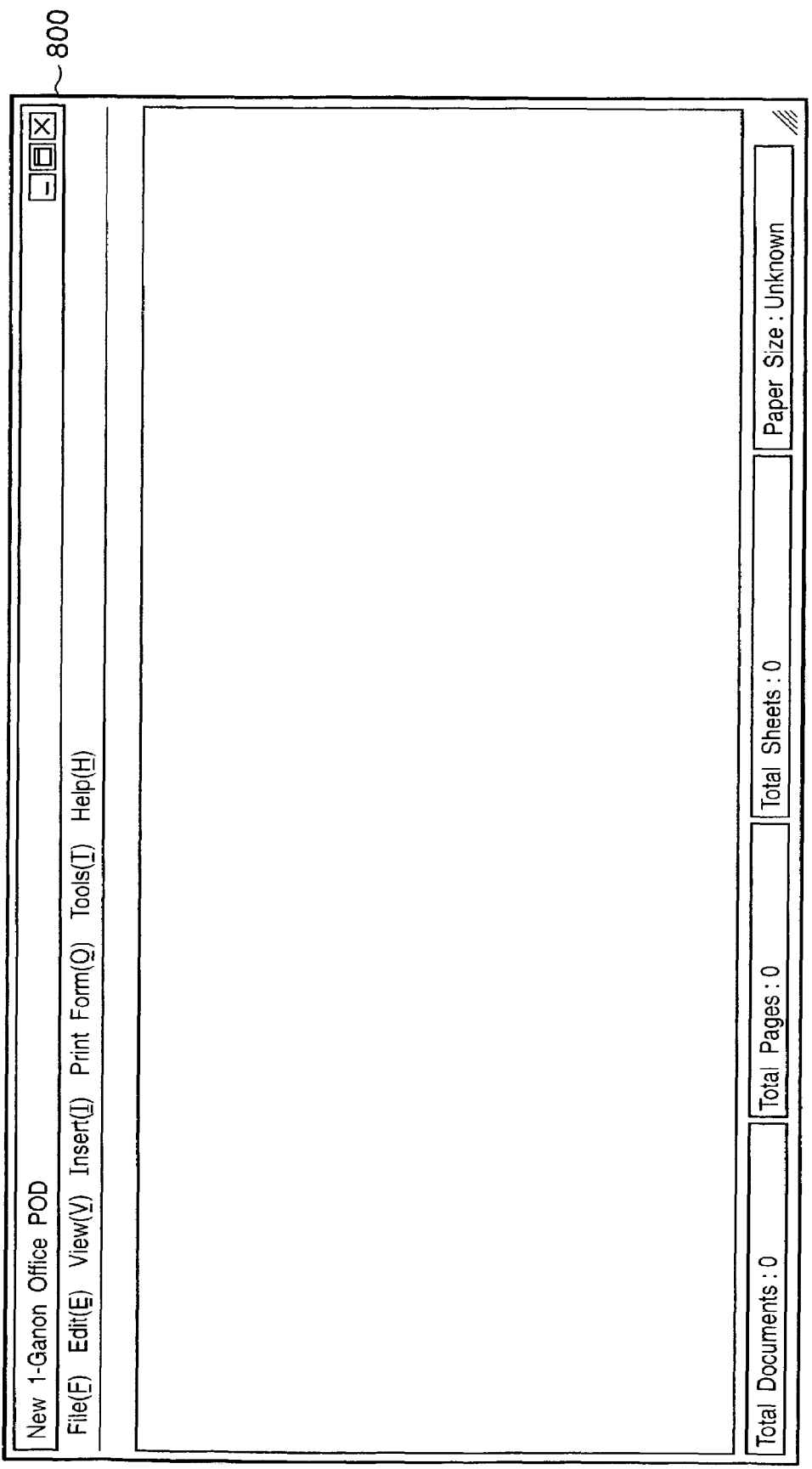
FIG. 8 is a diagram showing an example of user interface screens brought up when a new book file is opened.

First, it is judged whether the book about to be opened is a new one to be created or an existing one (Step S701). If it is a new one, a book file without a chapter is newly created (Step S702). In the example of FIG. 3, the book file created newly has only a book node 401, and does not have a link to a chapter node. Regarding book attributes, a set of attributes prepared in advance for new books are provided. Then, a user interface (UI) screen for editing a new book file is brought up (Step S704). FIG. 8 shows an example of the UI screen brought up when a new book file is created. In this case, since the book file has no substantive content, the UI screen 800 displays nothing.

Figure 9:
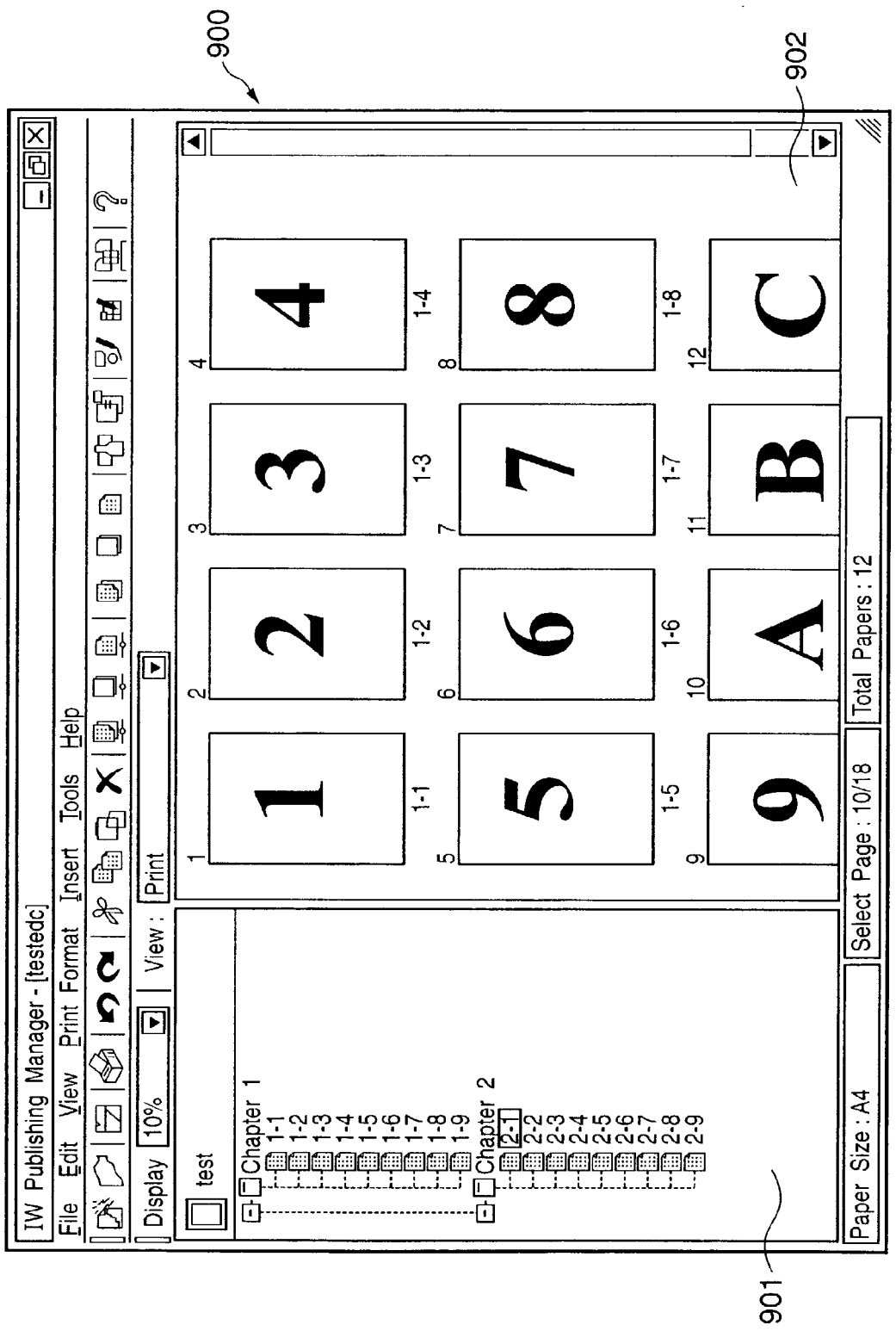
FIG. 9 is a diagram showing an example of user interface screens brought up when an existing book file is opened.

On the other hand, if the specified book file already exists, it is opened (Step S703). Also, a user interface (UI) screen is displayed according to the structure, attributes, and content of the book file. FIG. 9 shows an example of such a UI screen. The UI screen 900 contains a tree section 901 which presents the structure of the book and a preview section 902 which shows how the book will look after printing. The tree section 901 presents the chapters contained in the book and the pages contained in each chapter using a tree structure such as the one shown in FIG. 3. The pages displayed in the tree section 901 are original pages. The preview section 902 displays reduced views of print pages. The order in which they are displayed reflects the structure of the book.

Application data converted into an electronic original file by the electronic original writer 102 can be added as a new chapter to the opened book file. This function is called an electronic original file import function. By importing an electronic original file, a book file newly created according to the procedures in FIG. 7 is given substance. This function is started when application data is dragged and dropped in the screen in FIG. 8 or 9.

Figure 10:
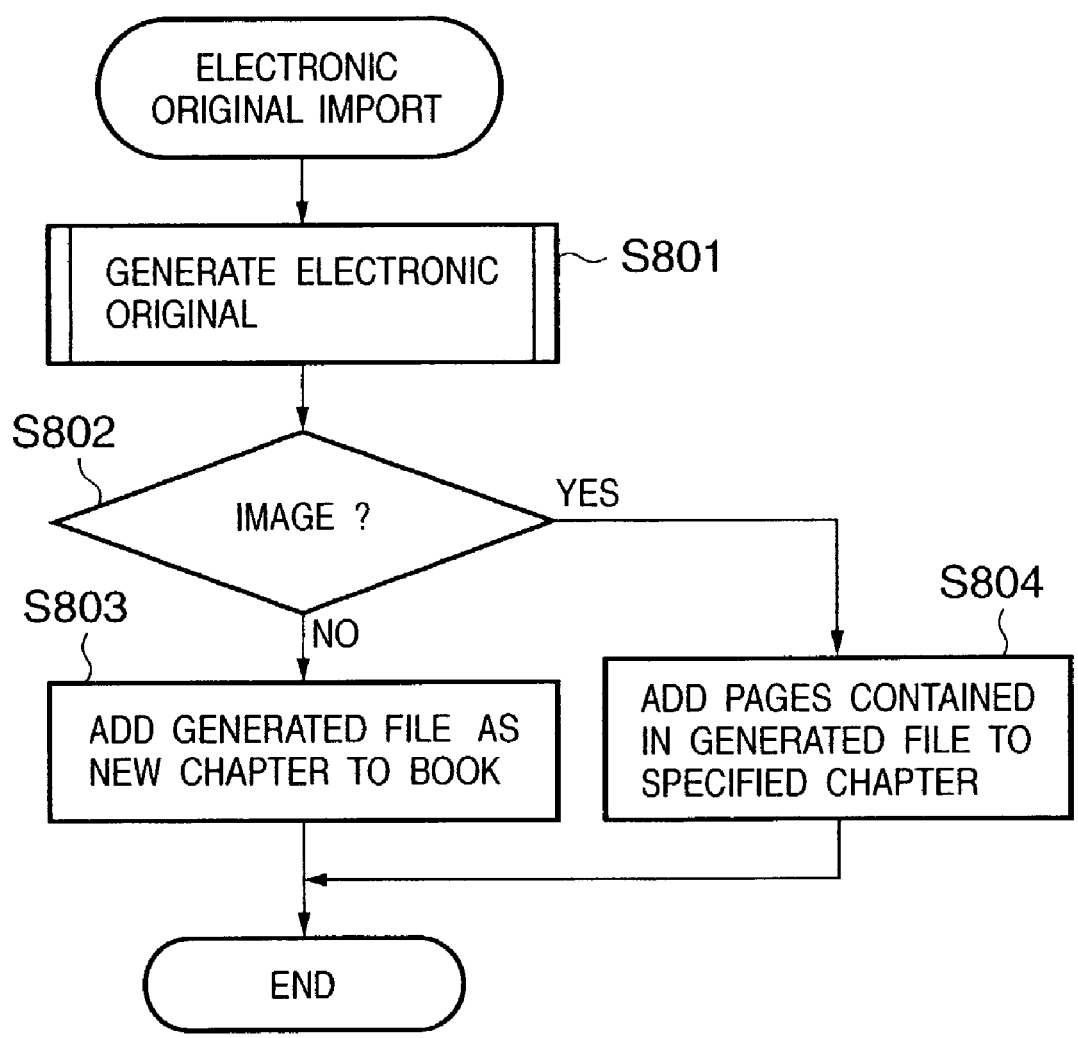
FIG. 10 is a flowchart showing exemplary procedures for importing an electronic original file into a book file.

FIG. 10 is a flowchart showing exemplary procedures for importing an electronic original file.

First, the application program which has created the specified application data is started and is made to convert the application data into electronic original data using the electronic original writer 102 as a device driver (Step S801). When the conversion is completed, it is judged whether the converted data is image data (Step S802). Under a Windows OS, this judgment can be made based on the file extension of the application data as follows. For example, the extension "bmp" indicates Windows bitmap data, "jpg" indicates JPEG-compressed image data, and "tiff" indicates image data in tiff format. In the case of such image data, an electronic original file can be generated directly from image data without starting an application in S801, and thus the process of S801 can be omitted.

If the converted data is not image data, the electronic original file generated in Step S801 is added as a new chapter to the currently open book file (Step S803). Normally, values of chapter attributes are copied from corresponding book attributes, or set to default values in the case of chapter attributes which do not have corresponding book attributes. In this example, however, the user can select whether to give priority to attributes at a lower level, as described later.

If the converted data is image data, no new chapter is added as a rule, but the pages contained in the electronic original file generated in Step S801 are added to a specified chapter (Step S804). However, in the case of a new book file, a new chapter is created and the pages of the electronic original file is added as pages belonging to that chapter. Normally, page attributes inherit values from corresponding attributes at an upper level, or from attributes defined in application data if such attributes have been taken over by an electronic original file. For example, if N-up printing has been specified in application data, the value of this attribute is inherited. This is how a new book file is created or new chapter is added. In this example, however, the user can select whether to give priority to attributes at a lower level, as described later.

Figure 11:
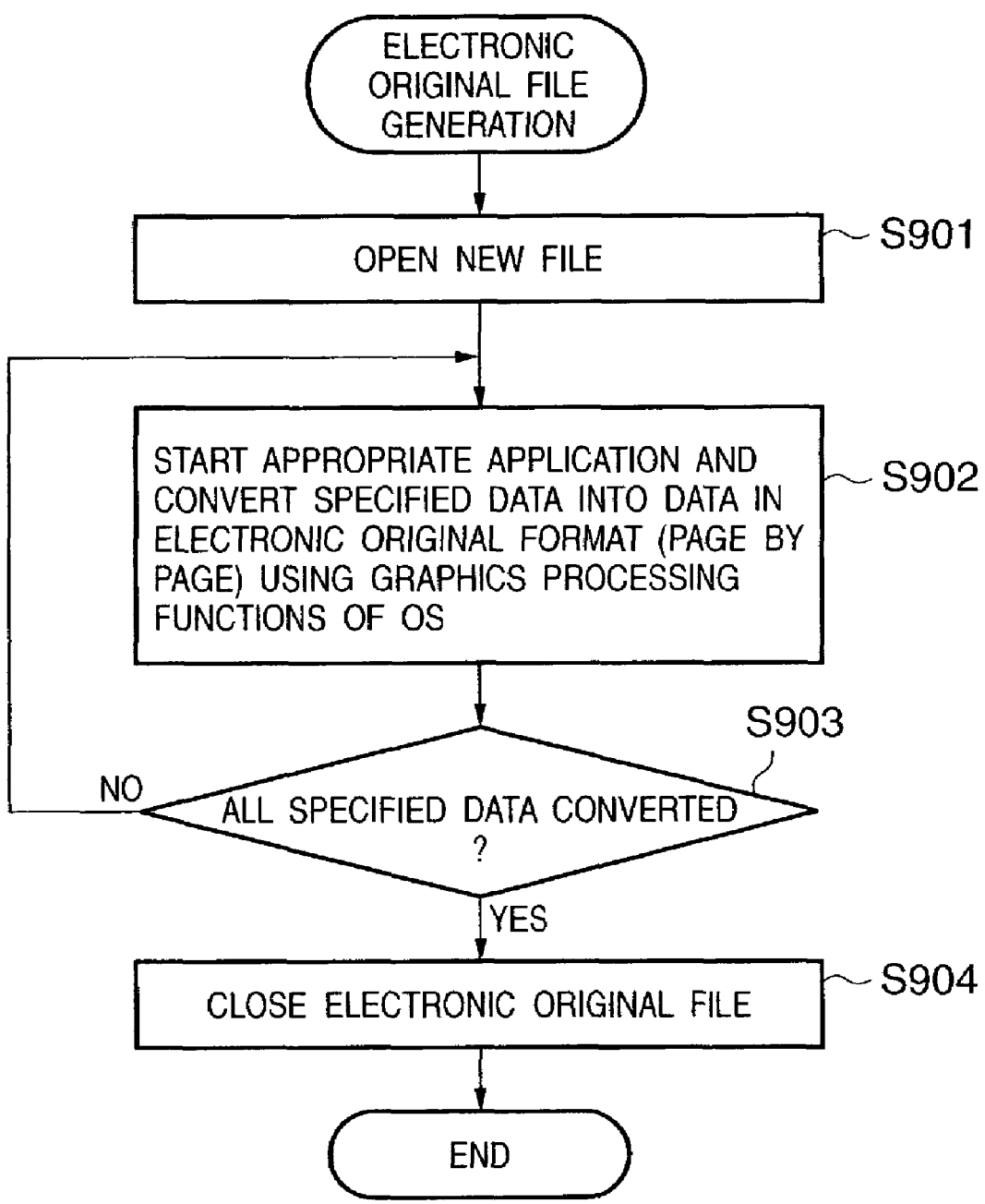
FIG. 11 is a flowchart showing exemplary procedures for converting application data into an electronic original file in Step 801 in FIG. 10.

FIG. 11 is a flowchart showing procedures for generating an electronic original file using the electronic original writer 102 in Step 801 in FIG. 10.

First, a new electronic original file is created and opened (Step S901). The application program which corresponds to the specified application data is started and is made to send an output command to the output module of the OS using the electronic original writer 102 as a device driver. The output module converts the received output command into data in electronic original format using the electronic original writer and outputs the resulting data (Step S902) to the electronic original file opened in Step S901. It is judged whether all the specified data has been converted (Step S903). If it has been, the electronic original file is closed (Step S904). The electronic original file generated by the electronic original writer 102 contains substance of the electronic page data shown in FIG. 3.

(Examples of Book File Edit Operations)

As described above, a book file can be created from application data. The following edit operations can be performed on the chapters and pages of the generated book file.

(1) Add Newly
(2) Delete
(3) Copy
(4) Cut
(5) Paste
(6) Move
(7) Change Chapter Name
(8) Reassign Page Number/Name
(9) Insert Cover
(10) Insert Slip Sheet
(11) Insert Tab Sheets
(12) Lay Out Original Page Besides, an operation for canceling an edit operation and operation for undoing a cancel operation are available. These edit functions allow the user, for example, to merge book files, rearrange chapters or pages in a book file, delete chapters or pages from a book file, change a original page layout, insert slip sheets or tab sheets, and so on. Results of these operations are reflected in attributes shown in FIGS. 4 to 6 or the structure of the book file. For example, if an Add Newly operation of a blank page is performed, a blank page is inserted in a specified location. Then, the blank page is treated as a original page. Also, if the layout of original pages is changed, the changes are reflected in the Print Method, N-Up Printing, Front/Back Cover, Tab Sheet, Slip Sheet, and Chapter Break attributes.

Display and operations during editing in this example will be described in detail below.

(Example of Book File Output)

The final aim of the book file created and edited in the manner described above is printout. When the user selects File menu on the UI screen 900 of the book editing application shown in FIG. 9 and then selects Print from the File menu, the book is printed using a specified output device as follows. First, the book editing application 104 creates a job ticket on the currently open book file and passes it to the electronic original despooler 105. The electronic original despooler 105 converts the job ticket into an output command of the OS, for example, into a Windows GDI command, and sends it to an output module, for example, to GDI. The output module generates a command compatible with the device using the specified printer driver 106 and sends the device the generated command.

A graphic engine of the output module (not shown) loads the appropriate printer driver 106 for the given printer into the RAM 202 from the external memory 211 and sets the output to the printer driver 106. The output module converts the received GDI (Graphic Device Interface) function into a DDI (Device Driver Interface) function and outputs the DDI function to the printer driver 106. The printer driver 106 converts the DDI function received from the output module into a control command recognizable by the printer, for example, into a PDL (Page Description Language) command. The resulting printer control command is output to the printer 107 via a system spooler loaded into the RAM 202 by the OS and then thorough the interface 21.

The job ticket described above is data about a structure made up of original pages, the smallest unit. The job ticket structure defines the layout of original pages on paper. One job ticket is issued per job. At the top level is a node called document, which defines the attributes of the entire document such as Simplex/Duplex. Under the document node are paper nodes, which contain attributes that specify an identifier of paper to be used, a paper source of a printer, etc. Under each paper node are sheet nodes, which represent sheets of the given paper to be printed. A sheet corresponds to a single sheet of paper. Under each sheet are print pages (physical page). In the case of simplex printing, one physical page belongs to one sheet while in the case of duplex printing, two physical pages belong to one sheet. Under each physical page are original pages to be laid out on the physical page. The attributes of physical pages include Original Page Layout.

Figure 12:
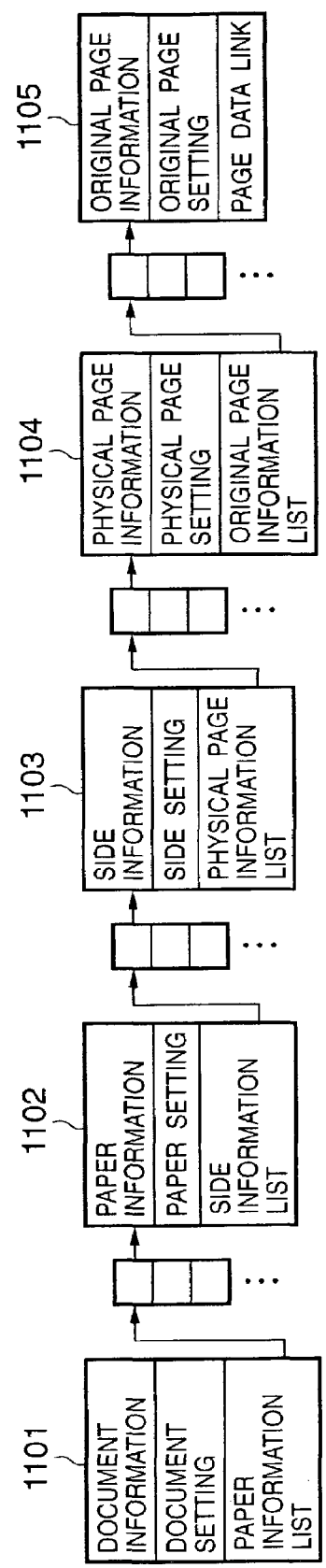
FIG. 12 is a diagram showing an exemplary data structure for use in print and display operations.

A sample data structure of a job ticket is shown in FIG. 12. In print data, a document consists of a set of sheets of paper. Each sheet of paper consists of two sides: the front and back sides. Each side has an area (physical page) for laying out a original. Each physical page is made up of original pages, which are the smallest units. Reference numeral 1101 denotes data which corresponds to a document. This data consists of data related to the entire document, and a list of paper information about the paper composing the document. The paper information 1102 consists of information such as paper size, and a list of side information about the sides placed on the paper. The side information 1103 consists of data unique to the sides, and a list of physical pages placed on the sides. Physical page information 1104 consists of information about the size of physical pages, headers, footers, etc.; and a list of original pages composing physical pages.

The electronic original despooler 105 converts the job ticket into an output command for the output module.

(Sample Content of Preview Display)

As described earlier, when a book file is opened by the book editing application, the user interface screen 900 shown in FIG. 9 appears. The tree section 901 displays a tree which represents the structure of the open book. The preview section 902 provides any of three display methods according to user's specification. The first method is a mode called original view for displaying the original as it is. It displays the original pages which belong to the open book in a reduced size. Layout is not reflected in the preview display. The second method is a print view mode, which displays original pages in the preview section 902, reflecting the layout of the original pages. The third method is a simplified print view mode, which reflects only the layout in the preview display, and not the content of original pages.

Exemplary Configuration of Another Document Processing System

The document processing system according to the above embodiment is a stand-alone type. A server/client system, an extended version of the above system, also creates and edit book files according to similar configuration and procedures. However, book files and printing processes are managed by a server.

Figure 13:
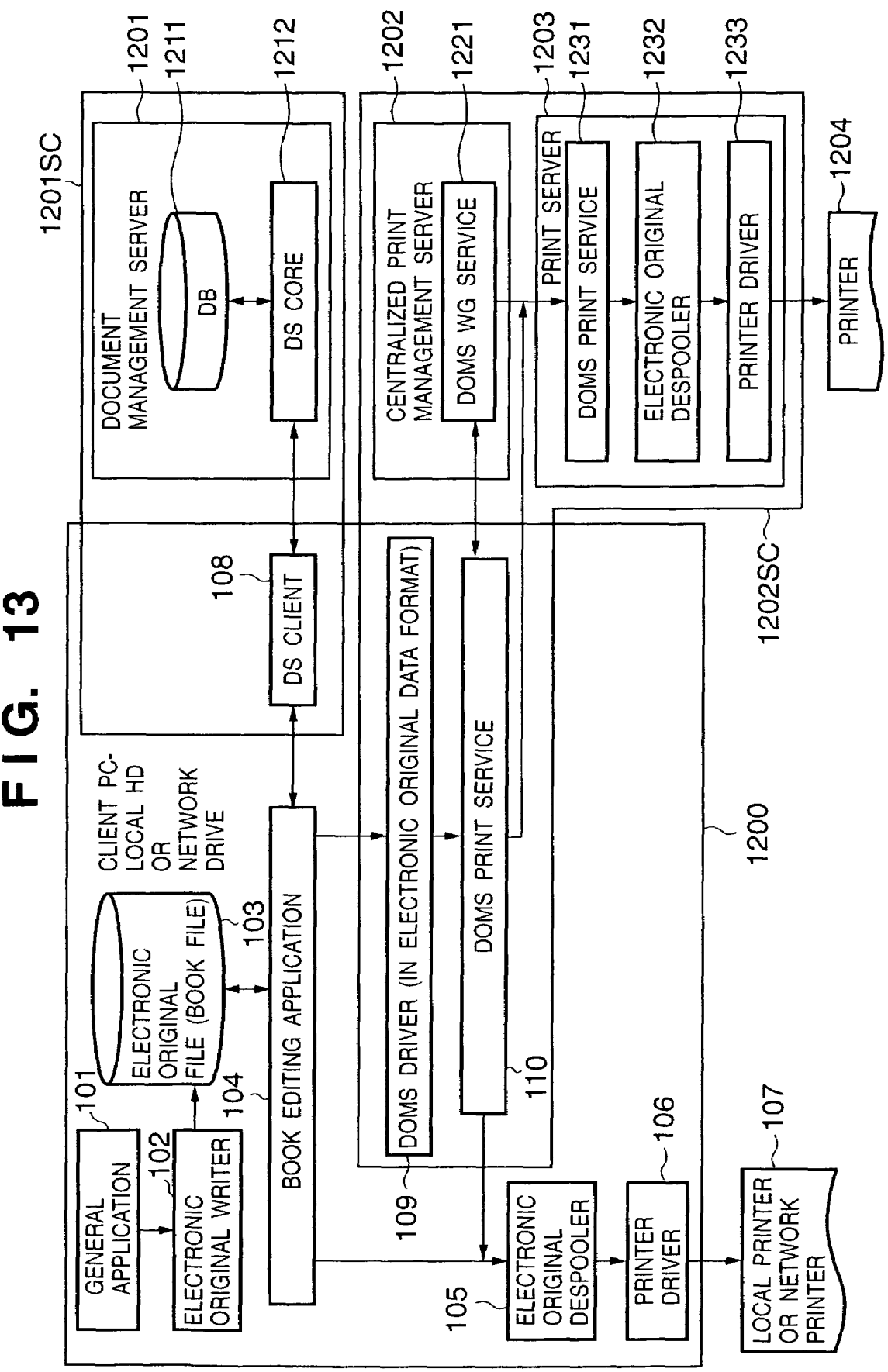
FIG. 13 is a block diagram showing an exemplary software configuration of a client/server document processing system.

FIG. 13 is a block diagram showing a configuration of a server/client document processing system.

A client document processing system consists of a DOMS (Document Output Management Service) driver 109 which is a client module, a DOMS print service module 110, and a DS (Document Service) client module 108 in addition to a stand-alone system. The client document processing system 1200 is connected with a document management server 1201, a centralized print management server 1202, and a print server 1203. These servers are normally connected to the client document processing system via a network, but if they function as clients at the same time, they are connected to the client document processing system by means of interprocess communication which simulates internetwork communication. Incidentally, although both document management server 1201 and centralized print management server 1202 are connected to the client in FIG. 13, there may be a case in which only one of them exists on a network. When the document management server is connected, a document management server/client module system 1201SC which includes a client module of the document management server will be added to the stand-alone document management system, and when the centralized print management server 1202 is connected, a document management server/client module system 1202SC which includes a client module of the print management server will be added.

The document management server 1201 stores the book files created and edited by the book editing application 104. The book files managed by the document management server 1201 are stored in a database 1211 of the document management server 1201 instead of or in addition to local HDs of client PCs. Book files are saved and called to/from the document management server 1201 by the book editing application 104 via the DS client 108 and a DS core 1212.

The centralized print management server 1202 controls the printing of the book files stored in the client document processing system 1200 or in the document management server 1201. A print request from a client is sent to a DOMS WG server module 1221 of the centralized print management server 1202 via the DOMS driver 109 and DOMS print service module 110. The centralized print management server 1202 passes electronic original data to the electronic original despooler 105 via the DOMS print service module 110 of the client when printing the data on the client's printer, or sends the electronic original data to a DOMS print service module 1231 of the print server 1203 when printing the data on the print server 1203. The centralized print management server runs security checks, for example, on qualification of the user who requested a stored book file to be printed, and keeps a log of printing processes. Thus, the document processing system may be implemented both as stand-alone and client/server systems.

Examples of Edit Operations in Document Processing System According to this Embodiment FIG. 9 shows an operating screen of the book editing application 104. The book editing application allows function setting of a printer such as stapling as well as edit operations such as alteration of page order, duplication, and deletion. Also, it allows a specified printer to be used for printing. The left area in FIG. 9 presents a tree view which shows the structure of a document. The document consists of a set of chapters and each chapter consists of a set of original pages. The right area in FIG. 9 presents print previews of individual pages.

Example of Attribute Setting in Document Processing System According to this Embodiment FIG. 14 shows a "Document Detail Setting" window 1400 of the book editing application 104.

This window allows the user to display the "document setting information 403" and make settings for it. This window is invoked from a "Detailed Setting for Document" menu under a Print Form menu or from a "Detailed Setting for Document" button on the toolbar in the operating screen of the application in FIG. 9. The "Document Detail Setting" window is used to make settings for attributes which affect the entire document. It consists of four sheets: Page Setup, Decoration, Edit, and Paper Source. FIG. 14 shows the window with the Page Setup sheet displayed. The Page Setup sheet allows the user mainly to make layout settings and specify settings such as paper size, paper orientation, and N-up printing. Also, the window contains check box controls 1401 and 1402 related to zooming.

Figure 15:
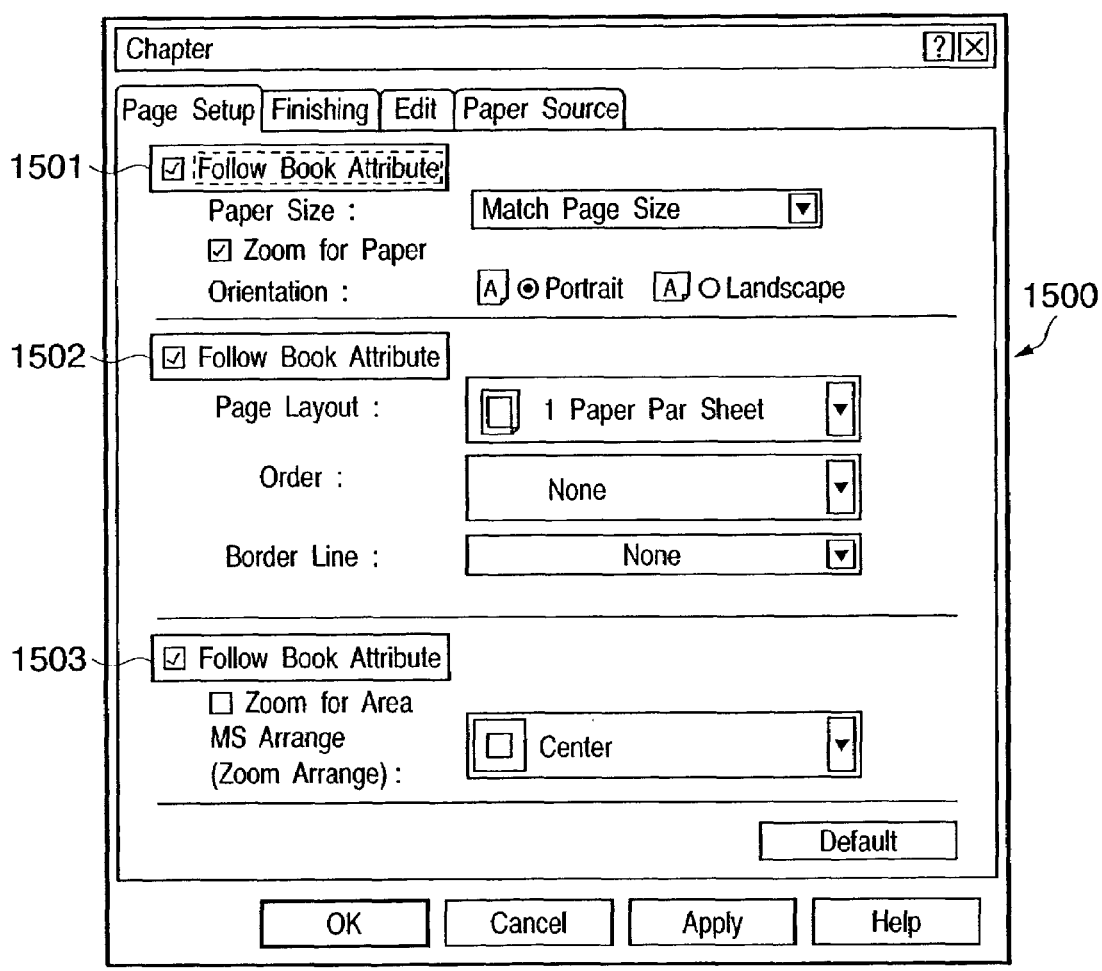
FIG. 15 is a diagram showing an exemplary dialog window for use in making settings for chapters at the middle level of the data structure.

FIG. 15 shows a "Chapter Detail Setting" window 1500 of the book editing application 104.

Figure 16:
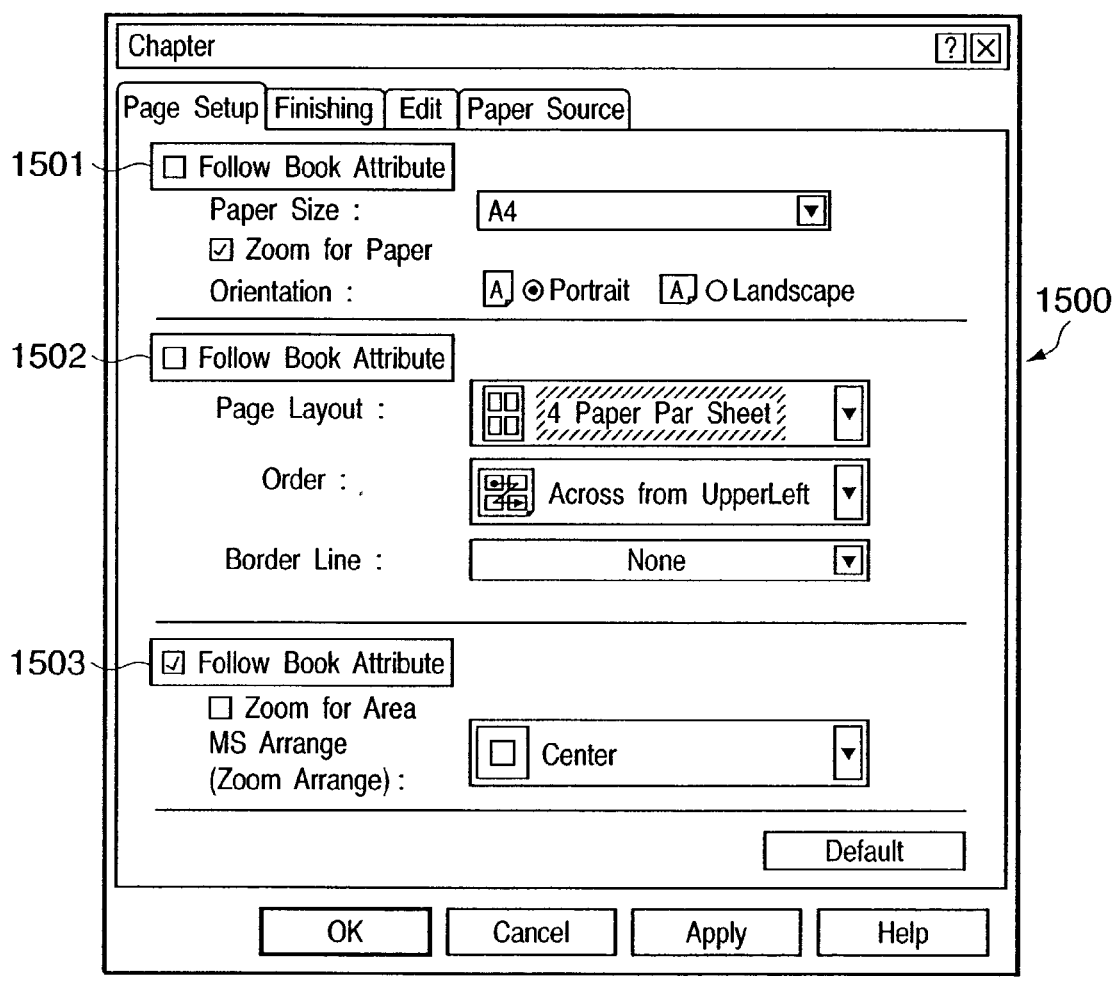
FIG. 16 is a diagram showing an example of the dialog window in which unique attributes have been specified.

This window allows the user to display the "chapter setting information 407" and make settings for it. This window is invoked from a "Detailed Setting for Chapter" menu under a Print Form menu or from a "Detailed Setting for Chapter" button on the toolbar in the operating screen of the application in FIG. 9. The "Chapter Detail Setting" window is used to make settings for attributes unique to each chapter. It consists of four sheets: Page Setup, Decoration, Edit, and Paper Source. FIG. 15 shows the window with the Page Setup sheet displayed. The Page Setup sheet allows the user mainly to make layout settings unique to each chapter and specify settings such as paper size, paper orientation, and N-up printing. For the items which are contained in both "Document Detail Setting" and "Chapter Detail Setting" windows, "Follow Book Attribute" check box controls 1501, 1502, and 1503 are provided. Regarding the item groups whose check boxes are marked, the set values for the document also apply to the chapter. A case in which check boxes are deselected is shown in FIG. 16. There are two cases in which settings are made independently at the chapter level: a case in which there are items unique to chapters and a case in which set values different from those at the upper, book level are retained at the chapter level.

FIG. 16 shows the "Chapter Detail Setting" window with the check box controls 1501 and 1502 deselected. In this case, even if a paper size other than A4 is used for the overall document, the A4 paper size is used for the pages composing this chapter. Also, regarding layout, even if 1 Page per Sheet is specified for the overall book, 4 Pages per Sheet is specified for this chapter. Regarding "MS Arrange," since the check box has been selected, set values on the upper, document level are used as set values for this chapter.

Figure 17:
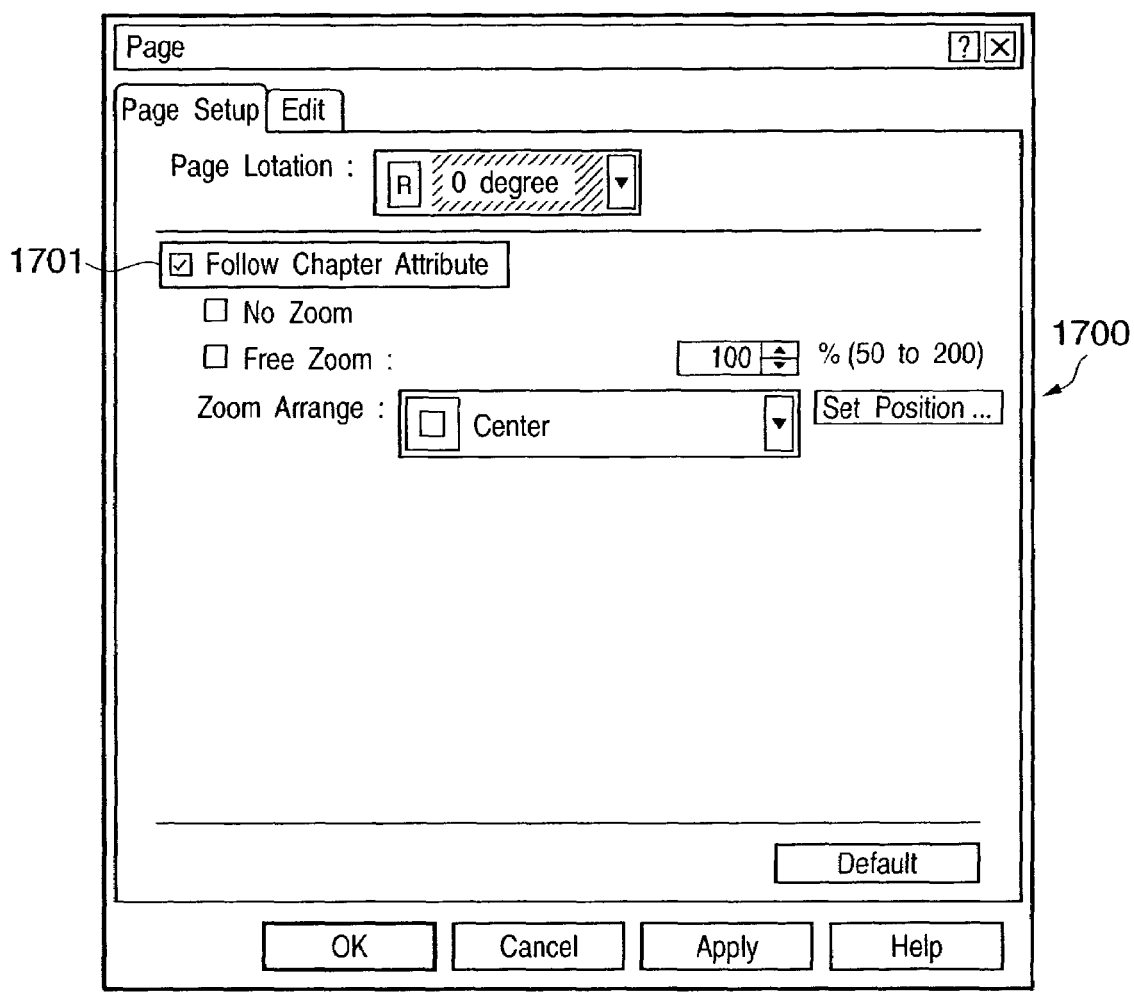
FIG. 17 is a diagram showing an exemplary dialog window for use in making settings for pages at the bottom level of the data structure.

FIG. 17 shows a "Page Detail Setting" window 1700 of the book editing application 104.

This window allows the user to display the "page setting information 411" and make settings for it. This window is invoked from a "Detailed Setting for Page" menu under a Print Form menu or from a "Detailed Setting for Page" button on the toolbar in the operating screen of the application in FIG. 9. The "Page Detail Setting" window is used to make settings for attributes unique to each page. It consists of two sheets: Page Setup and Edit. FIG. 17 shows the window with the Page Setup sheet displayed. The Page Setup sheet allows the user mainly to make layout settings unique to each page and specify settings such as a rotation angle and magnification for use in laying out the original page. For the items which are contained in both "Chapter Detail Setting" and "Page Detail Setting" windows, a "Follow Chapter Attribute" check box control 1701 is provided. Regarding the item groups whose check boxes are marked, the set values for the chapter also apply to the page. A case in which the check box is deselected is shown in FIG. 18.

Figure 18:
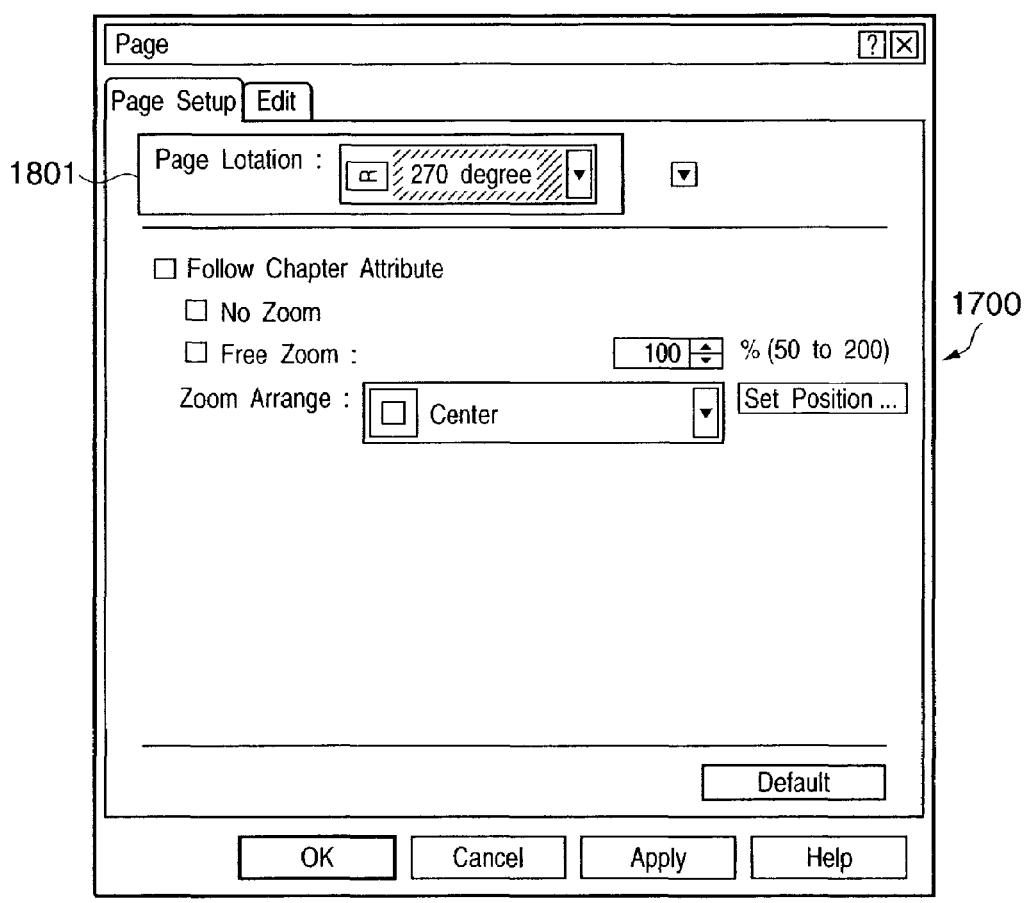
FIG. 18 is a diagram showing an example of how settings are changed on the dialog window of FIG. 17.

FIG. 18 shows the "Page Detail Setting" window after the Page Rotation setting has been changed on the window in FIG. 17. The setting of the control 1801 indicates that the original page is to be rotated so as to lie on its left side. This item is not provided with a "Follow Chapter Attribute" check box, meaning that the same item does not exist at the chapter or document level. Thus, the setting of this item in this window always applies to this page. Regarding items such as "Arrange" whose check box 1701 is marked, the same item also exists at the chapter level, and thus the set value for the chapter is adopted as the set value for the page. If the corresponding item "Arrange" at the chapter level has its "Follow Book Attribute" checked, the set value on the higher, book level is used as the set value for the chapter, and consequently the set value on the book level applies to the page. If the corresponding item on the chapter level is unchecked, the chapter has a unique set value, which applies to the page.

Incidentally, information about the check box controls set on the setting screens described above may be retained in a dedicated area, but preferably it is retained as one of attributes in the appropriate setting information shown in FIG. 3. In the latter case, an area for retaining check box control information will be added to FIGS. 5 and 6.

Figure 19:
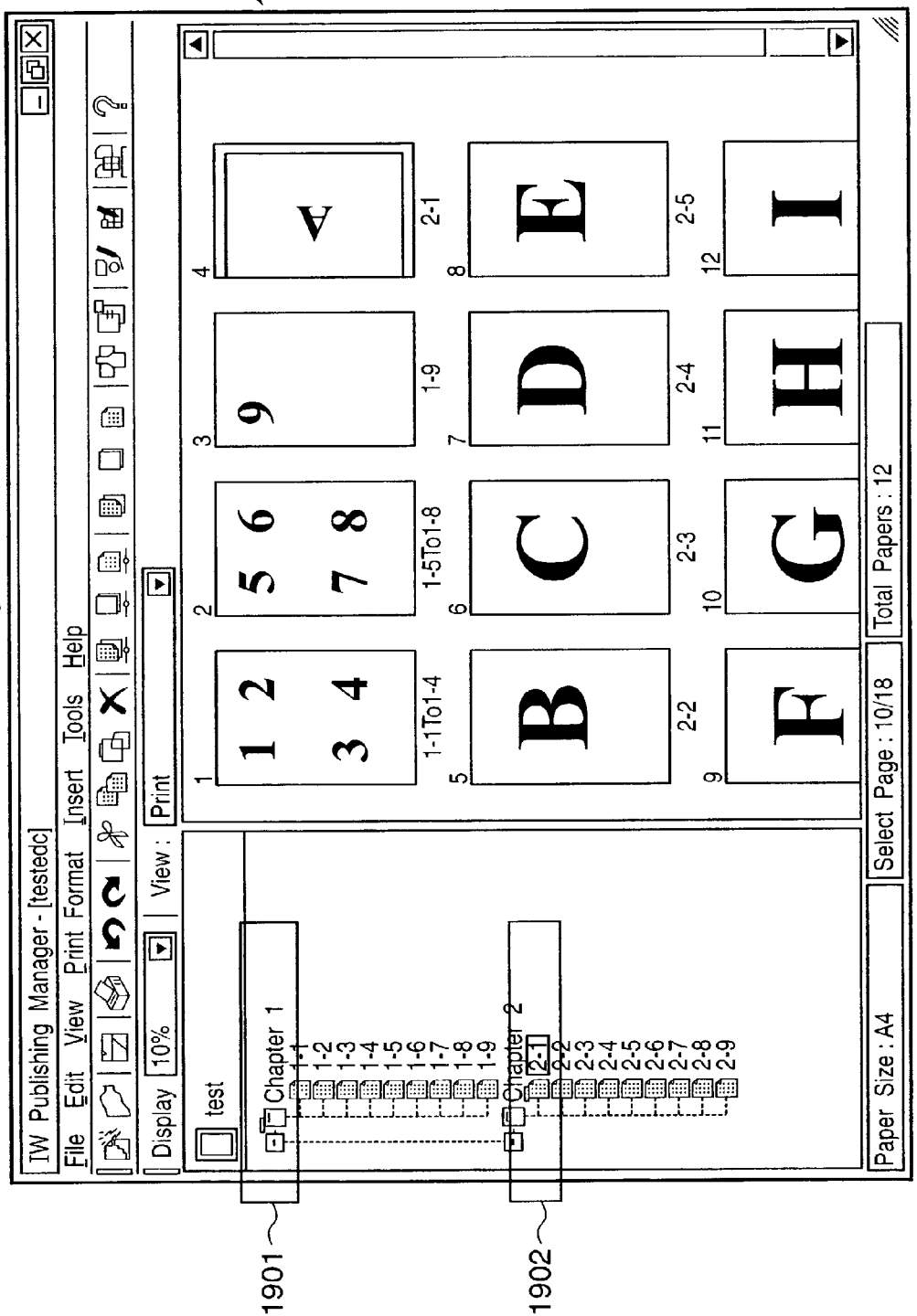
FIG. 19 is a diagram showing a display example after settings unique to chapters and pages have been made.

Display Example of Document Editing in Document Processing System According to this Embodiment FIG. 19 shows the application's display format used when set values at an upper level is not used for items which overlap with those at the upper level, i.e., when the check box control 1501 or 1701 is deselected.

In the example of FIG. 19, a document consists of two chapters and each chapter consists of nine pages. This is a display example which results when 4-up (also known as 4-in-1) is specified for the layout of the first chapter and rotation is specified for the first page of the second chapter (tenth page of the document). It can be seen that four originals each are laid out on pages 1 to 3 and that the character "A," the data on page 4, is rotated. Now referring to a display format which results when a setting unique to a chapter or page is specified in the tree view, the icon 1901 changes for the first chapter indicating that an independent setting has been made for this chapter and the icon 1902 changes for the first page of the second chapter indicating that an independent setting has been made for this page.

FIGS. 20 and 21 are diagrams illustrating operations of inserting an entire file or copying and pasting part of a file in this system.

FIG. 20A shows Document Awhile FIG. 20B shows Document B. Consider a case where Chapter C 2001 is copied and pasted from Document B to Document A. Suppose Document A has a 2-up layout while Document B has a 4-up layout.

Figure 20C:
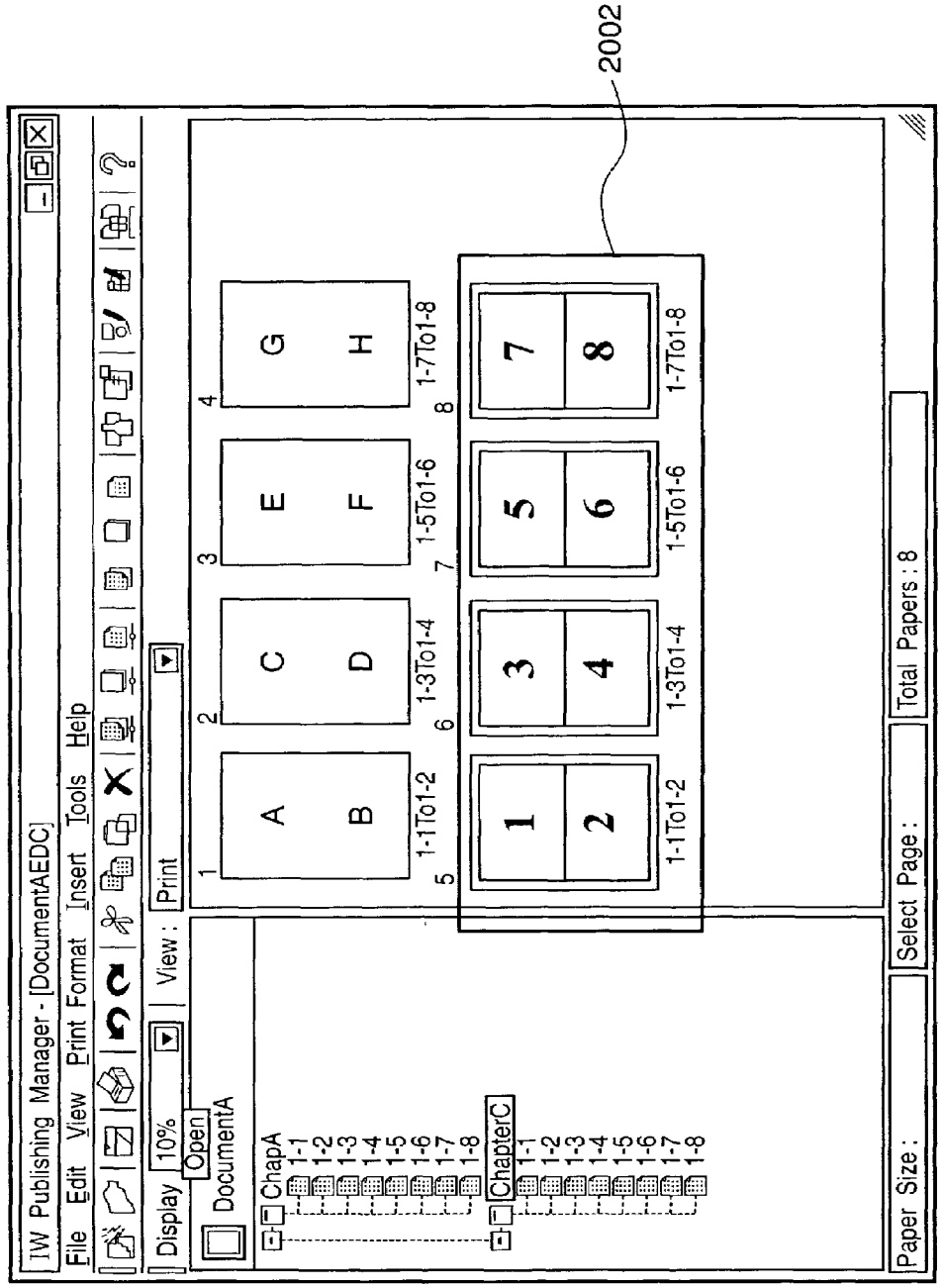
FIG. 20C is a diagram showing an example of copy and paste results when there is no unique setting.

FIGS. 20A to 20D show examples in which no setting unique to Chapter C has been made. When pasting Chapter C, there are two possible cases:

1. Chapter C conforms to the settings of the document to which it belongs. In this case, as can be seen from 2002 in the figure, Chapter C is laid out according to the 2-up setting of Document A, the destination of pasting (FIG. 20C).
2. Chapter C retains the 4-up setting of the source Document B. In this case, as can be seen from 2003 in the figure, Chapter C is laid out according to its original 4-up setting, independent of the destination document (FIG. 20D).

Figure 21A:
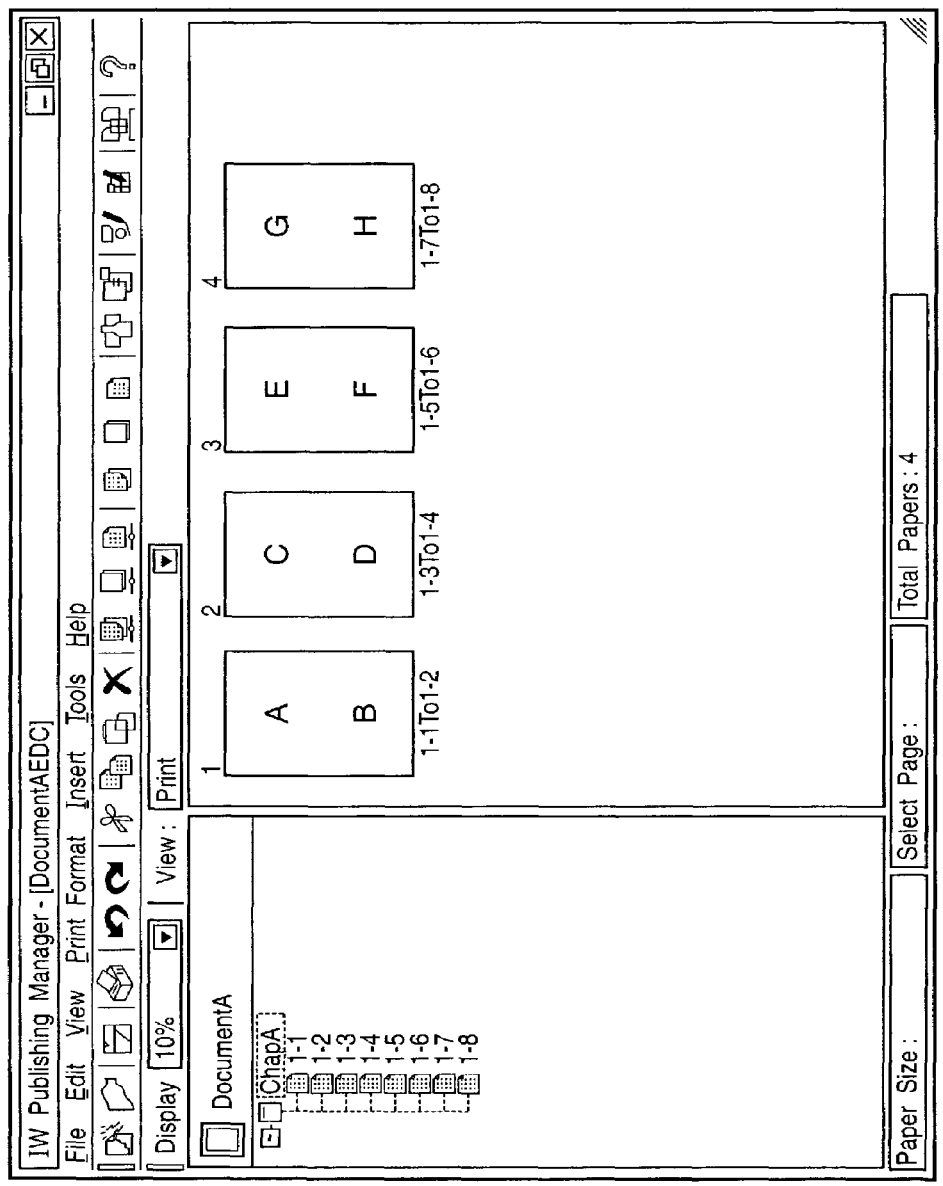
FIG. 21A is a diagram showing an example of a document to be copied and pasted.
Figure 21B:
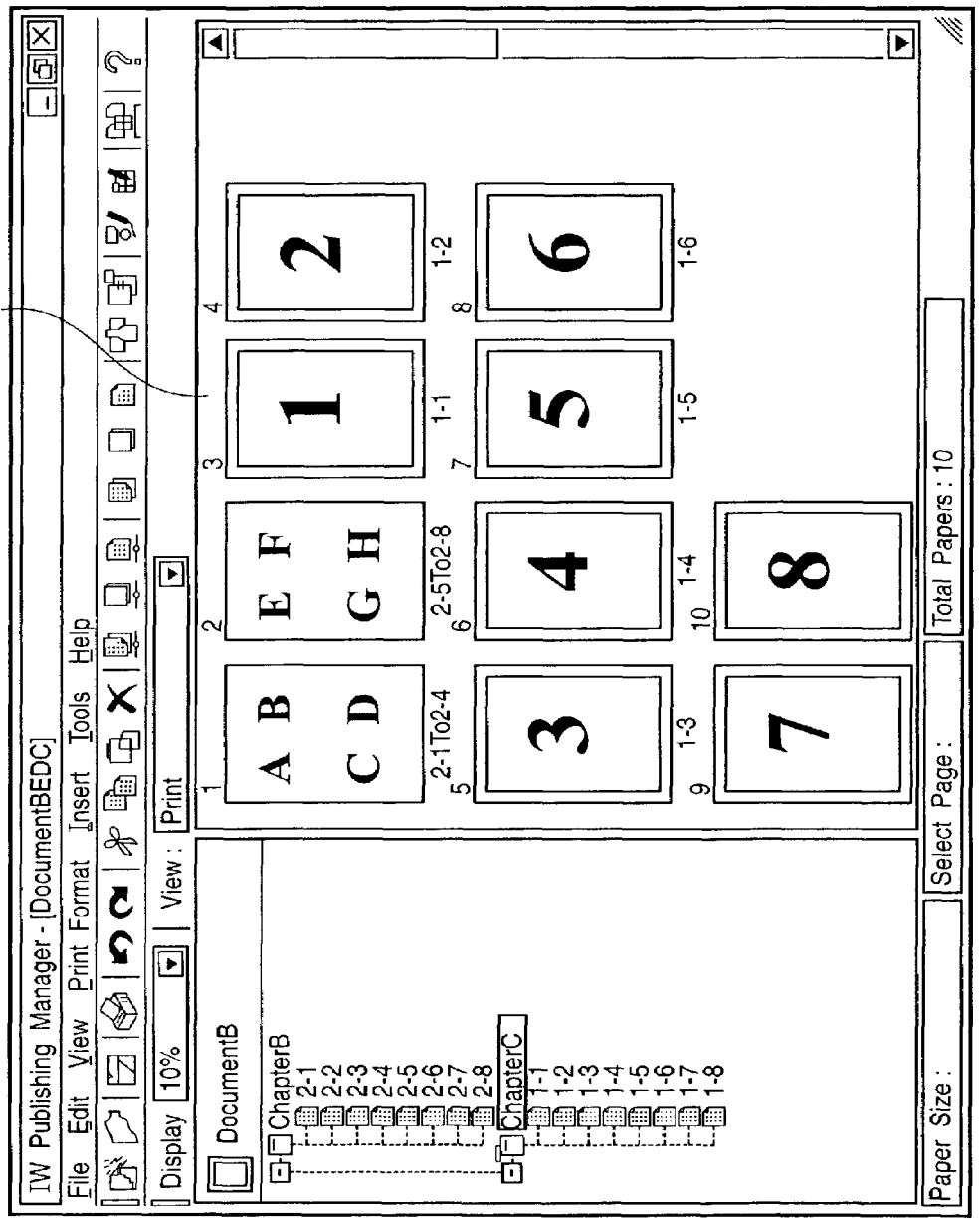
FIG. 21B is a diagram showing an example of a document to be copied and pasted when it has unique settings.
Figure 21C:
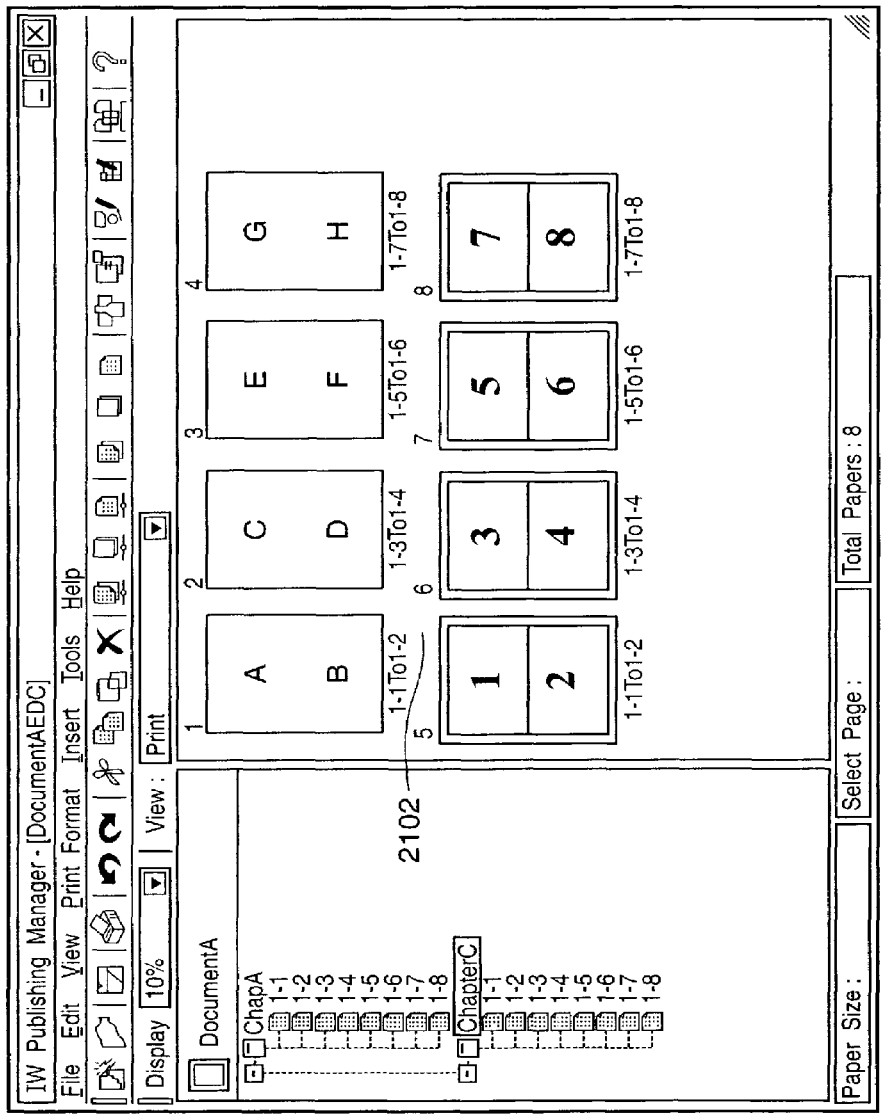
FIG. 21C is a diagram showing an example of copy and paste results when there are unique settings.
Figure 21D:
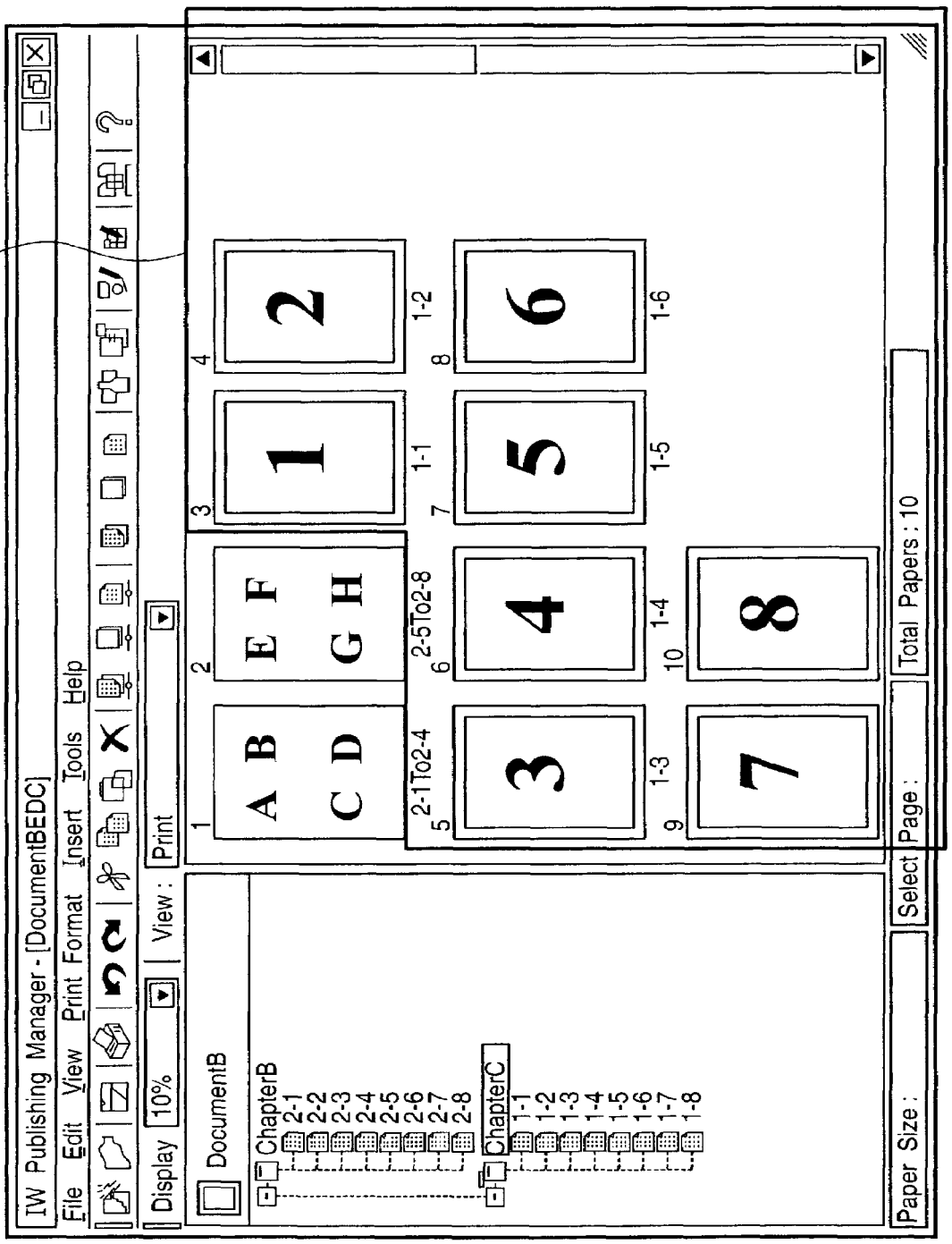
FIG. 21D is a diagram showing an example of copy and paste results when there are unique settings.
Figure 21E:
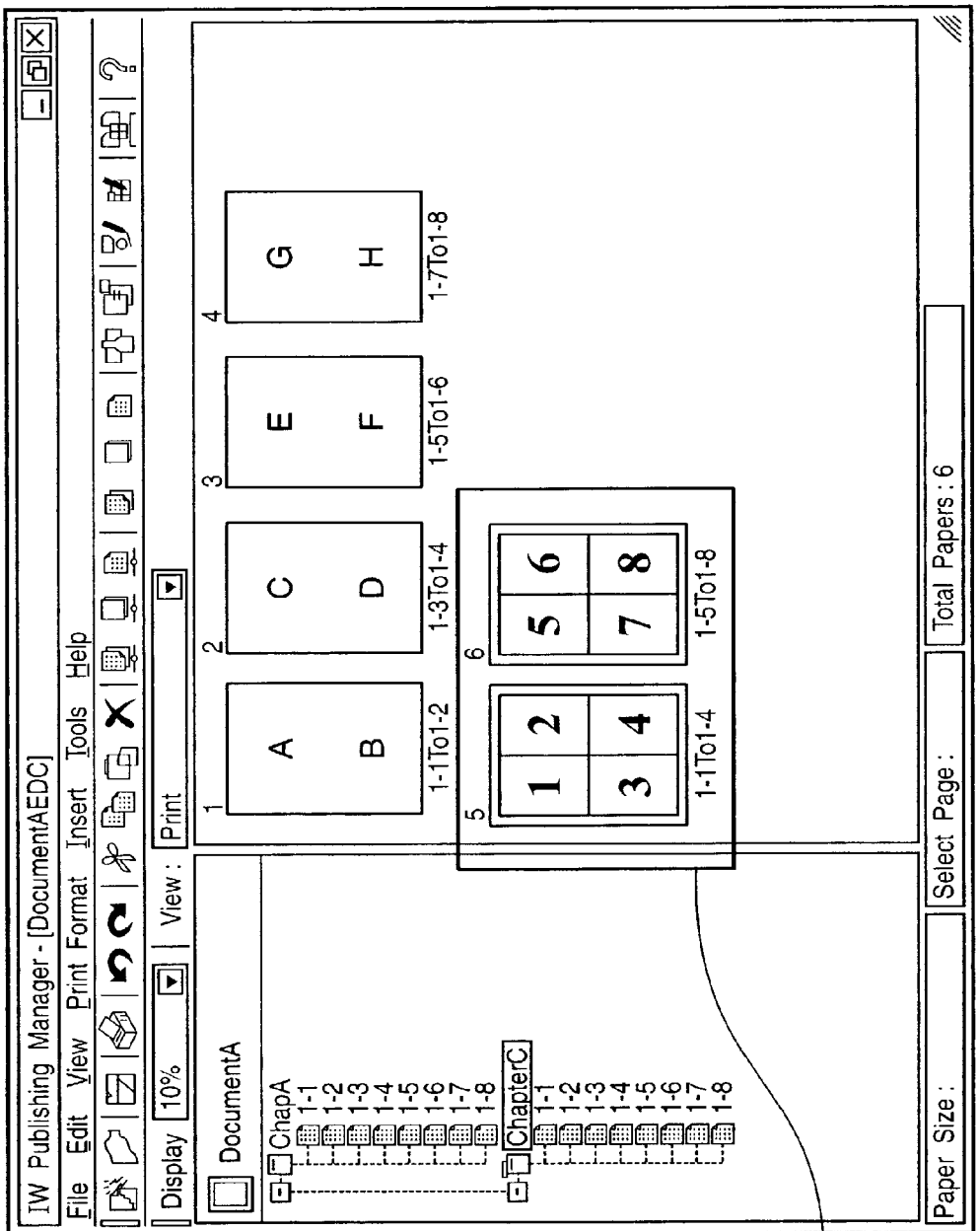
FIG. 21E is a diagram showing an example of copy and paste results when there are unique settings.

FIGS. 21A to 21E show examples in which settings unique to Chapter C have been made. As shown in FIG. 21B, it is assumed that 1-up setting has been specified for Chapter C 2101. When pasting Chapter C to Document A, there are three possible cases:

1. Chapter C 2102 takes over the 2-up setting of Document A (FIG. 21C)
2. Chapter C 2103 retains its original 1-up setting even after it is placed in Document A (FIG. 21D).
3. Chapter C 2104 inherits and retains the 4-up setting of the source Document B. In this case, Chapter C is laid out according to the 4-up setting, regardless of the 2-up setting of Document A (FIG. 21E).

However, it is hardly conceivable that the third case will be used normally because it is confusing to retain the invisible setting of Document B.

Exemplary Procedures for Document Editing in the Document Processing System According to this Embodiment Next, description will be given about a process flow for inserting an entire file or copying and pasting part of a file.

(Copying Procedures)

FIG. 22 is a flowchart outlining a copying process in a copy-and-paste operation. For a copy-and-paste operation, two methods are available: one involves determining a format before copying, and the other involves copying as much information as possible and selecting a format before pasting. The latter method is used in this example. To increase the selection of pasting formats, this method copies as much data as possible except data unnecessary for pasting. By copying the document structure shown in FIG. 3 almost in its entirety with its hierarchical structure retained, this method offers a wide choice during pasting.

First, in Step S1401, document information 401 about the source document is copied. It is more efficient not to copy the file name and other unnecessary data. Next, the flow goes to Step S1402, where necessary chapters are added to the chapter list 404. When a document file is added, all the chapters are added. In the case of Copy & Paste or Drag & Drop with the mouse, selected chapters are added. If chapters are selected, all the selected chapters are added, and if a page is selected, the chapter which contains the selected page is added. Then, the flow goes to Step S1403, where chapter information about the chapters added in Step S1402 are copied from the corresponding chapters of the source document. Again, it is possible to increase efficiency by avoiding to copy unnecessary information. Next, the flow goes to Step S1404, where the pages composing the chapters are added to a page list in the chapter information copied in Step S1402. Again, it is sufficient to add only necessary pages. Next, the flow goes to Step S1405, where page information about the added pages are copied from the source document.

(Pasting Procedures)

Figure 23:
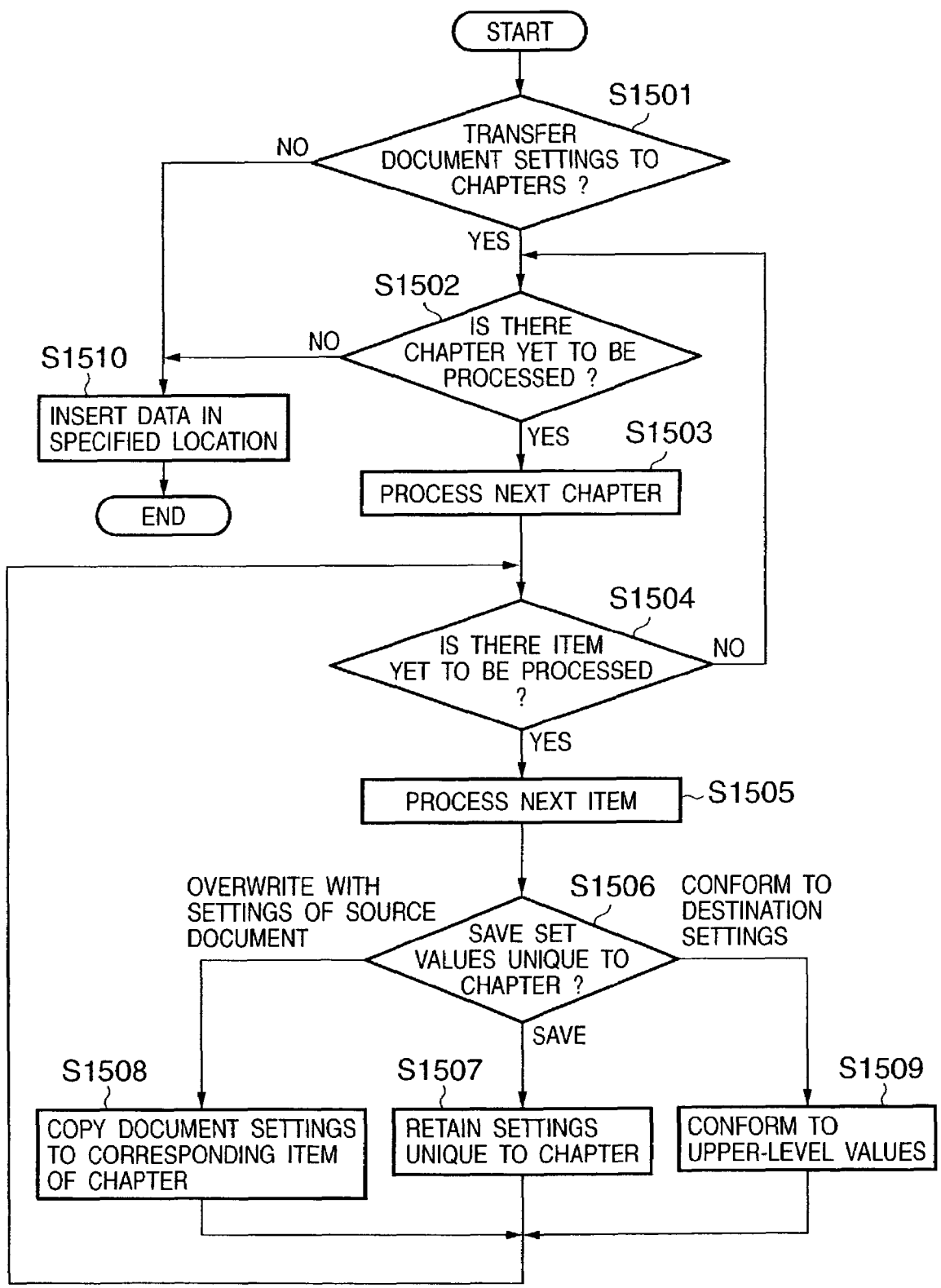
FIG. 23 is a flowchart showing an exemplary process of pasting an entire document.

FIG. 23 is a flowchart showing a process of pasting an entire document (insertion of a document).

First, it is judged in Step S1501 whether to transfer the settings of the document at the top level to settings of its lower-level components, chapters. If data is to be pasted in the format shown in FIG. 21E, the settings of the source documents are copied to chapter settings. If it is judged that document settings will not be transferred to chapter settings, there is no need to transfer the upper-level settings to the lower level, and thus the flow goes to Step S1510, in which the copied data is pasted directly. If it is judged in Step S1501 that document settings will be transferred to chapter settings, the flow goes to Step S1502. In Step S1502, to see whether an end-of-loop condition has been met, it is judged whether all the copied chapters have been processed. If all the chapters have been processed, the flow goes to Step S1510, in which the processed data are pasted. If it is judged in Step S1502 that not all the chapters have been processed, the flow goes to Step S1503.

In Step S1503, a chapter yet to be processed is handled. Since the chapter list has been copied in FIG. 22, the chapters can be processed in sequence, starting at the top of the list. Next, the flow goes to Step S1504, where it is judged whether all items for the given chapter have been processed. If all the items have been processed, the flow returns to Step S1502 to proceed with the next chapter. If it is judged in Step S1504 that there are items yet to be processed, the flow goes to Step S1505, where an item yet to be processed is handled. Then, the flow goes to Step S1506, where it is determined, concerning the item processed in Step S1505, whether to save set values unique to the chapter, conform to the upper-level settings of the source document, or conform to the settings of the destination document.

If it is judged in Step S1506 that set values unique to the chapter will be saved or if there is no corresponding item at the upper, document level, the flow goes to Step S1507 and the values unique to the chapter are retained. If it is determined in Step S1506 that the upper-level settings of the source document will be followed, the flow goes to Step S1508, where the chapter settings are overwritten with the copied set values of the corresponding item at the upper level. If it is determined in Step S1506 that the set values of the destination document will be followed, the flow goes to Step S1509, where the set values of the chapters are changed to the set values at the upper level of the destination document. When any of the steps—Step S1507, Step S1508, or Step S1509—is finished, the flow returns to Step S1504 and proceeds with processing of the next item.

Figure 24:
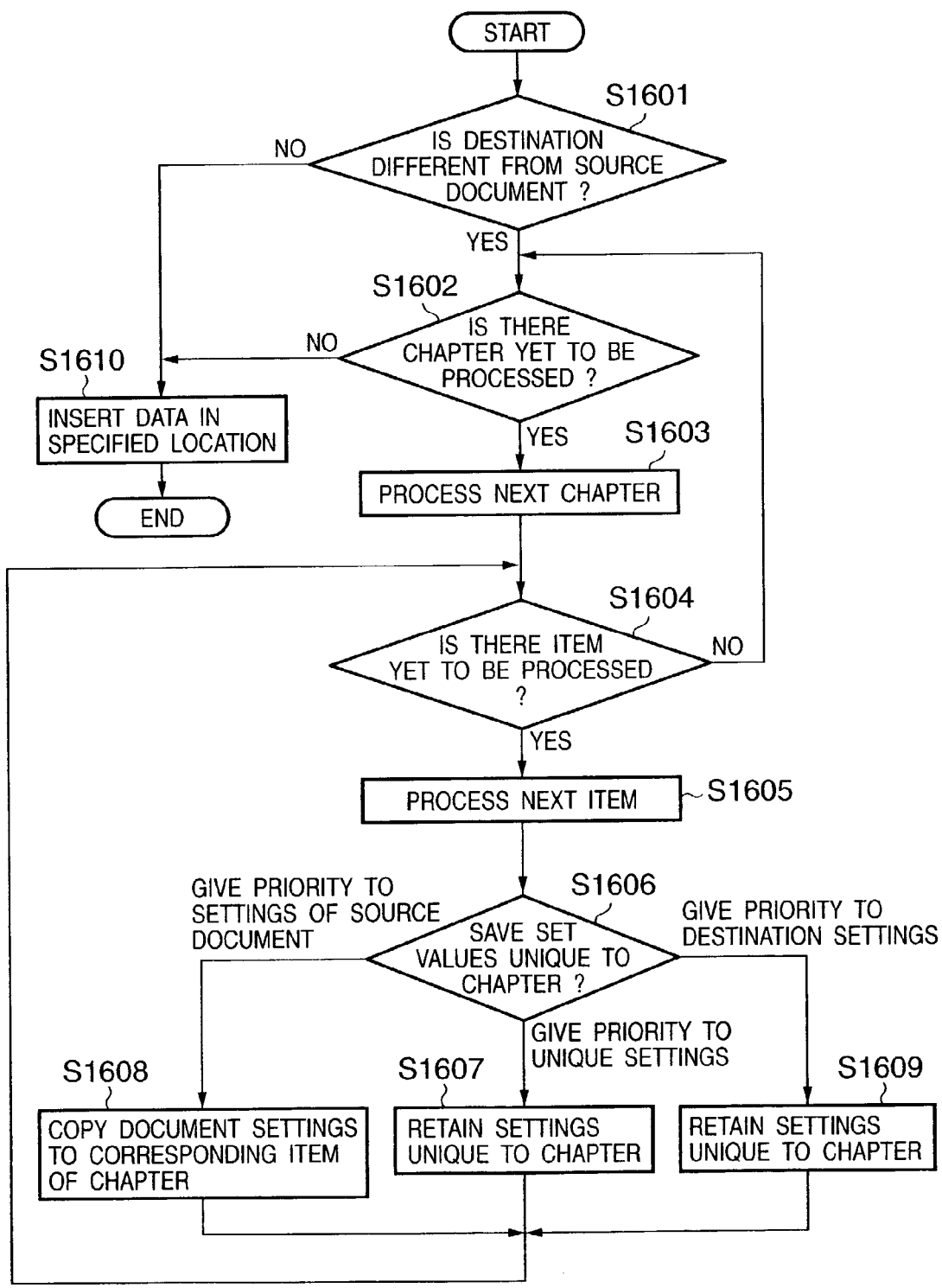
FIG. 24 is a flowchart showing an exemplary process of pasting chapters.

FIG. 24 is a flowchart showing a process of pasting chapters.

In Step S1601, it is judged whether the source document and destination document are identical. If it is judged that the copy and paste operations will be carried out within the same document, there is no need to transfer the upper-level settings to the lower level, and thus the flow goes to Step S1610, in which the copied data is pasted directly. If it is judged in Step S1601 that chapters will be inserted in a different document, the flow goes to Step S1602. In Step S1602, to see whether an end-of-loop condition has been met, it is judged whether all the copied chapters have been processed. If all the chapters have been processed, the flow goes to Step S1610, in which the processed data are pasted. If it is judged in Step S1602 that not all the chapters have been processed, the flow goes to Step S1603.

In Step S1603, a chapter yet to be processed is handled. Since the chapter list has been copied in the example described with reference to FIG. 22, the chapters can be processed in sequence, starting at the top of the list. Next, the flow goes to Step S1604, where it is judged whether all items for the given chapter have been processed. If all the items have been processed, the flow returns to Step S1602 to proceed with the next chapter. If it is judged in Step S1604 that there are items yet to be processed, the flow goes to Step S1605, where an item yet to be processed is handled. Then, the flow goes to Step S1606, where it is determined, concerning the item processed in Step S1605, whether to save set values unique to the chapter, conform to the upper-level settings of the source document, or conform to the settings of the destination document.

If it is judged in Step S1606 that set values unique to the chapter will be saved or if there is no corresponding item at the upper, document level, the flow goes to Step S1607 and the values unique to the chapter are retained. If it is determined in Step S1606 that the upper-level settings of the source document will be followed, the flow goes to Step S1608, where the chapter settings are overwritten with the copied set values of the corresponding item at the upper level. If it is determined in Step S1606 that the set values of the destination document will be followed, the flow goes to Step S1609, where the set values of the chapters are changed to the set values at the upper level of the destination document. When any of the steps—Step S1607, Step S1608, or Step S1609—is finished, the flow returns to Step S1604 and proceeds with processing of the next item.

Figure 25:
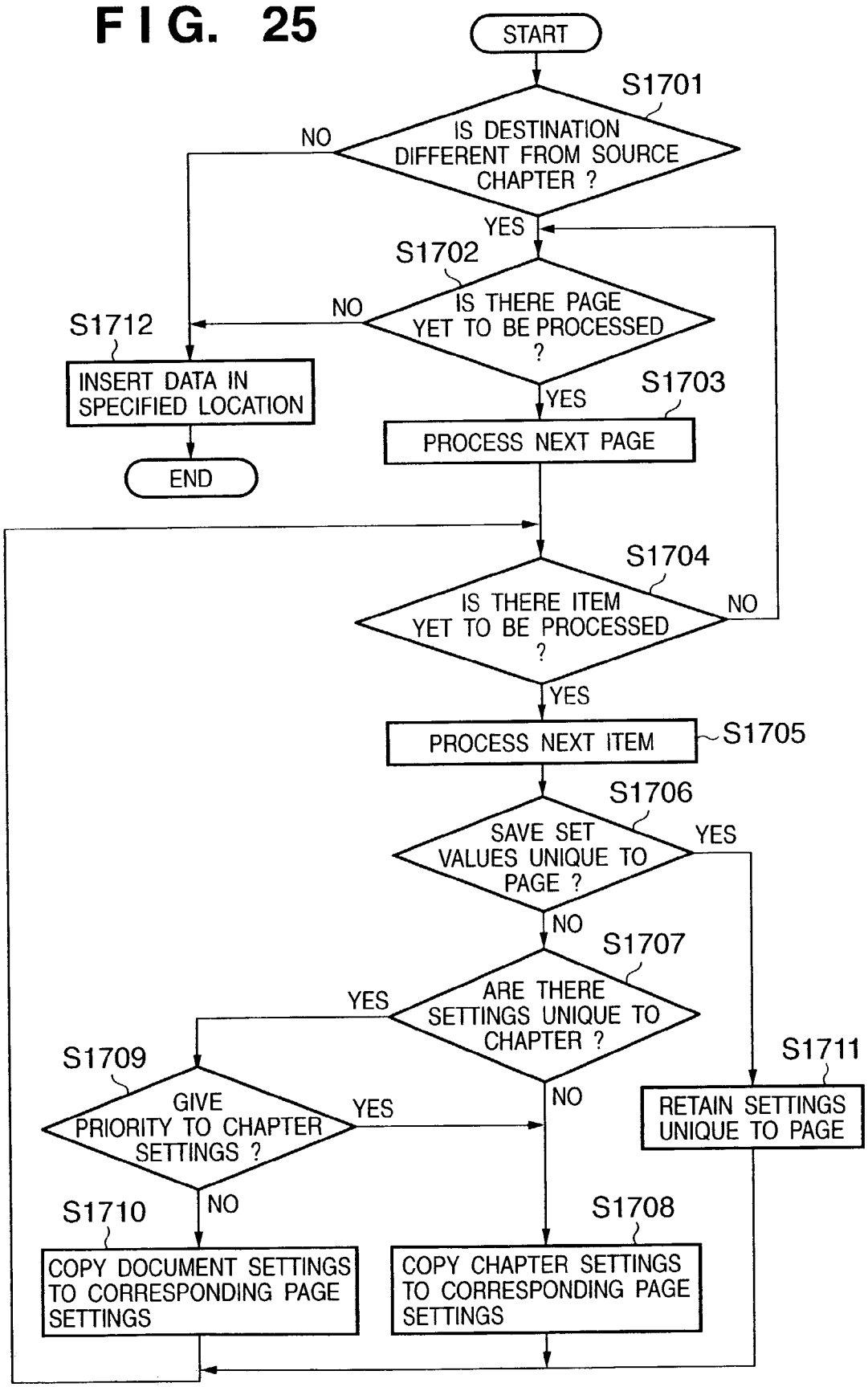
FIG. 25 is a flowchart showing an exemplary process of pasting pages.

FIG. 25 is a flowchart showing a process of pasting pages. Even if an entire chapter is copied, the method shown in this example can be used to insert individual pages contained in the chapter rather than inserting the entire chapter.

In Step S1701, it is judged whether the source chapter and destination chapter are identical. If it is judged that the copy and paste operations will be carried out within the same chapter, there is no need to transfer the upper-level settings to the lower level, and thus the flow goes to Step S1712, in which the copied data is pasted directly. If it is judged in Step S1701 that pages will be inserted in a different chapter, the flow goes to Step S1702. In Step S1702, to see whether an end-of-loop condition has been met, it is judged whether all the copied pages have been processed. If all the pages have been processed, the flow goes to Step S1710, in which the processed data are pasted. If it is judged in Step S1702 that not all the pages have been processed, the flow goes to Step S1703.

In Step S1703, a page yet to be processed is handled. Since the chapter and page lists have been copied in the example described with reference to FIG. 22, the pages can be processed in sequence, starting at the top of the page list for the first chapter in the chapter list. Next, the flow goes to Step S1704, where it is judged whether all items for the given page have been processed. If all the items have been processed, the flow returns to Step S1702 to proceed with the next page. If it is judged in Step S1704 that there are items yet to be processed, the flow goes to Step S1705, where an item yet to be processed is handled. Then, the flow goes to Step S1706, where it is determined, concerning the item processed in Step S1705, whether to save set values unique to the page.

If it is judged in Step S1706 that set values unique to the page will be saved or if there is no corresponding item at the upper, chapter or document level, the flow goes to Step S1711 and the values unique to the page are retained. If it is determined in Step S1706 that set values unique to the page will not be saved, the flow goes to Step S1707 to conform to upper-level settings.

Here, corresponding items at an upper, chapter level are checked to see whether there are set values unique to the chapter or whether settings at the top level will be followed. If it is determined in Step S1707 that there is no setting unique to the chapter, the flow goes to Step S1708, where the set values of the chapter are copied to the page. If it is determined in Step S1707 that there are settings unique to the chapter, the flow goes to Step S1709, where it is determined which upper-level settings will take priority, the chapter-level settings or document-level settings. If it is determined in Step S1709 that the chapter-level settings will take priority, the flow goes to Step S1708. If it is determined in Step S1709 that the chapter-level settings will not take priority, the set values of the corresponding items on the document level are copied to the page. When any of the steps—Step S1708, Step S1710, or Step S1711—is finished, the flow returns to Step S1704 and proceeds with processing of the next item.

In this example, it is possible to make detailed priority settings for each item by determining what level of set values should take priority and which settings should take priority, the settings of the source document or destination document. Incidentally, although judgments are made at two levels—the document and chapter levels—in the examples of FIGS. 23 and 24, it is also possible to handle page settings in the process of pasting a document or chapter by incorporating the processing of the page settings shown in FIG. 25. In that case, the flow of FIG. 25 can be inserted just before Step S1501 or S1601.

Example of Priority Settings Determined by User for Pasting

Description will be given about an operating method according to this embodiment which allows the user to specify before pasting which of document, chapter, and page settings to enable as well as what settings at the destination to follow.

Figure 35A:
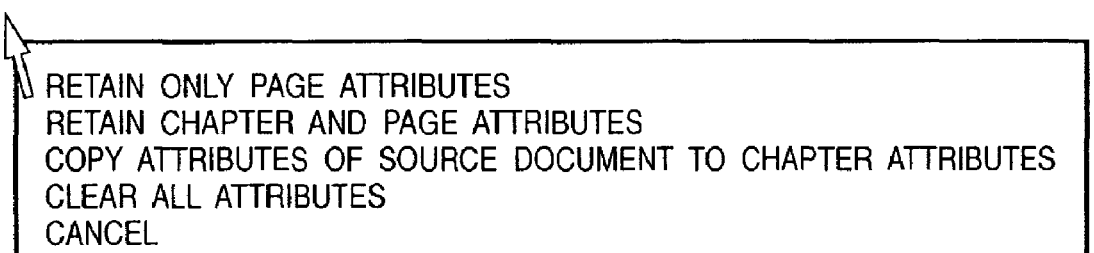

FIG. 35A shows an example of a right-click menu displayed during a drag and drop operation with the right mouse button. In this example, the user can select one of four options concerning an item to be pasted.

The first option is to "retain only page attributes," which specifies to retain settings at the page level and clear settings at the upper, chapter and document levels. Setting page attributes means attribute changes at the original level for the user and may not look like attribute settings. Therefore, if page attributes disappear during pasting, this may invite confusion.

The second option is to "retain chapter and page attributes." This option applies chapter and page settings of the destination document if the user has not specified chapter and page settings and retains any chapter and page setting the user has made. Therefore, it appears to the user that he/she is carrying out a copy and paste operation within the same document.

The third option is to "copy attributes of source document to chapter attributes." This option causes what is displayed in the source document to be reproduced in the destination document.

The fourth option is to "clear all attributes." This option pastes data in a clean state as if it were newly created by the electronic original writer 102 instead of coping from an existing edited document.

There can be as many options as the number of combinations of the document, chapter, and page, but an option which behaves unpredictably for the user only invites confusion and does not have much merit. This embodiment provides four options which produces operations readily predictable for the user who copy and paste data.

FIG. 35B shows an example of GUI which allows the user to select a paste method by displaying a dialog for pasting instead of displaying a right-click menu. In this case, the user can select one of two choices: display this dialog only when the right mouse button is pressed or always display this dialog even for a drag and drop operation with the left mouse button. If drag and drop operations are used frequently, it is not desirable to always display this dialog, which will interrupt the flow of operations. However, this GUI format should be selected if a lot of menu options need to be displayed because the dialog provides space for guidance and other information.

Figure 35C:
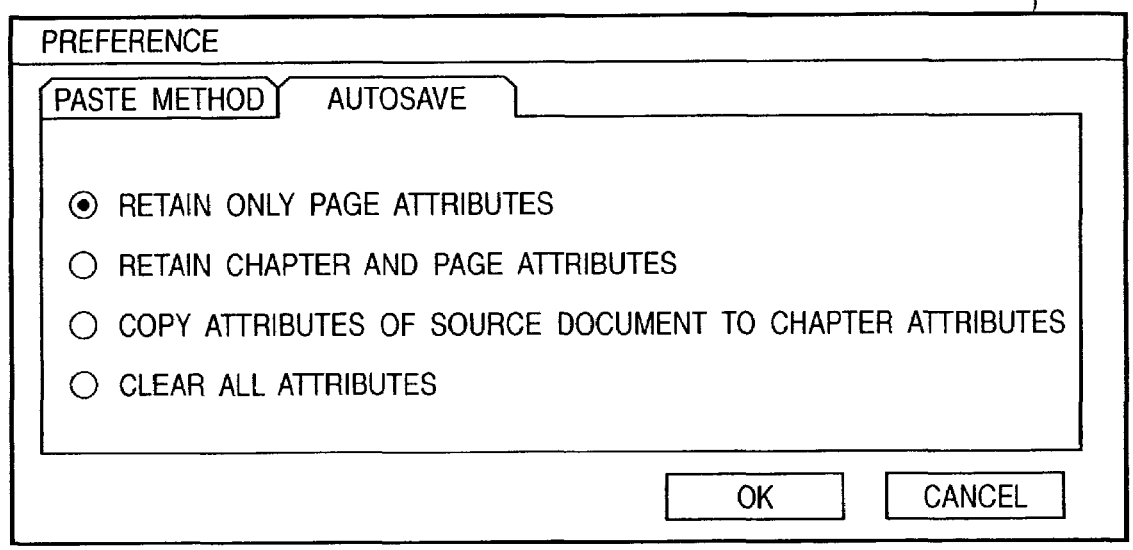

FIG. 35C shows an example in which the user is allowed to select a method in advance. As the user selects Preference from the Tool menu, the GUI shown in FIG. 35C appears, allowing the user to select a desired action for pasting from among four options. This method is advantageous over the method which involves selecting an action each time in that it does not interrupt the flow of operations. It is also possible to use a Preference setting for usual paste operations and display the right-click menu for right-click drag-and-drop operations by combining the methods in FIG. 35B and FIG. 35C.

In either case, the user can select one of four options as a way of processing attributes during pasting.

FIG. 36 shows an example of IDs assigned to the four options. ID1, ID2, ID3, and ID4 are assigned to the options in FIGS. 35A to 35C, starting from the top.

Figure 37:
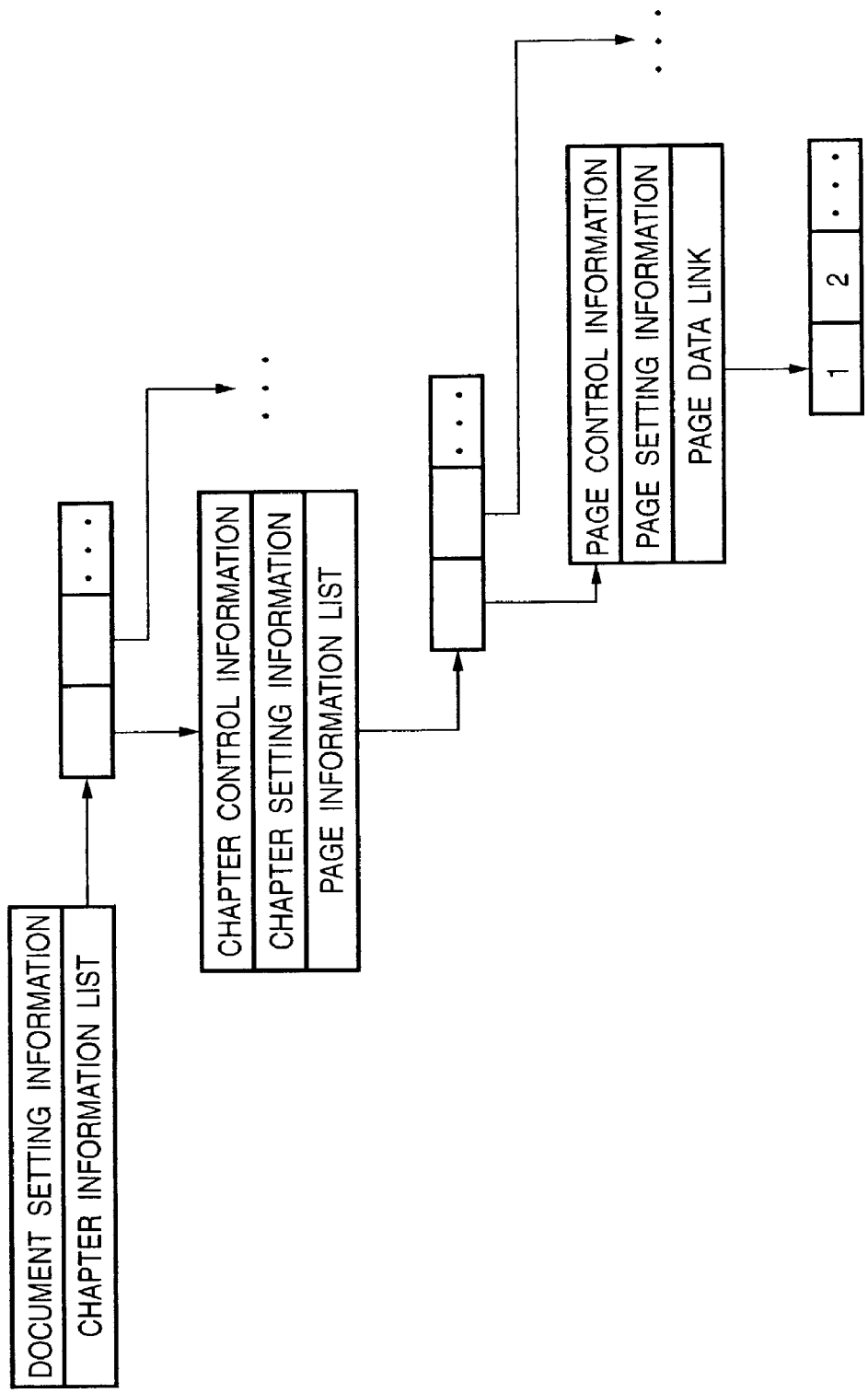
FIG. 37 is a diagram showing an example of data written into a paste buffer during pasting.

FIG. 37 shows data structure of pasted data. Since a method for retaining attributes can be selected before pasting, they are retained in almost the same format as the one described with reference to FIG. 3. Although use of document information for pasting results in an increased volume of data, optimization is performed by not using that part of the document control information 402 which is not necessary for pasting, such as a document name. If there are a small number of paste options, unnecessary data can be eliminated by proceeding with further optimization.

Figure 38:
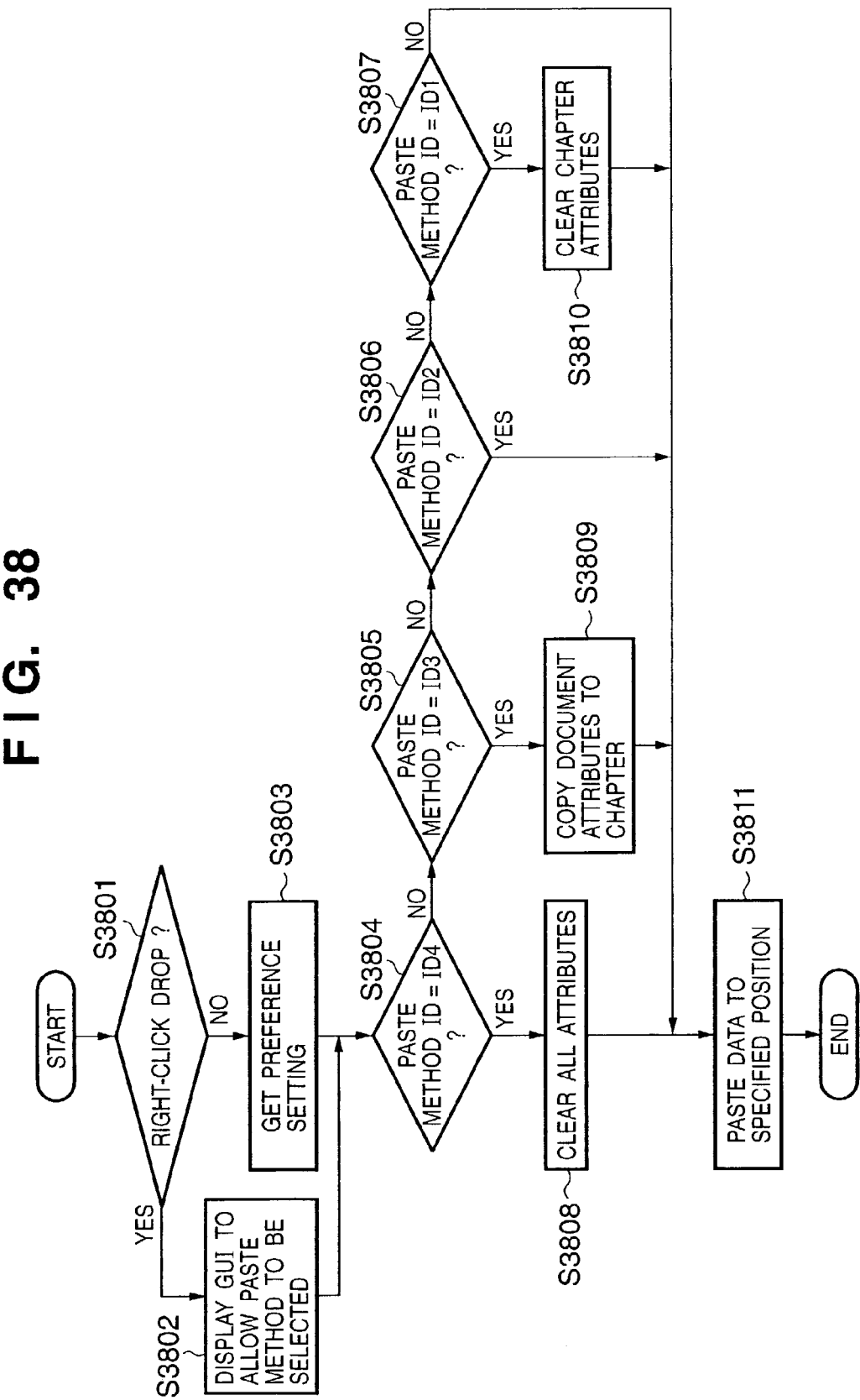
FIG. 38 is a flowchart showing allocation of processes during pasting.

FIG. 38 is a flowchart showing exemplary pasting procedures in which one of four paste methods can be selected using the GUI shown in FIG. 35A.

First, it is judged in Step S3801 whether the operation concerned is a right-click drag-and-drop operation. If it is judged that the operation concerned is a right-click drag operation, the flow goes to Step S3802, where the right-click menu 3501 is displayed, allowing the user to select one of ID1 to ID4. If it is judged in Step S3802 that the operation concerned is not a right-click drag operation, the flow goes to Step S3803 to read the paste method ID specified in advance through Preference 3503.

Steps S3804 to S3810 concern allocation of processes according to the paste method ID selected by the user. The flow goes to S3810 if ID1 is selected by the user, to S3809 if ID3 is selected, and to S3808 if ID4 is selected, but nothing particular is done if ID2 is selected. Details of these processes will be described in detail later. In any case, when the processing of attributes is finished, the flow goes to Step S3811, where the data is pasted to a specified position.

Figure 39:
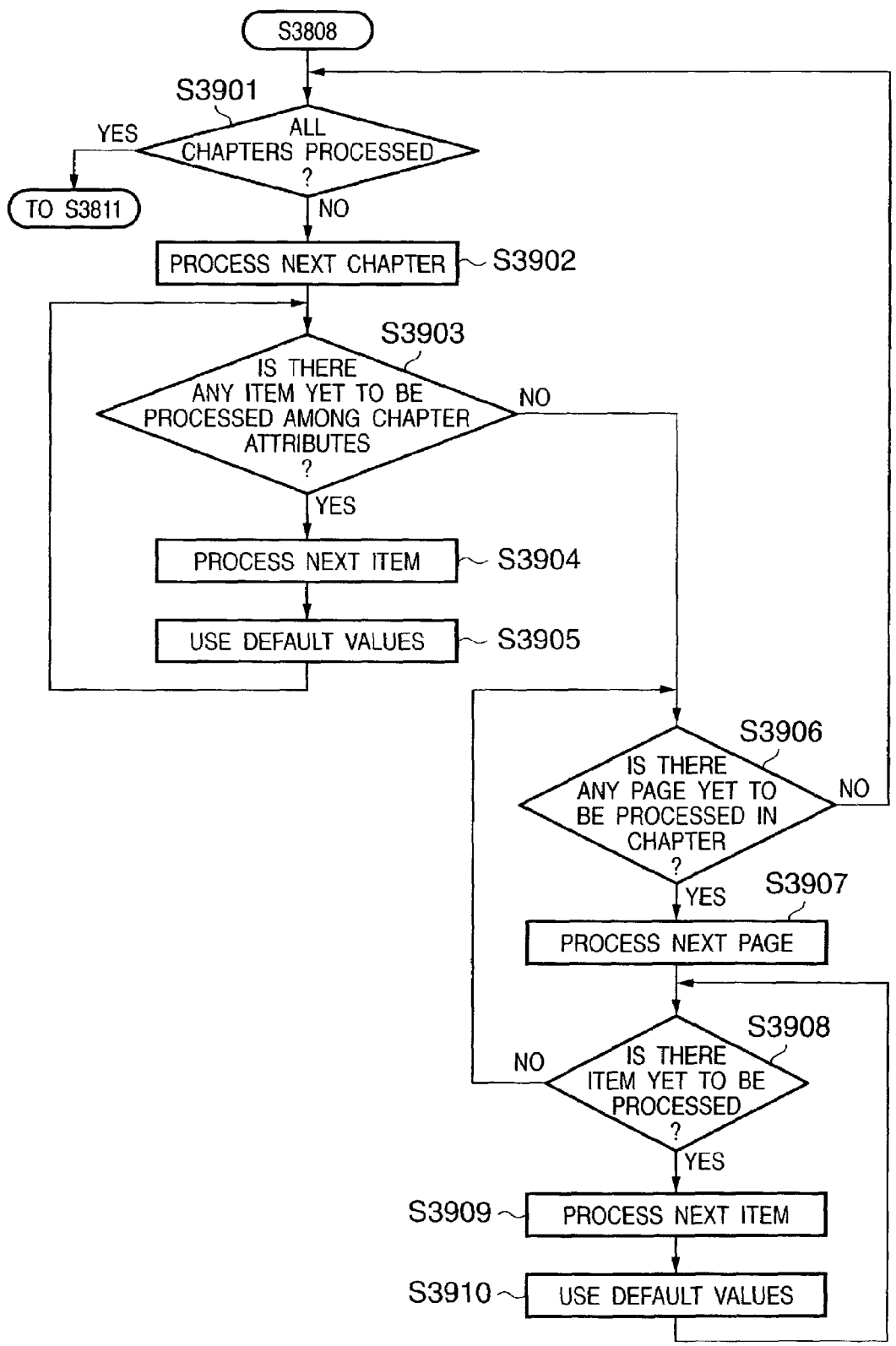
FIG. 39 is a flowchart showing procedures for processing attributes during pasting.

FIG. 39 is a flowchart showing process details of Step S3808 in FIG. 38.

First, it is judged in Step S3901 whether the attributes of the data to be pasted have been cleared. If there is chapter information 405 yet to be processed, the flow goes to Step S3902, where a chapter yet to be processed is selected. The chapters are processed, starting at the top of the chapter information list 404 if there is no particular problem. Then, the flow goes to Step S3903, where it is judged whether there is any item yet to be processed in the chapter setting information 407. If there is, the flow goes to Step S3904, where the next item is processed. Then, the flow goes to Step S3905 to clear the set values of the chapter processed in Step S3902 by overwriting them with default values or a value which means "conforming to upper-level settings." The chapter setting information 407, which consists of an array or list, is cleared in sequence starting at the top and the loop is repeated until it is judged that the last item is cleared.

If it is judged in Step S3903 that there is no item yet to be processed, the flow goes to Step S3906, where it is judged whether all the pages in the page information list 408 have been processed. If there are pages yet to be processed, the flow goes to Step S3907, where the pages are processed, starting at the top of the list. Next, the flow goes to Step S3908, where it is judged whether all the items in the page setting information 411 have been processed. If there are items yet to be processed, the flow goes to Step S3909. The page setting information 411 may also be composed of an array or list of set values. In that case, the items are processed sequentially in S3909, starting at the top of the list. Then, the flow goes to Step S3910, where the item is cleared. If the item is unique to the page, default values are used. If the same item exists at an upper level, a special attribute value which means "conforming to the upper level" is used.

If it is judged in Step S3908 that all the items in the page setting information 411 have been processed, the processing of that page is finished. The flow returns to Step S3906 to proceed with the next page and it is judged whether there is any page yet to be processed. If it is judged in Step S3906 that all the pages have been processed, the flow returns to Step S3901 to proceed with the next chapter. When all the processing is finished, the loop is finished and the flow goes to Step S3811.

Figure 40:
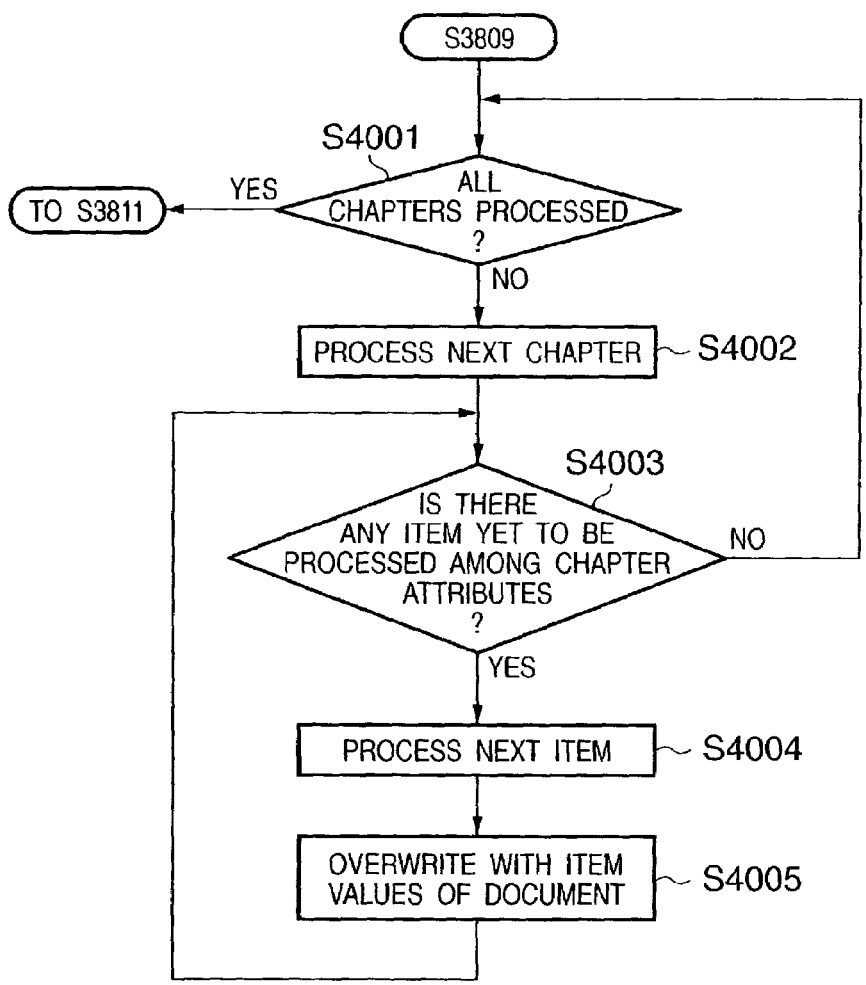
FIG. 40 is a flowchart showing procedures for processing attributes during pasting.

FIG. 40 is a flowchart showing process details of Step S3809 in FIG. 38.

First, it is judged in Step S4001 whether the attributes of the data to be pasted have been cleared. If there is chapter information 405 yet to be processed, the flow goes to Step S4002, where a chapter yet to be processed is selected. The chapters are processed, starting at the top of the chapter information list 404 if there is no particular problem. Then, the flow goes to Step S4003, where it is judged whether there is any item yet to be processed in the chapter setting information 407. If there is, the flow goes to Step S4004, where the next item is processed. Then, the flow goes to Step S4005, where the set values of the item currently being processed are overwritten with the values of the appropriate item in the document setting information 403.

If an item is unique to chapters and has no corresponding item in the document setting information 403, there are two possible alternatives: to overwrite item values with default values or not to overwrite the item values. In this embodiment, since all the items have corresponding items in the document information, all of them are overwritten. The flow returns to Step S4003 to proceed with the next item. If it is judged in Step S4003 that there is no item yet to be processed, the flow returns to Step S4001 to proceed with the next chapter. If all the chapters have been processed, the flow goes to Step S3811 by breaking the loop.

Figure 41:
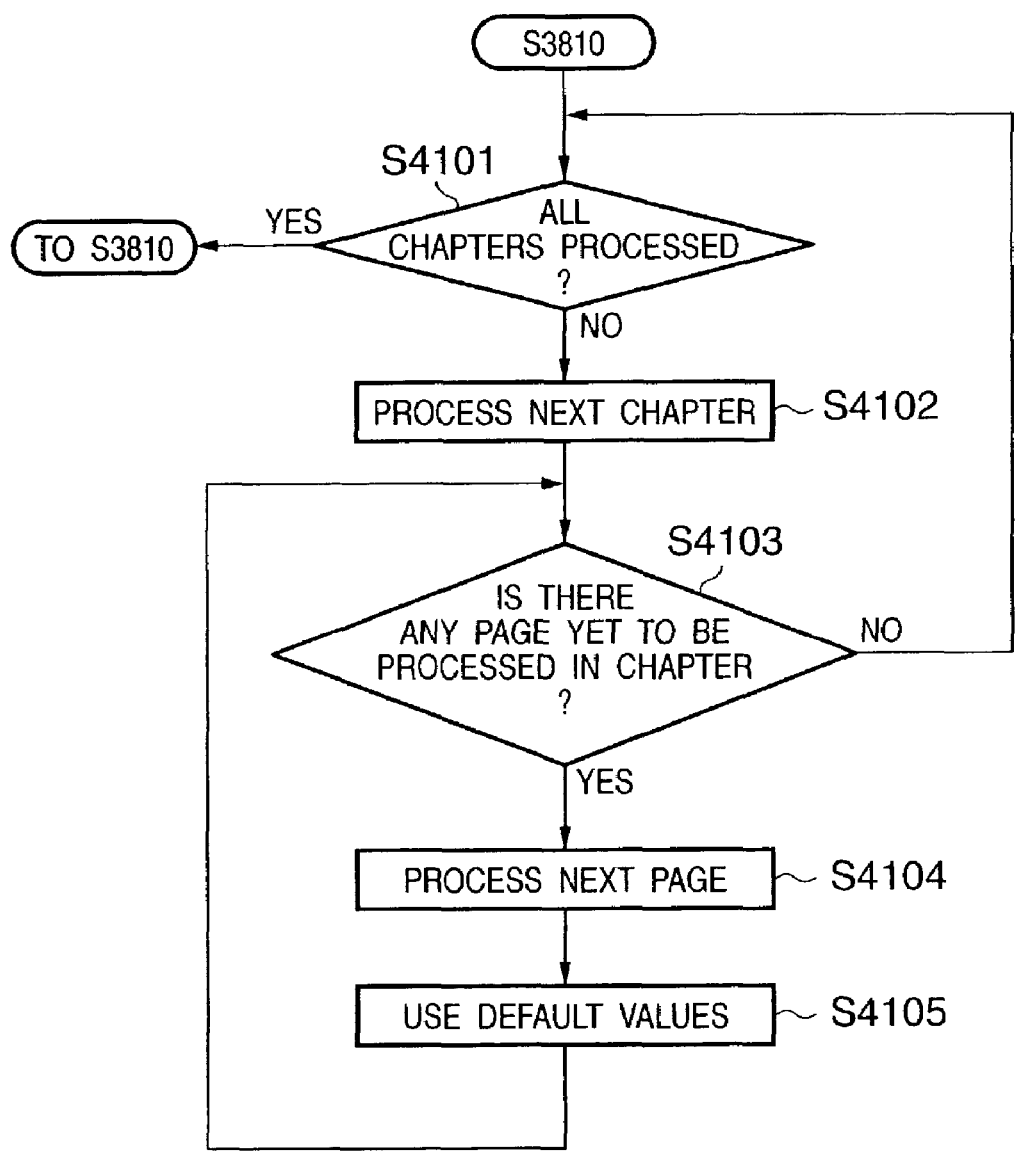
FIG. 41 is a flowchart showing procedures for processing attributes during pasting.

FIG. 41 is a flowchart showing process details of Step S3810 in FIG. 38.

First, it is judged in Step S4101 whether the attributes of the data to be pasted have been cleared. If there is chapter information 405 yet to be processed, the flow goes to Step S4102, where a chapter yet to be processed is selected. The chapters are processed, starting at the top of the chapter information list 404 if there is no particular problem. Then, the flow goes to Step S4103, where it is judged whether there is any item yet to be processed in the chapter setting information 407. If there is, the flow goes to Step S4104, where the next item is processed. The set values of the chapter processed in Step S4104 are cleared by being overwriting with default values or a value which means "conforming to upper-level settings." Then, the flow returns to Step S4103 to proceed with the next item. If it is judged in Step S4103 that there is no item yet to be processed, the flow returns to Step S4101 to proceed with the next chapter. If all the chapters have been processed, the flow goes to Step S3811 by breaking the loop.

Example of User Operations for Document Editing in the Document Processing System According to this Embodiment Next, description will be given about display methods used according to user's document editing operations (especially, drag and drop operations) in this embodiment.

Figure 26:
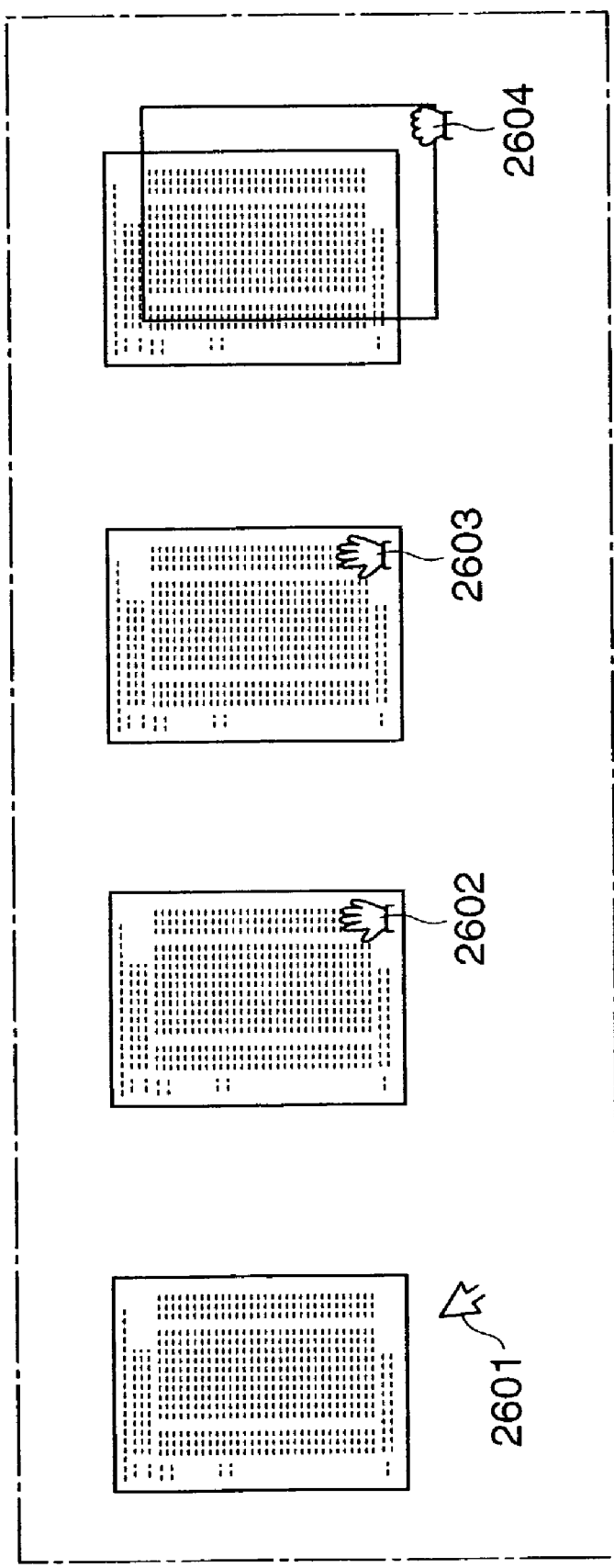
FIG. 26 is a diagram showing an example of display method in an edit process.

FIG. 26 shows examples of changes in the shape of mouse cursor during a copy and paste operation or a so-called drag and drop operation with a mouse.

The figure at the left end shows an example in which a mouse cursor is located outside the page. The mouse cursor 2601 is arrow-shaped—a normal default shape. The second figure from the left shows the mouse cursor as it is positioned on the page. The mouse cursor 2602 changes to a hand shape, indicating that the page is the object to be dragged and dropped. The third figure from the left shows that a selection has been made by clicking the mouse. The page is surrounded by a thick border, indicating that the page has been selected. As the user clicks the mouse and start dragging the page, the mouse cursor 2604 changes to a gripping hand, indicating to the user that the gripped page can be moved as shown in the figure at the right.

Example of Display in Preview Area

Figure 27:
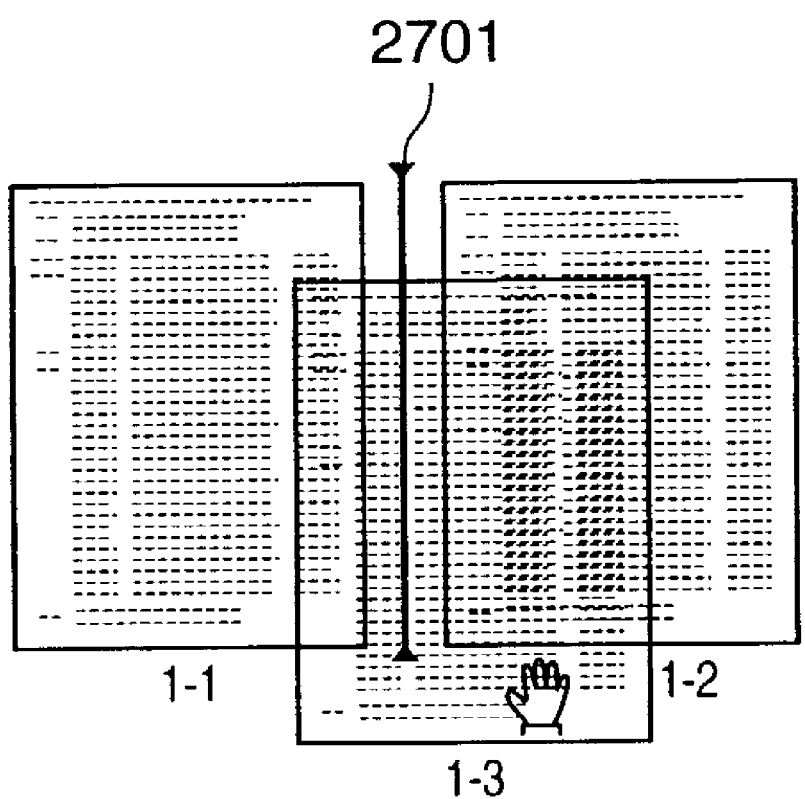
FIG. 27 is a diagram showing an example of display method in an edit process.

FIG. 27 shows an example of a display format illustrating drag and drop positions of a dragged page.

The dragged page is shown as a being translucent so that the drop position can be checked easily. Also, a bar 2701 is displayed to indicate the drop position. As the user releases the mouse button in this state to drop the page, the dragged page 1-3 is placed between page 1-1 and page 1-2, and consequently the pages are rearranged in the order: 1-1, 1-3, and 1-2. By using a Control key or Shift key during a drag and drop operation, it is possible to copy a page instead of moving it. Also, by using the right button instead of the left button which is usually used, the user can select whether to move or copy a page when dropping it.

(Example of Display in Tree Area)

Figure 28:
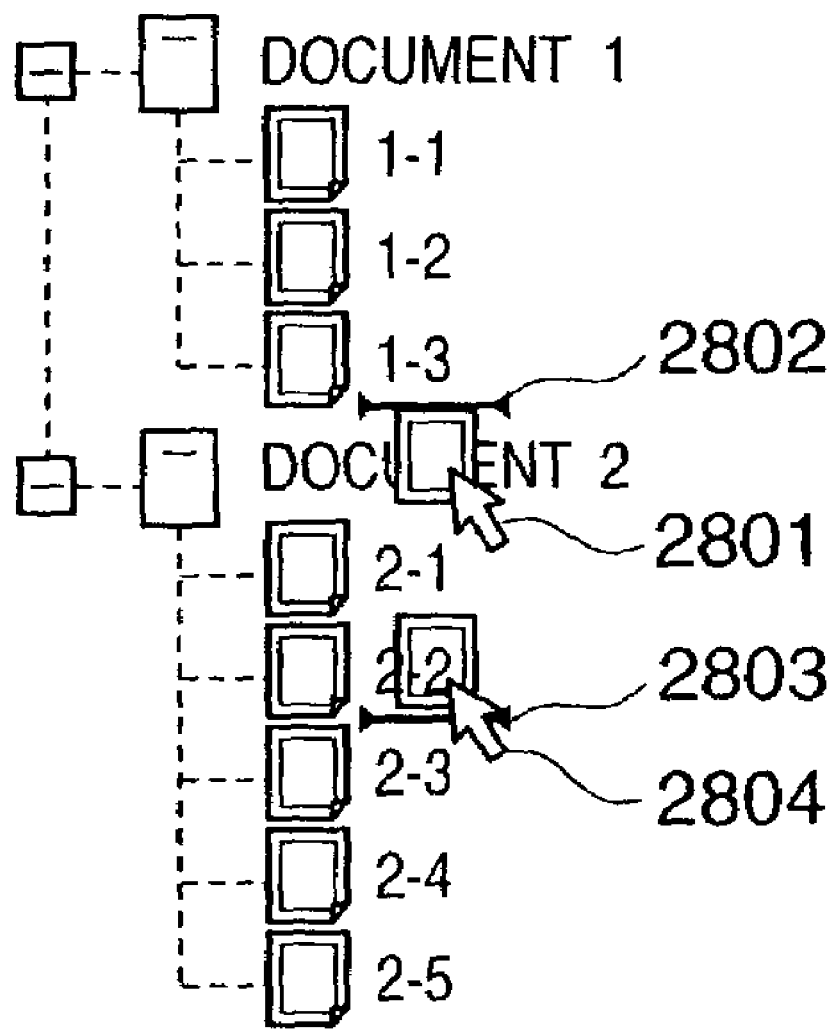
FIG. 28 is a diagram showing an example of display method in an edit process.

FIG. 28 is a diagram illustrating a display format of a drag and drop operation in the tree display area.

During a drag operation, to fit in the small area of the tree section, the image of the dragged page disappears and the mouse cursor 2801 takes on a combined shape of an arrow and page icon. As the user moves the mouse cursor 2801 to position 2803 by moving the mouse, the bar which indicates the drop position moves from position 2802 to position 2804 along with the mouse cursor.

Figure 29:
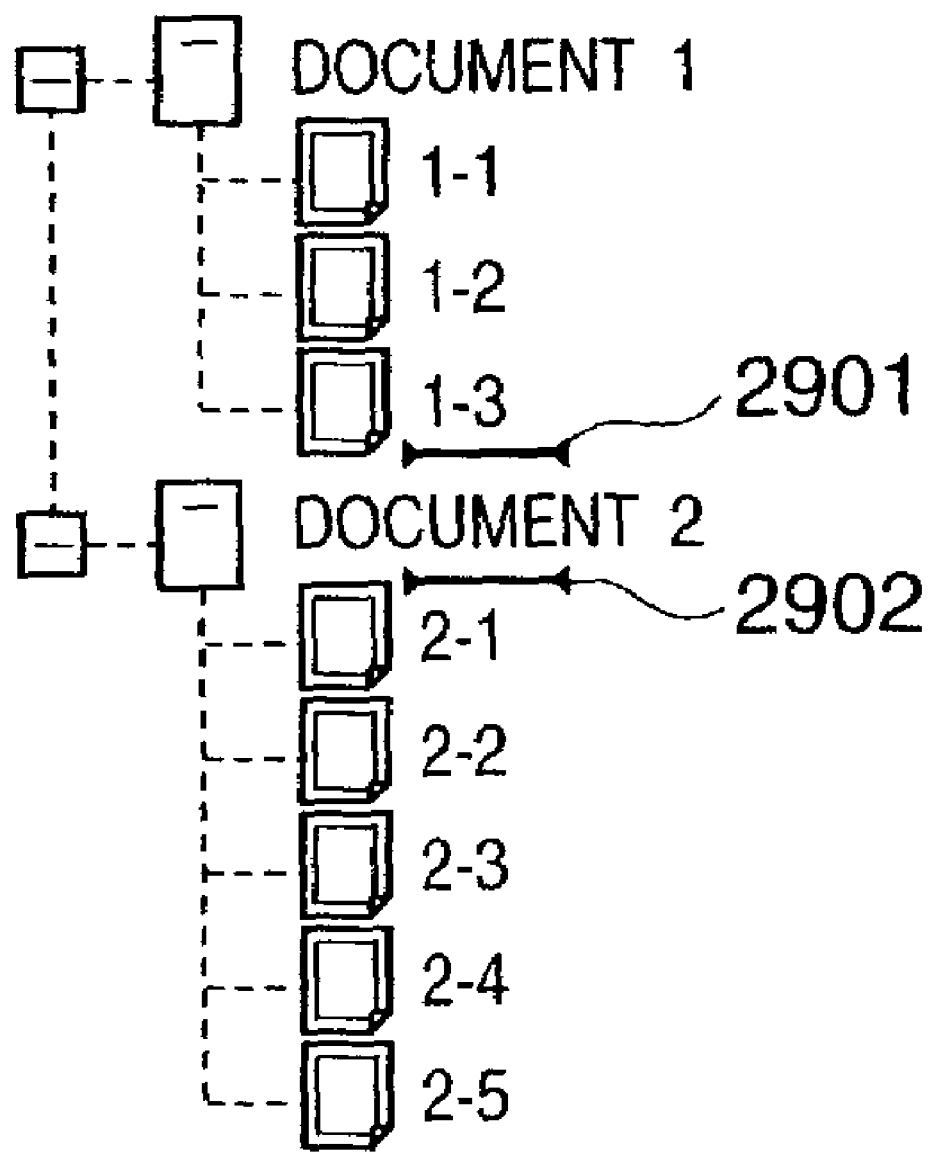
FIG. 29 is a diagram showing an example of display method in an edit process.

Although the tree display, which itself contains hierarchy information, is easily understandable, since a document has a document/chapter/page hierarchical structure, when the mouse cursor is positioned between chapters, a problem arises as to in which chapter a dragged object should be dropped. According to this embodiment, as shown in FIG. 29, when the bar is at position 2901, which is next to page 1-3, the dragged object is dropped on the last page of the "Document 1" chapter. When the mouse is moved further down, the bar moves to position 2902 between the "Document 2" icon and page 2-1. When the bar is at this position, the dragged object is dropped on the first page of the "Document 2" chapter.

(Variation of Display in Preview Area)

The display in the preview area, whose display format does not contain a concept of hierarchy, is rather ambiguous. One possible method of clearing up the ambiguity involves setting a rule to drop the dragged object on the last page of the preceding chapter or the first page of the succeeding chapter if the bar moves to the boundary between chapters, or to drop the dragged object depending on the cursor path: to drop the dragged object on the last page of the preceding chapter if the mouse cursor moves from the direction of the preceding chapter and to drop the dragged object on the first page of the succeeding chapter if the mouse cursor moves from the direction of the succeeding chapter.

Figure 30:
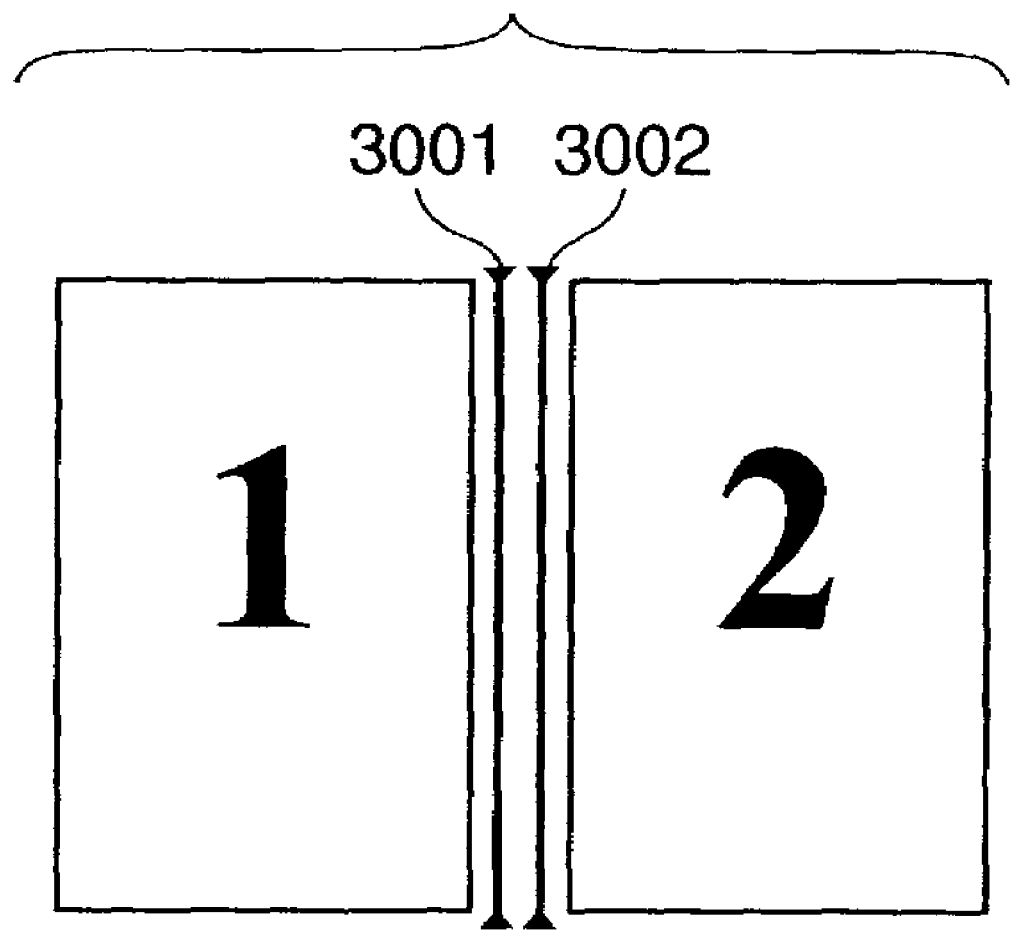
FIG. 30 is a diagram showing an example of display method in an edit process.

FIG. 30 shows an example of displaying the bar twice on a chapter boundary. Suppose a page labeled "1" and a page labeled "2" abut each other on a chapter boundary. A bar 3001 is displayed when the mouse cursor is nearer to page "1" and a bar 3002 is displayed when the mouse cursor is nearer to page "2." The dragged object is placed at the end of the preceding chapter if it is dropped while the bar 3001 is displayed and it is placed at the head of the succeeding chapter if it is dropped while the bar 3002 is displayed. Incidentally, it is also possible to display two bars 3001 and 3002 at the same time and determine where to drop the dragged object depending on the thickness, density, or color (in the case of color display) of the bars.

(Display Example for N-Up Printing in Preview Area)

Next a display method for N-up printing will be described.

Figure 31:
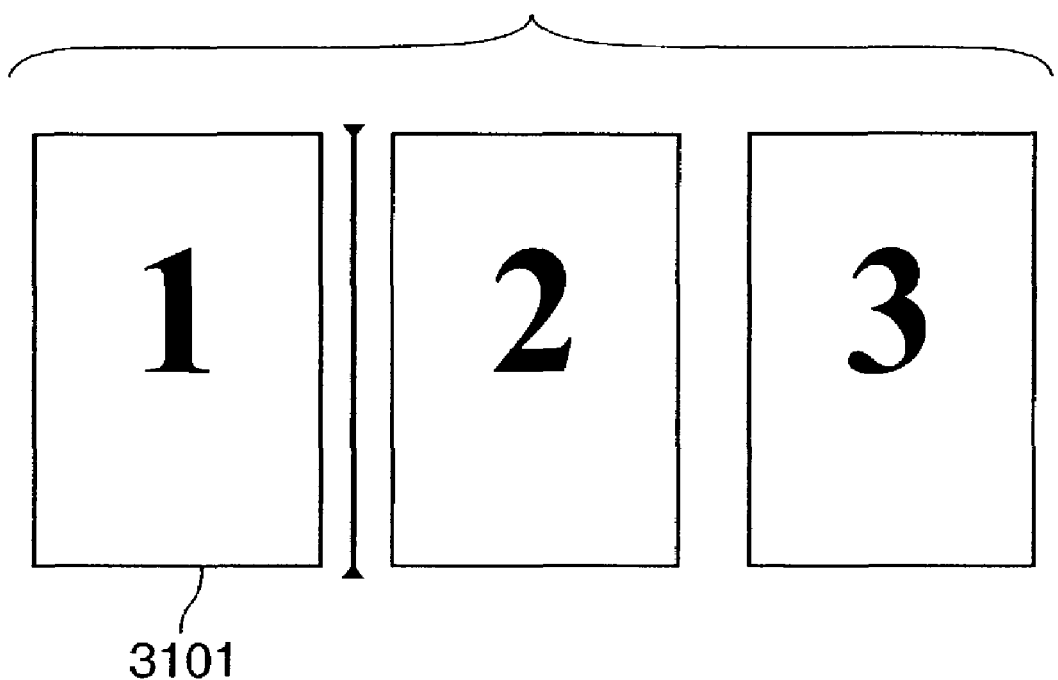
FIG. 31 is a diagram showing an example of display method in an edit process.

FIG. 31 shows an example of 1-up printing. In this example, a rectangle 3101 which represents a sheet of paper corresponds to a page. Thus, the bar which indicates a drop position is displayed between rectangles which represent sheets of paper.

Figure 32:
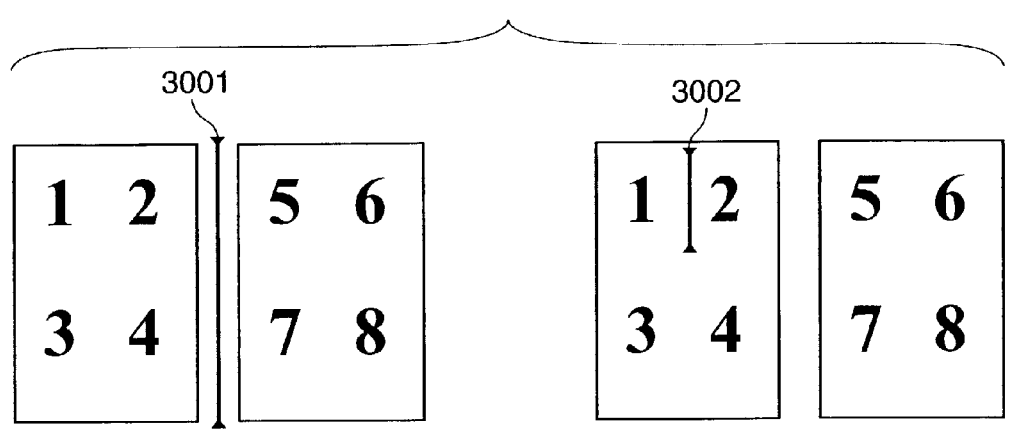
FIG. 32 is a diagram showing an example of display method in an edit process.

FIG. 32 shows an example of 4-up printing. In this case, four pages of data, when drawn, are treated as a single physical page. If a dragged object is dropped between two physical pages, the bar is displayed between two rectangles which represent the physical pages, as shown on the left of FIG. 32. If a dragged object can be dropped between original pages, there are two or more places where the dragged object can be dropped within a single physical page. In the right diagram of FIG. 32, the bar which indicates a drop position is displayed between the original page labeled "1" and original page labeled "2." In this way, different display methods are used depending on the dragged object.

When a physical page is selected and dragged, the page is dropped according to the method shown on the left of FIG. 32 assuming that the movement is carried out on the physical page level. Internally, the same process is carried out as when all the logical pages on the physical page are dragged. Therefore, if the N-up print setting differs between the selected physical page and drop position, the resulting layout will be different from the original layout before dragging because logical pages are laid out according to the layout specification for the destination page. When a logical page is selected and dragged, the page is dropped according to the method shown on the right of FIG. 32 assuming that the movement is carried out on the logical page level. In terms of internal data, however, the same process is carried out as when dragging and dropping a plurality of logical pages. Thus, it is possible to allow the user to drop the dragged page at any desired position by switching between the display methods shown on the left and right of FIG. 32 using the mouse.

Figure 33:
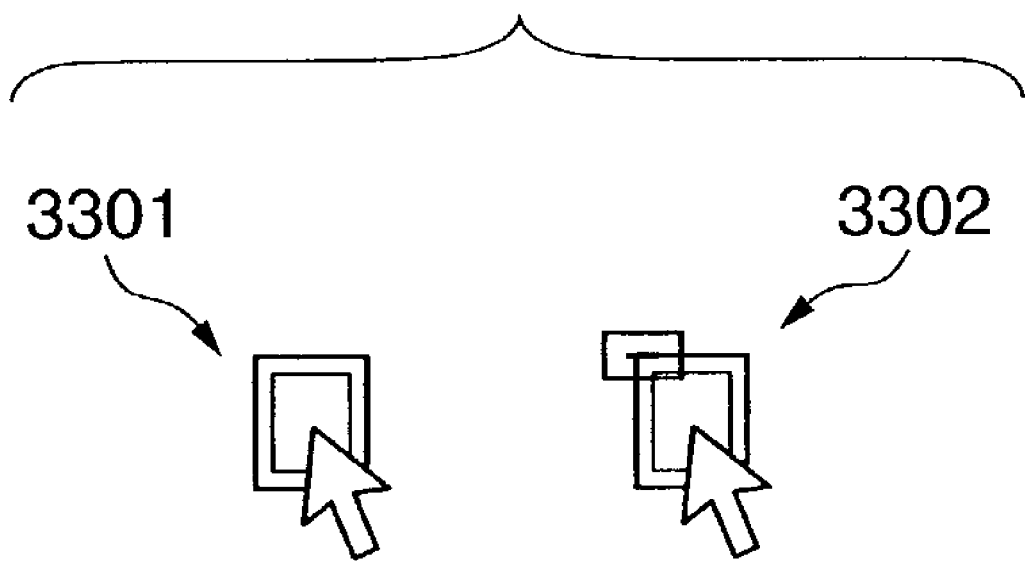
FIG. 33 is a diagram showing an example of display method in an edit process.

Next, an example in which a chapter or page being dragged has its own settings is shown in FIG. 33.

A display example in which a chapter or page has unique settings is shown in FIG. 9. If data being dragged does not contain a page or chapter which has unique settings, a display format 3301 is used. If data being dragged contains a page or chapter which has unique settings, a display format 3302 is used. Presence or absence of unique settings is indicated by placing a small mark in the upper left corner, as in the case of 901 and 902 in FIG. 9. If the data retains its unique settings after it is dropped, a chapter or page with unique settings results, as shown in FIG. 9. It is possible to specify unique settings to be cleared internally when data is dropped. Flowcharts of processes carried out in that case are shown in FIGS. 24 and 25.

Figure 34:
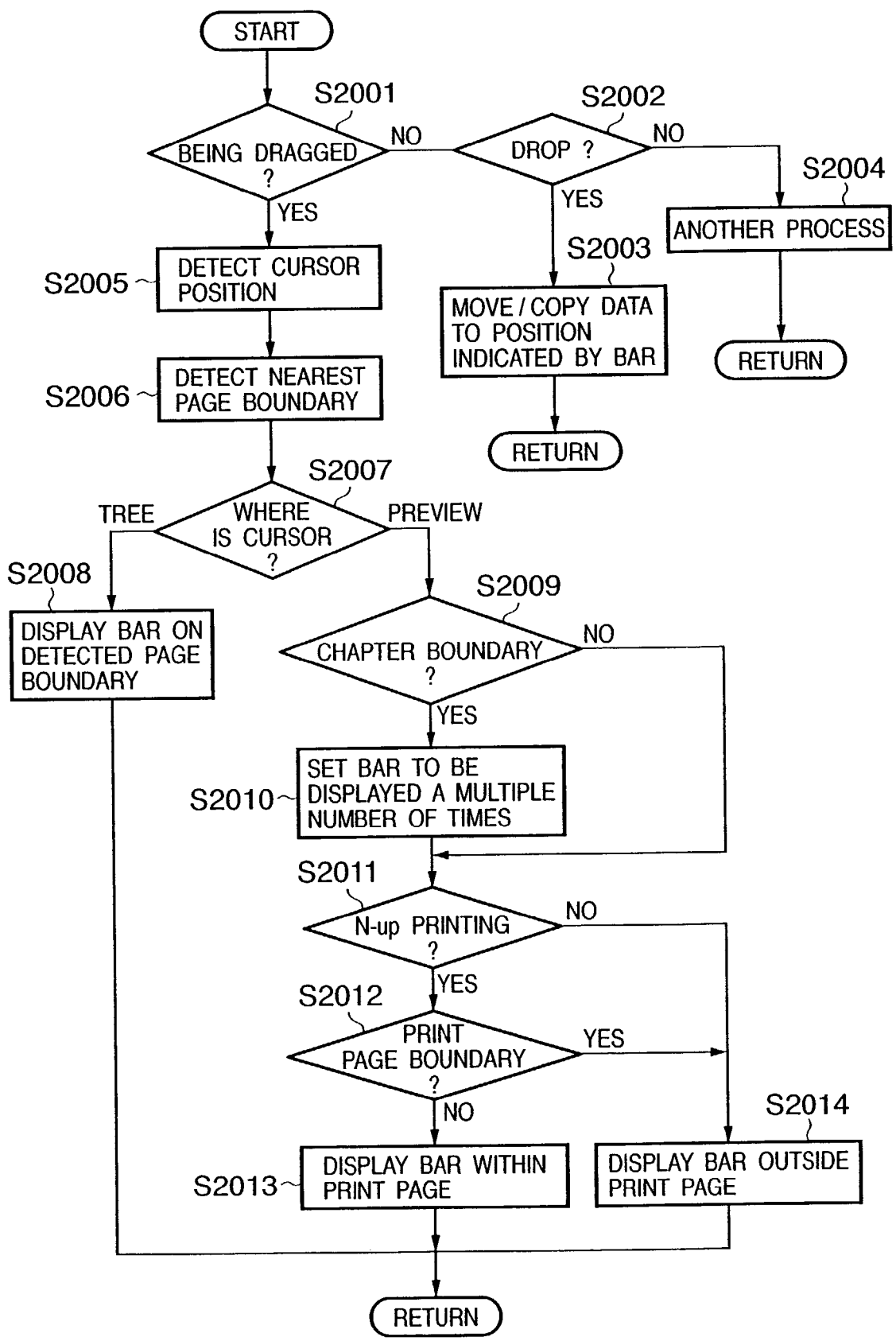
FIG. 34 is a flowchart showing exemplary procedures of a display method in an edit process.

Exemplary Procedures for Operations in Document Processing System According to this Embodiment FIG. 34 shows a flowchart of exemplary procedures for operations in the document processing system according to this embodiment. Incidentally, procedures for detecting cursor position as well as distance between image display position and cursor position are known and detailed description thereof will be omitted. Also, priority setting among book, chapter, and page settings (attributes) will also be omitted for the sake of simplicity. Regarding unique settings, in addition to processes shown in FIGS. 24 and 25, a mark is added to indicate presence of unique settings as shown in FIG. 33.

First, it is judged in Step S2001, based on mouse operation, whether data is being dragged. If no data is being dragged, it is judged in Step S2002 whether the operation concerned is a drop operation. If it is not a drop operation either, a process not covered by this example is performed in Step S2004 and the flow returns to the beginning. If it is judged to be a drop operation, the flow goes to Step S2003, where data is moved or copied to the drop position indicated by a bar according to the cursor position. Selection between move and copy operations is not shown for the sake of simplicity.

If the operation concerned is judged to be a drag operation in Step S2001, the cursor position is detected by a known method in Step S2005. Next, the original page boundary nearest to the cursor position in the tree and preview areas is detected in Step S2006. It is judged in Step S2007 whether the original page boundary nearest to the cursor position detected in Step S2006 is located in the tree area or preview area. If it is located in the tree area, a bar which indicates a drop position is displayed on the original page boundary in Step S2008. The method of display here is also known and will not be described in detail.

If the original page boundary nearest to the cursor position is located in the preview area, it is judged in Step S2009 whether the detected boundary coincides with a chapter boundary. If it coincides with a chapter boundary, a setting is made in Step S2010 to display a bar a multiple number of times as shown in FIG. 30. If a bar is specified to be displayed a multiple number of times, multiple borders are set up at the original page boundary, distances from the cursor are detected, and a bar is displayed on the border nearest to the cursor although this is not described in detail in FIG. 34. Alternatively, a plurality of bars may be displayed in such a way that they can be identified by thickness, density, or color (the nearest bar will be more conspicuous). If there is no chapter boundary, nothing is done and the flow goes to Step S2011.

It is judged in Step S2011 whether N-up printing is specified. In the case of N-up printing, it is judged in Step S2012 whether the original page boundary coincides with a print page boundary. If N-up printing is specified and the original page boundary does not coincide with a print page boundary, a bar is displayed, in Step S2013, on a original page boundary within the print page as shown in the right diagram of FIG. 32. On the other hand, if N-up printing is not specified, or if the original page boundary coincides with a print page boundary even in the case of N-up printing, a bar is displayed outside (between) the print pages as shown in the left diagrams of FIGS. 30, 31, and 32.

Incidentally, the execution sequence of the flowcharts in this embodiment may be changed as long as no process is left unfinished.

Also, the present invention may be applied either to a system consisting of two or more apparatus (e.g., a host computer, interface devices, a reader, a printer, and the like) or to equipment consisting of a single apparatus (e.g., a copier, a printer, a facsimile machine, or the like).

Also, the object of the present invention can also be achieved by a recording medium containing the software program code that implements the functions of the above embodiment: it is supplied to a system or apparatus, whose computer (or a CPU or MPU) then reads the program code out of the storage medium and executes it. In that case, the program code itself read out from the storage medium will implement the functions of the above embodiment, and the storage medium which stores the program code will constitute the present invention.

As the recording medium for supplying the program code, for example, a floppy disk, hard disk, optical disk, magneto-optical disk, CD-ROM, CD-R, magnetic tape, nonvolatile memory card, ROM, or the like may be used.

Also, the functions of the above embodiment may be implemented not only by the program code read out and executed by the computer, but also by part or all of the actual processing executed, in accordance with instructions from the program code, by an OS (operating system) running on the computer.

Furthermore, the functions of the above embodiment may also be implemented by part or all of the actual processing executed by a CPU or the like contained in a function expansion card inserted in the computer or a function expansion unit connected to the computer if the processing is performed in accordance with instructions from the program code that has been read out of the storage medium and written into memory on the function expansion card or unit.

The present invention can provide a document processing method and system capable of making both global and local settings when inserting, moving, or copying and pasting data, by taking full advantage of the feature of retaining data and set values hierarchically in the system.

Specifically, when copying and pasting data which has a hierarchical structure, the present invention allows the user to paste data with the hierarchical structure of the data retained.

Also, with the above configuration, the present invention allows the user to paste copied data to another document with priority given to set values of the source document.

Also, with the above configuration, the present invention allows the user to paste copied data to another document with priority given to set values of the destination document.

Also, with the above configuration, the present invention allows the user to paste copied data to another document with priority given to set values retained by the copied data at individual levels of the hierarchy.

As many apparently widely different embodiments of the present invention can be made without departing from the spirit and scope thereof, it is to be understood that the invention is not limited to the specific embodiments thereof except as defined in the claims.

What is claimed is:

1. A computerized document processing method for processing original data that has attributes for a print process, comprising:
   a manipulation step of manipulating data by moving or copying a node representing a page of a chapter of a document in a tree structure in which the original data is stored with nodes, wherein each node represents:
   a page included in the original data and having attributes of the page, or a chapter including a plurality of pages and having attributes of the chapter;
   a first determining step of determining whether a user has instructed the saving of a previously-set attribute of a source page to be moved or copied after the source page has been moved or copied in said manipulation step, or whether the user has instructed to not save a previously-set attribute of a source page to be moved or copied after the source page has been moved or copied in said manipulation step;
   a first setting step of saving the attribute of the source page to be moved or copied after the source page has been moved or copied in said manipulation step so that the moved or copied source page contains the saved attribute after being moved or copied in response to said first determining step determining that the user has instructed the saving of attribute of a node of the source page in said manipulation step;
   a second determining step of determining whether a chapter of which the source page is a part has a specific attribute different from a corresponding attribute of the document in response to said first determining step determining that the user has instructed not to save previously-set attributes of the source page to be moved or copied; and
   a second setting step of setting the attributes of the source page to be moved or copied after the source page has been moved or copied in said manipulation step to the specific attribute of the chapter or a corresponding attribute of the document, in response to the determination of said second determining step.

2. The computerized document processing method according to claim 1, further comprising a designation step of designating priorities of attributes among upper and lower levels of the tree structure, wherein in said first setting step attributes are set according to priorities designated in said designation step.

3. The computerized document processing method according to claim 2, wherein node data in the tree structure contains the priorities of attributes designated in said designation step, as an attribute of a lower level.

4. The computerized document processing method according to claim 2, further comprising a first display control step of controlling a process of displaying a screen in which the priorities of attributes can be designated, on a node-by-node basis, wherein the priorities of attributes are designated via the screen in said designation step.

5. The computerized document processing method according to claim 4, further comprising a second display control step of controlling a process of displaying a screen that allows a user to designate how to set attributes of a node belonging to a moved or copied page, when the node data is manipulated in said manipulation step.

6. The computerized document processing method according to claim 1, further comprising a reading step of reading out stored default settings that define how to set attributes of a node belonging to a moved or copied page, in said first setting step.

7. The computerized document processing method according to claim 1, wherein said method is a book-editing method, the original data includes book-editing data, and the attributes include book-editing attributes.

8. A computerized document processing method according to claim 1,
wherein said second setting step sets the attributes of the source page to be moved or copied after the source page has been moved or copied in said manipulation step to the corresponding specific attribute of the chapter when said second determining step determines that the chapter of which the source page is a part has a specific attribute different from a corresponding attribute of the document in response to said first determining step determining that the user has not instructed saving of previously-set attributes of the source page to be moved or copied.

9. A computerized document processing method according to claim 8,
further comprising a third determining step for determining whether to give priority to the specific chapter attributes in the event the second determining step determines that the chapter has specific attributes,
wherein said second setting step sets the attributes of the source page to be moved or copied after the source page has been moved or copied in said manipulation step to the corresponding specific attribute of the chapter when i) said second determining step determines that the chapter of which the source page is a part has a specific attribute different from a corresponding attribute of the document in response to said first determining step determining that the user has not instructed saving of previously-set attributes of the source page to be moved or copied, and ii) said third determining step determines that priority is given to the specific chapter attributes.

10. A computerized document processing method according to claim 1,
further comprising a third determining step for determining whether to give priority to the specific chapter attributes in the event the second determining step determines that the chapter has specific attributes,
wherein said second setting step sets the attributes of the source page to be moved or copied after the source page has been moved or copied in said manipulation step to corresponding attributes of the document in the event said second determining step determines that the chapter of which the source page is a part has specific attributes and in the event said third determining step determines that priority is not to be given to the specific chapter attributes.

11. A document processing apparatus for processing original data stored on a computer-readable medium, wherein said data has attributes for a print process, comprising:
a manipulation unit adapted to manipulate the data on the computer-readable medium by moving or copying a node representing a page of a chapter of a document in a tree structure in which the original data is stored with nodes, wherein each node represents:
a page included in the original data and having attributes of the page, or
a chapter including a plurality of pages and having attributes of the chapter;
a first determining unit configured to determine whether a user has instructed the saving of a previously-set attribute of a source page to be moved or copied after the source page has been moved or copied by said manipulation unit, or whether the user has instructed to not save a previously-set attribute of a source page to be moved or copied after the source page has been moved or copied by said manipulation unit;
a first setting unit configured to save the attribute of the source page to be moved or copied after the source page has been moved or copied by said manipulation unit so that the moved or copied source page contains the saved attribute after being moved or copied in response to said first determining unit determining that the user has instructed the saving of attribute of a node of the source page in said manipulation unit;
a second determining unit configured to determine whether a chapter of which the source page is a part has a specific attribute different from a corresponding attribute of the document in response to said first determining unit determining that the user has instructed not to save previously-set attributes of the source page to be moved or copied; and
a second setting unit configured to set the attributes of the source page to be moved or copied after the source page has been moved or copied by said manipulation unit to the specific attribute of the chapter or a corresponding attribute of the document, in response to the determination of said second determining unit.

12. The document processing apparatus according to claim 11, further comprising a designation unit for designating priorities of attributes among upper and lower levels of the tree structure, wherein attributes are set by said first setting unit according to priorities designated by said designation unit.

13. The document processing apparatus according to claim 12, wherein node data in the tree structure contains the priorities of attributes designated by said designation unit, as an attribute of a lower level.

14. The document processing method according to claim 12, further comprising a first display control unit adapted to control a process of displaying a screen in which the priorities of attributes can be designated, on a node-by-node basis, wherein the priorities of attributes are designated by said designation unit via the screen.

15. The document processing apparatus according to claim 14, further comprising a second display control unit adapted to control a process of displaying a screen that allows a user to designate how to set attributes of a node belonging to a moved or copied page, when the node data is manipulated by said manipulation unit.

16. The document processing apparatus according to claim 11, further comprising a reading unit adapted to read out stored default settings that define how to set attributes of a node belonging to a moved or copied page, by said first setting unit.

17. The document processing apparatus according to claim 11, wherein said apparatus is a book-editing apparatus, the original data includes book-editing data, and the attributes include book-editing attributes.

18. A document processing apparatus according to claim 11,
wherein said second setting unit sets the attributes of the source page to be moved or copied after the source page has been moved or copied by said manipulation unit to the corresponding specific attribute of the chapter when said second determining unit determines that the chapter of which the source page is a part has a specific attribute different from a corresponding attribute of the document in response to said first determining unit determining that the user has not instructed saving of previously-set attributes of the source page to be moved or copied.

19. A document processing apparatus according to claim 18,
further comprising a third determining unit configured to determine whether to give priority to the specific chapter attributes in the event the second determining unit determines that the chapter has specific attributes,
wherein said second setting unit sets the attributes of the source page to be moved or copied after the source page has been moved or copied by said manipulation unit to the corresponding specific attribute of the chapter when i) said second determining unit determines that the chapter of which the source page is a part has a specific attribute different from a corresponding attribute of the document in response to said first determining unit determining that the user has not instructed saving of previously-set attributes of the source page to be moved or copied, and ii) said third determining unit determines that priority is given to the specific chapter attributes.

20. A document processing apparatus according to claim 11,
further comprising a third determining unit configured to determine whether to give priority to the specific chapter attributes in the event the second determining unit determines that the chapter has specific attributes,
wherein said second setting unit sets the attributes of the source page to be moved or copied after the source page has been moved or copied by said manipulation unit to corresponding attributes of the document in the event said second determining unit determines that the chapter of which the source page is a part has specific attributes and in the event said third determining unit determines that priority is not to be given to the specific chapter attributes.

21. A document processing program embodied on a computer-readable medium for processing original data that has attributes for a print process, comprising:
a manipulation module for manipulating data by moving or copying a node representing a page of a chapter of a document in a tree structure in which the original data is stored with nodes, wherein each node represents:
a page included in the original data and having attributes of the page, or
a chapter including a plurality of pages and having attributes of the chapter;
a first determining module for determining whether a user has instructed the saving of a previously-set attribute of a source page to be moved or copied after the source page has been moved or copied by said manipulation module, or whether the user has instructed to not save a previously-set attribute of a source page to be moved or copied after the source page has been moved or copied by said manipulation module;
a first setting module for setting the attribute of the source page to be moved or copied after the source page has been moved or copied by said manipulation module so that the moved or copied source page contains the saved attribute after being moved or copied in response to said first determining module determining that the user has instructed the saving of attribute of a node of the source page by said manipulation module;
a second determining module for determining whether a chapter of which the source page is a part has a specific attribute different from a corresponding attribute of the document in response to said first determining module determining that the user has instructed not to save previously-set attributes of the source page to be moved or copied; and
a second setting module for setting the attributes of the source page to be moved or copied after the source page has been moved or copied by said manipulation module to the specific attribute of the chapter or a corresponding attribute of the document, in response to the determination of said second determining module.

22. The document processing program embodied on a computer-readable medium according to claim 21, further comprising a designation module for designating priorities of attributes among upper and lower levels of the tree structure, wherein attributes are set by said first setting module according to priorities designated by said designation module.

23. A document processing program according to claim 21,
wherein said second setting module sets the attributes of the source page to be moved or copied after the source page has been moved or copied by said manipulation module to the corresponding specific attribute of the chapter when said second determining module determines that the chapter of which the source page is a part has a specific attribute different from a corresponding attribute of the document in response to said first determining module determining that the user has not instructed saving of previously-set attributes of the source page to be moved or copied.

24. A document processing program according to claim 23,
further comprising a third determining module configured to determine whether to give priority to the specific chapter attributes in the event the second determining module determines that the chapter has specific attributes,
wherein said second setting module sets the attributes of the source page to be moved or copied after the source page has been moved or copied by said manipulation module to the corresponding specific attribute of the chapter when i) said second determining module determines that the chapter of which the source page is a part has a specific attribute different from a corresponding attribute of the document in response to said first determining module determining that the user has not instructed saving of previously-set attributes of the source page to be moved or copied, and ii) said third determining module determines that priority is given to the specific chapter attributes.

25. A document processing program according to claim 21,
further comprising a third determining module configured to determine whether to give priority to the specific chapter attributes in the event the second determining module determines that the chapter has specific attributes,
wherein said second setting module sets the attributes of the source page to be moved or copied after the source page has been moved or copied by said manipulation module to corresponding attributes of the document in the event said second determining module determines that the chapter of which the source page is a part has specific attributes and in the event said third determining module determines that priority is not to be given to the specific chapter attributes.

26. A computer-readable recording medium storing a document processing program for processing original data that has attributes for a print process, the document processing program comprising:
   a manipulation module for manipulating data by moving or copying a node representing a page of a chapter in a document in a tree structure in which the original data is stored with nodes, wherein each node represents:
   a page included in the original data and having attributes of the page, or
   a chapter including a plurality of pages and having attributes of the chapter;
   a first determining module for determining whether a user has instructed the saving of a previously-set attribute of a source page to be moved or copied after the source page has been moved or copied by said manipulation module, or whether the user has instructed to not save a previously-set attribute of a source page to be moved or copied after the source page has been moved or copied by said manipulation module;
   a first setting module for setting the attribute of the source page to be moved or copied after the source page has been moved or copied by said manipulation module so that the moved or copied source page contains the saved attribute after being moved or copied in response to said first determining module determining that the user has instructed the saving of attribute of a node of the source page in said manipulation module;
   a second determining module for determining whether a chapter of which the source page is a part has a specific attribute different from a corresponding attribute of the document in response to said first determining module determining that the user has instructed not to save previously-set attributes of the source page to be moved or copied; and
   a second setting module for setting the attributes of the source page to be moved or copied after the source page has been moved or copied by said manipulation module to the specific attribute of the chapter or a corresponding attribute of the document, in response to the determination of said second determining module.

27. The computer-readable recording medium according to claim 26, wherein the document processing program further comprises designation module for designating priorities of attributes among upper and lower levels of the tree structure, wherein attributes are set by said first setting module according to priorities designated by said designation module.

28. A computer-readable recording medium according to claim 26,
   wherein said second setting module sets the attributes of the source page to be moved or copied after the source page has been moved or copied by said manipulation module to the corresponding specific attribute of the chapter when said second determining module determines that the chapter of which the source page is a part has a specific attribute different from a corresponding attribute of the document in response to said first determining module determining that the user has not instructed saving of previously-set attributes of the source page to be moved or copied.

29. A computer-readable recording medium according to claim 28,
   further comprising a third determining module configured to determine whether to give priority to the specific chapter attributes in the event the second determining module determines that the chapter has specific attributes,
   wherein said second setting module sets the attributes of the source page to be moved or copied after the source page has been moved or copied by said manipulation module to the corresponding specific attribute of the chapter when i) said second determining module determines that the chapter of which the source page is a part has a specific attribute different from a corresponding attribute of the document in response to said first determining module determining that the user has not instructed saving of previously-set attributes of the source page to be moved or copied, and ii) said third determining module determines that priority is given to the specific chapter attributes.

30. A computer-readable recording medium according to claim 26,
   further comprising a third determining module configured to determine whether to give priority to the specific chapter attributes in the event the second determining module determines that the chapter has specific attributes,
   wherein said second setting module sets the attributes of the source page to be moved or copied after the source page has been moved or copied by said manipulation module to corresponding attributes of the document in the event said second determining module determines that the chapter of which the source page is a part has specific attributes and in the event said third determining module determines that priority is not to be given to the specific chapter attributes.

31. A computerized data processing method for processing original data on a computer readable medium, wherein the original data includes data of a plurality of pages of one or more chapters of a document with respectively set page attributes and data of a plurality of chapters with respectively set chapter attributes, comprising:
   an insertion step of inserting page data of a source page into a designated destination chapter, the source page having attributes previously set;
   an inquiring step of inquiring, using a graphical user-interface, whether or not to keep attributes previously set for the source page before inserted into the destination chapter after the source page has been inserted into the destination chapter in said insertion step;
   a first determining step of determining whether a user has instructed the saving and setting of previously-set attributes of a source page to be inserted into the destination chapter after the source page has been inserted into the destination chapter in said insertion step after the inquiry made in said inquiring step or whether the user has instructed to not save previously-set attributes of a source page to be inserted into the destination chapter after the source page has been inserted into the destination chanter in said insertion step after the inquiry made in said inquiring step;
   a first setting step of saving and setting the previously-set attributes of the source page to be inserted into the destination chapter after the source page has been inserted into the destination chapter so that the inserted source page contains the saved attributes after being inserted into the destination chapter in response to said first determining step determining that the user has instructed the saving of attributes of the source page;
   a second determining step of determining whether a chapter of which the source page is a part has a specific attribute different from a corresponding attribute of the document in response to said first determining step determining that the user has instructed not to save previously-set attributes of the source page to be inserted; and a second setting step of setting the attributes of the source page to be inserted after the source page has been inserted into the destination chapter to the specific attribute of the chapter or a corresponding attribute of the document, in response to the determination of said second determining step.

32. The computerized data processing method according to claim 31, wherein said inquiring step comprises a display step of displaying a user-interface screen inquiring a user as to whether or not to keep the attributes previously set for the source page as the attributes of the inserted page.

33. The data processing method according to claim 31, wherein the method is a book-editing method, the original data includes book-editing data, and the attributes include book-editing attributes.

34. The data processing method according to claim 31, wherein the setting step includes setting attributes previously set for the source page prior to insertion as attributes of the inserted page.

35. The data processing method according to claim 31, wherein the setting step includes setting attributes previously set for the source page prior to insertion as attributes of the destination chapter into which the source page is inserted.

36. A computerized data processing method according to claim 31,
wherein said second setting step sets the attributes of the source page to be inserted after the source page has been inserted to the corresponding specific attribute of the chapter when said second determining step determines that the chapter of which the source page is a part has a specific attribute different from a corresponding attribute of the document in response to said first determining step determining that the user has not instructed saving of previously-set attributes of the source page to be inserted.

37. A computerized data processing method according to claim 36,
further comprising a third determining step for determining whether to give priority to the specific chapter attributes in the event the second determining step determines that the chapter has specific attributes,
wherein said second setting step sets the attributes of the source page to be inserted after the source page has been inserted to the corresponding specific attribute of the chapter when i) said second determining step determines that the chapter of which the source page is a part has a specific attribute different from a corresponding attribute of the document in response to said first determining step determining that the user has not instructed saving of previously-set attributes of the source page to be inserted, and ii) said third determining step determines that priority is given to the specific chapter attributes.

38. A computerized data processing method according to claim 31,
further comprising a third determining step for determining whether to give priority to the specific chapter attributes in the event the second determining step determines that the chapter has specific attributes,
wherein said second setting step sets the attributes of the source page to be inserted after the source page has been inserted to corresponding attributes of the document in the event said second determining step determines that the chapter of which the source page is a part has specific attributes and in the event said third determining step determines that priority is not to be given to the specific chapter attributes.

39. A data processing apparatus for processing original data stored on a computer-readable medium, including data of a plurality of pages of one or more chapters of a document with respectively set page attributes and data of a plurality of chapters with respectively set chapter attributes, comprising:
an insertion unit adapted to insert page data of a source page into a designated destination chapter, the source page having attributes previously set;
an inquiring unit adapted to inquire, using a graphical user-interface, whether or not to keep attributes previously set for the source page before inserted into the destination chapter after the source page has been inserted into the destination chapter by said inserting unit;
a first determining unit configured to determine whether a user has instructed the saving and setting of previously-set attributes of a source page to be inserted into the destination chapter after the source page has been inserted into the destination chapter by said insertion unit after the inquiry made by said inquiring unit or whether the user has instructed to not save previously-set attributes of a source page to be inserted into the destination chapter after the source page has been inserted into the destination chapter by said insertion unit after the inquiry made by said inquiring unit;
a first setting unit configured to save and set the previously-set attributes of the source page to be inserted into the destination chapter after the source page has been inserted into the destination chapter so that the inserted source page contains the saved attributes after being inserted into the destination chapter in response to said first determining unit determining that the user has instructed the saving of attributes of the source page;
a second determining unit configured to determine whether a chapter of which the source page is a part has a specific attribute different from a corresponding attribute of the document in response to said first determining unit determining that the user has instructed not to save previously-set attributes of the source page to be inserted; and
a second setting unit configured to set the attributes of the source page to be inserted after the source page has been inserted into the destination chapter to the specific attribute of the chapter or a corresponding attribute of the document, in response to the determination of said second determining unit.

40. The data processing apparatus according to claim 39, wherein said inquiring unit comprises a display unit adapted to display a user-interface screen as to whether or not to keep the attributes previously set for the source page as the attributes of the inserted page.

41. The data processing apparatus according to claim 39, wherein the apparatus is a book-editing apparatus, the original data includes book-editing data, and the attributes include book-editing attributes.

42. The data processing apparatus according to claim 39, wherein the setting unit sets the attributes previously set for the source page prior to insertion as attributes of the inserted page.

43. The data processing apparatus according to claim 39, wherein the setting unit sets the attributes previously set for the source page prior to insertion as attributes of the destination chapter into which the source page is inserted.

44. A data processing apparatus according to claim 39, wherein said second setting unit sets the attributes of the source page to be inserted after the source page has been inserted to the corresponding specific attribute of the chapter when said second determining unit determines that the chapter of which the source page is a part has a specific attribute different from a corresponding attribute of the document in response to said first determining unit determining that the user has not instructed saving of previously-set attributes of the source page to be inserted.

45. A data processing apparatus according to claim 44, further comprising a third determining unit for determining whether to give priority to the specific chapter attributes in the event the second determining unit determines that the chapter has specific attributes, wherein said second setting unit sets the attributes of the source page to be inserted after the source page has been inserted to the corresponding specific attribute of the chapter when i) said second determining unit determines that the chapter of which the source page is a part has a specific attribute different from a corresponding attribute of the document in response to said first determining unit determining that the user has not instructed saving of previously-set attributes of the source page to be inserted, and ii) said third determining unit determines that priority is given to the specific chapter attributes.

46. A data processing apparatus according to claim 39, further comprising a third determining unit for determining whether to give priority to the specific chapter attributes in the event the second determining unit determines that the chapter has specific attributes, wherein said second setting unit sets the attributes of the source page to be inserted after the source page has been inserted to corresponding attributes of the document in the event said second determining unit determines that the chapter of which the source page is a part has specific attributes and in the event said third determining unit determines that priority is not to be given to the specific chapter attributes.

47. A computer-readable storage medium storing a program for processing original data that includes data of a plurality of pages of one or more chapters of a document with respectively set page attributes and data of a plurality of chapters with respectively set chapter attributes, the program comprising:
an insertion module for inserting page data of a source page into a designated destination chapter, the source page having attributes previously set;
an inquiring module for inquiring, using a graphical user-interface, whether or not to keep attributes previously set for the source page inserted into the destination chapter after the source page has been inserted into the destination chapter by said insertion module;
a first determining module for determining whether a user has instructed the saving and setting of previously-set attributes of a source page to be inserted into the destination chapter after the source page has been inserted into the destination chapter by said insertion module after the inquiry made by said inquiring module or whether the user has instructed to not save previously-set attributes of a source page to be inserted into the destination chanter after the source page has been inserted into the destination chapter by said insertion module after the inquiry made by said inquiring module;
a first setting module for saving and setting the previously-set attributes of the source page to be inserted into the destination chapter after the source page has been inserted into the destination chapter so that the inserted source page contains the saved attributes after being inserted into the destination chapter in response to said first determining module determining that the user has instructed the saving of attributes of the source page;
a second determining module for determining whether a chapter of which the source page is a part has a specific attribute different from a corresponding attribute of the document in response to said first determining module determining that the user has instructed not to save previously-set attributes of the source page to be inserted; and
a second setting module for setting the attributes of the source page to be inserted after the source page has been inserted into the destination chapter to the specific attribute of the chapter or a corresponding attribute of the document, in response to the determination of said second determining module.

48. A computer-readable storage medium according to claim 47, wherein said second setting module sets the attributes of the source page to be inserted after the source page has been inserted to the corresponding specific attribute of the chapter when said second determining module determines that the chapter of which the source page is a part has a specific attribute different from a corresponding attribute of the document in response to said first determining module determining that the user has not instructed saving of previously-set attributes of the source page to be inserted.

49. A computer-readable storage medium according to claim 48, further comprising a third determining module for determining whether to give priority to the specific chapter attributes in the event the second determining module determines that the chapter has specific attributes, wherein said second setting module sets the attributes of the source page to be inserted after the source page has been inserted to the corresponding specific attribute of the chapter when i) said second determining module determines that the chapter of which the source page is a part has a specific attribute different from a corresponding attribute of the document in response to said first determining module determining that the user has not instructed saving of previously-set attributes of the source page to be inserted, and ii) said third determining module determines that priority is given to the specific chapter attributes.

50. A computer-readable storage medium according to claim 47, further comprising a third determining module for determining whether to give priority to the specific chapter attributes in the event the second determining module determines that the chapter has specific attributes, wherein said second setting module sets the attributes of the source page to be inserted after the source page has been inserted to corresponding attributes of the document in the event said second determining module determines that the chapter of which the source page is a part has specific attributes and in the event said third determining module determines that priority is not to be given to the specific chapter attributes.

* * * * *

UNITED STATES PATENT AND TRADEMARK OFFICE
CERTIFICATE OF CORRECTION

| | |
|---|---|
| PATENT NO. | : 7,299,413 B2 |
| APPLICATION NO. | : 10/238586 |
| DATED | : November 20, 2007 |
| INVENTOR(S) | : Yasuo Mori |

It is certified that error appears in the above-identified patent and that said Letters Patent is hereby corrected as shown below:

SHEET 2:

Fig. 2, "PRINTE" should read --PRINTER-- and "CONTRO" should read --CONTROL--.

COLUMN 1:

Line 37, "combine" should read --combines--.

COLUMN 4:

Line 15, "compriss" should read --comprises--.

COLUMN 6:

Line 54, "generates" should read --generate--; and
    Line 66, "a original" should read --an original--.

COLUMN 12:

Line 57, "801" should read --S801--.

COLUMN 13:

Line 25, "change a" should read --change an--;
    Line 31, "as a" should read --as an--; and
    Line 64, "thorough" should read --through--.

COLUMN 14:

Line 19, "a" should read --an--.

COLUMN 17:

Line 48, "Awhile" should read --A while--.

COLUMN 21:

Line 50, "coping" should read --copying--.

UNITED STATES PATENT AND TRADEMARK OFFICE
CERTIFICATE OF CORRECTION

PATENT NO. : 7,299,413 B2
APPLICATION NO. : 10/238586
DATED : November 20, 2007
INVENTOR(S) : Yasuo Mori It is certified that error appears in the above-identified patent and that said Letters Patent is hereby corrected as shown below:

COLUMN 27:

Line 4, "on a" should read --on an--.

COLUMN 33:

Line 46, "comprises" should read --comprises a--.

COLUMN 34:

Line 34, "computer readable" should read --computer-readable--; and
    Line 56, "chanter" should read --chapter--.

COLUMN 37:

Line 63, "chanter" should read --chapter--.

Signed and Sealed this

Fourteenth Day of October, 2008

JON W. DUDAS
*Director of the United States Patent and Trademark Office*